United States Patent Office 3,302,178
Patented Jan. 31, 1967

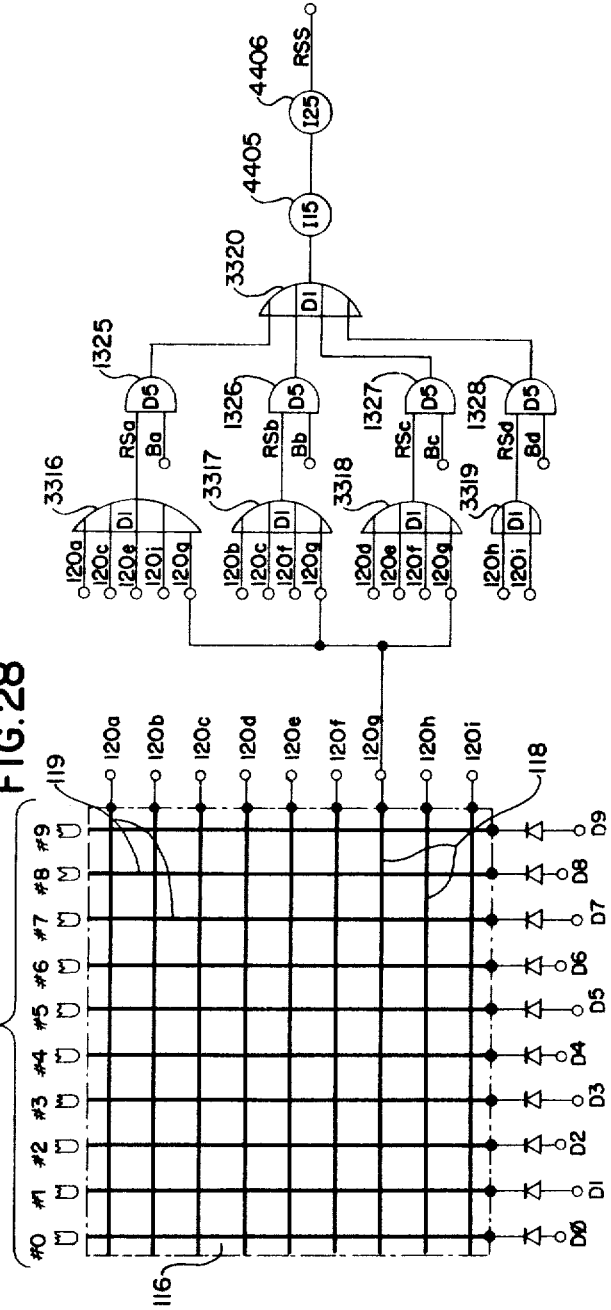

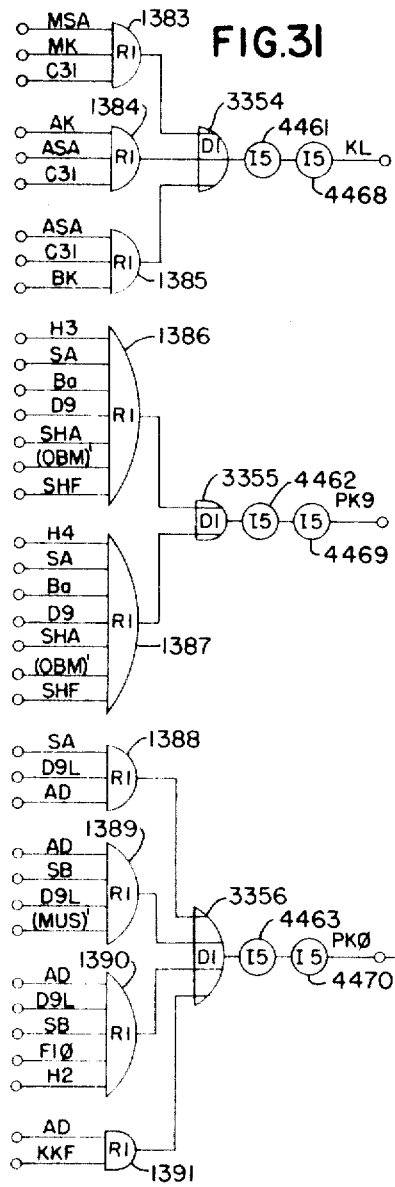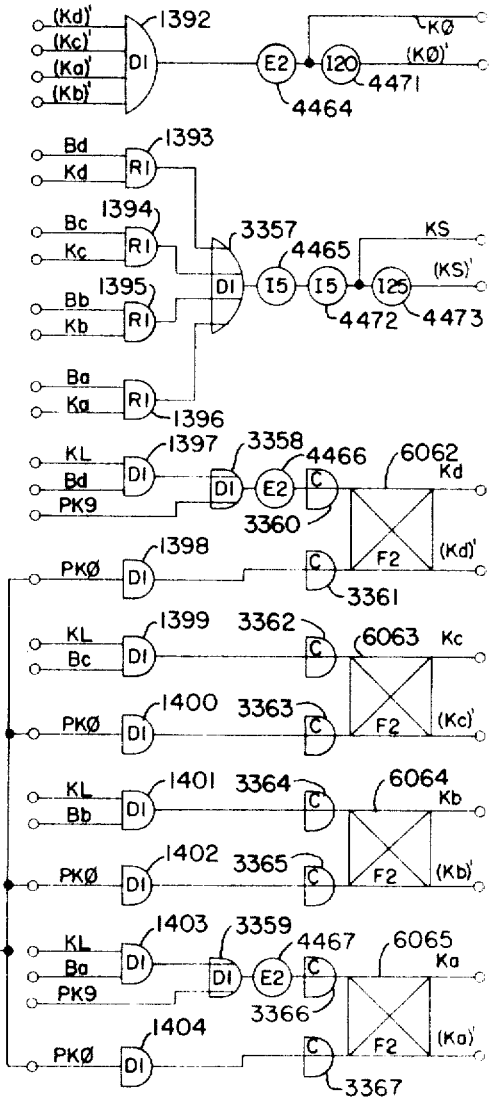
FIG.31

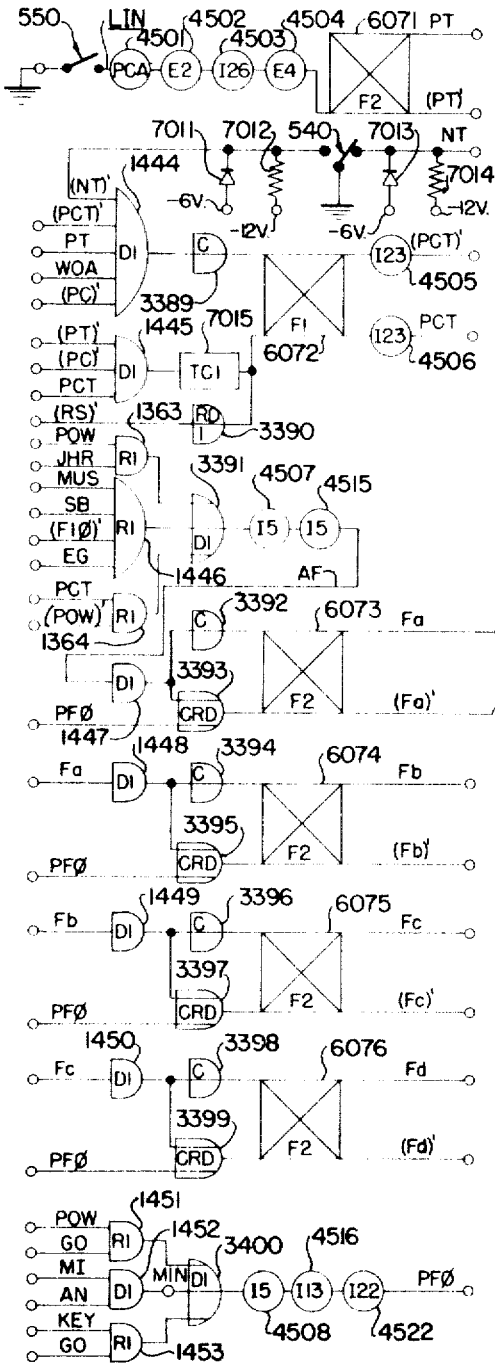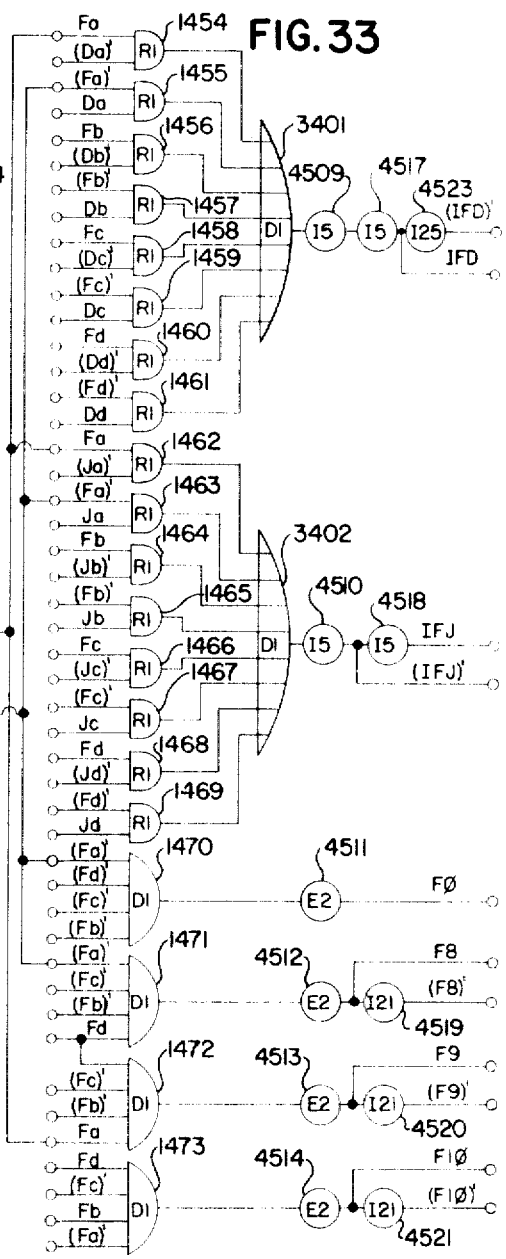
FIG. 33

3,302,178
COMPUTING SYSTEMS
Thomas P. Holloran, Brookville, and Patrick B. Close, Dayton, Ohio, assignors to The National Cash Register Company, Dayton, Ohio, a corporation of Maryland
Original application Dec. 15, 1959, Ser. No. 859,598, now Patent No. 3,112,394, dated Nov. 26, 1963. Divided and this application Oct. 7, 1963, Ser. No. 314,094
3 Claims. (Cl. 340—172.5)

The present application is a division of copending application Serial No. 859,598, filed December 15, 1959, by P. B. Close et al., (now United States Patent No. 3,112,-394) and assigned to the same assignee as the present divisional application and related generally to a unique general purpose type of electronic digital computing system.

With the ever increasing enormity and complexity of record keeping and accounting systems in the business world of today, there is accordingly an ever increasing demand, by necessity, for the adaptation and utilization of high-speed mechanization techniques compatible with such systems. Even though the installation of large scale data processors and electronic computing equipment has partially satisfied the needs of the larger business establishments, unfortunately they are not economically within the realm of practical usage by the smaller business establishments. Consequently, the long-felt need by smaller businesses is yet to be satisfied.

It is a primary object of the present invention to devise an ambiguous-word type computer which is capable of utilizing in an extremely simple manner, an address incrementing and decrementing format for an internally stored program whereby a single instruction of the program is capable of initiating a sequence of like operations on a multitude of word significations.

The features of the present invention which are believed to be novel are set forth with particularity in appended claims. The organization and manner of operation of the invention, together with further objects and advantages thereof, may best be understood by reference to the following description taken in connection with the accompanying drawings, in the several figures of which like reference characters identify like elements, and in which:

FIGS. 1 and 2, when joined together at the dashed lines, form a simplified block diagram of the computer circuitry;

FIG. 3 is a simplified block diagram of the adder-subtracter portion of the computer circuitry;

FIGS. 4 thru 10 disclose the schematic circuit diagrams of all of the various building blocks utilized in constructing the circuitry portion of the computer;

FIGS. 11 and 12, when joined at the dashed lines, form a schematic circuit diagram of the coincident-current magnetic core memory;

FIG. 27 is a logical diagram of the memory sense amplifiers;

FIG. 28 is a logical diagram of the rack-readout circuitry;

FIG. 31 is a logical diagram of the K digit-register and associated circuitry;

FIG. 33 is a logical diagram of the F-counter and compare circuitry;

Figure 41:
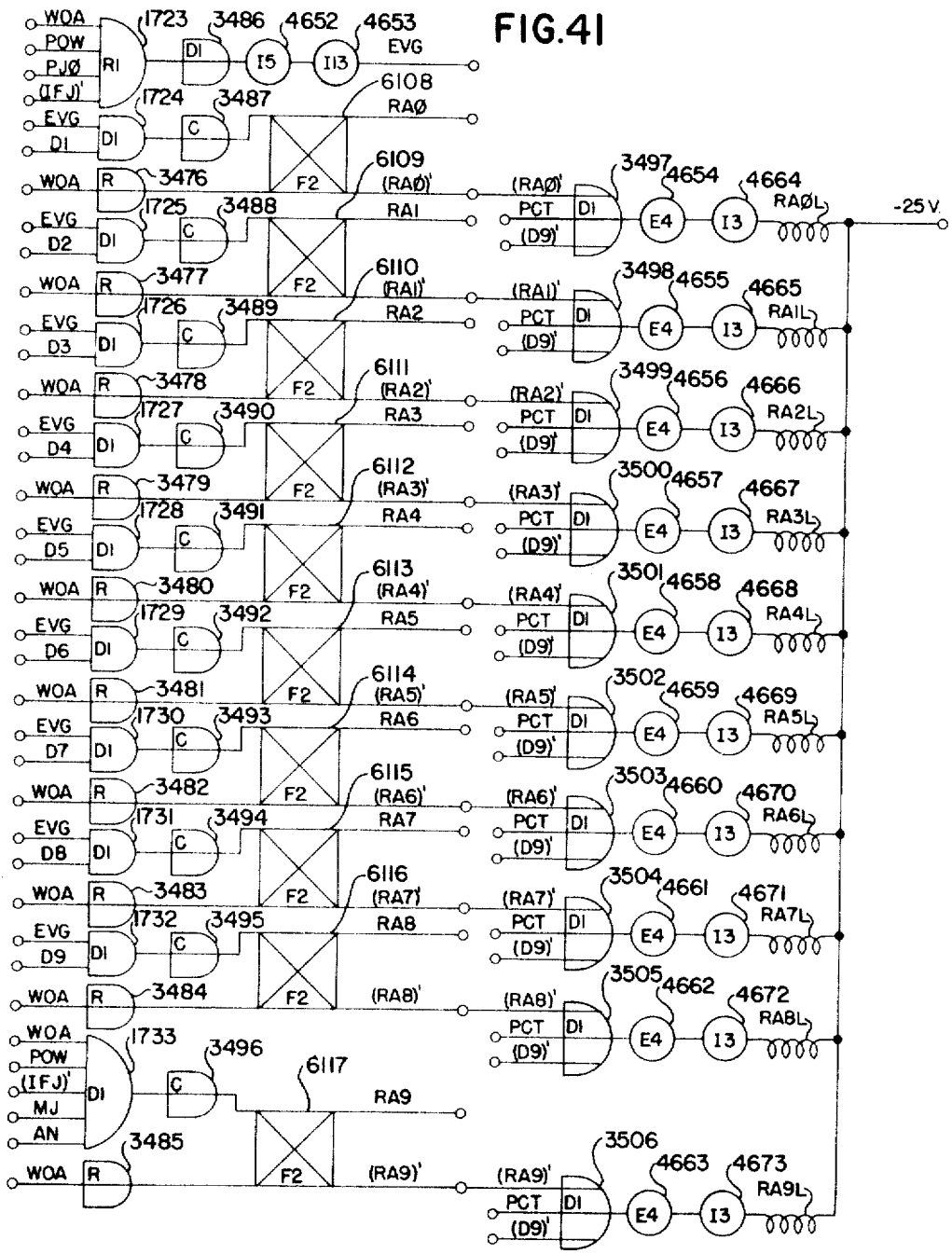
Figure 42:
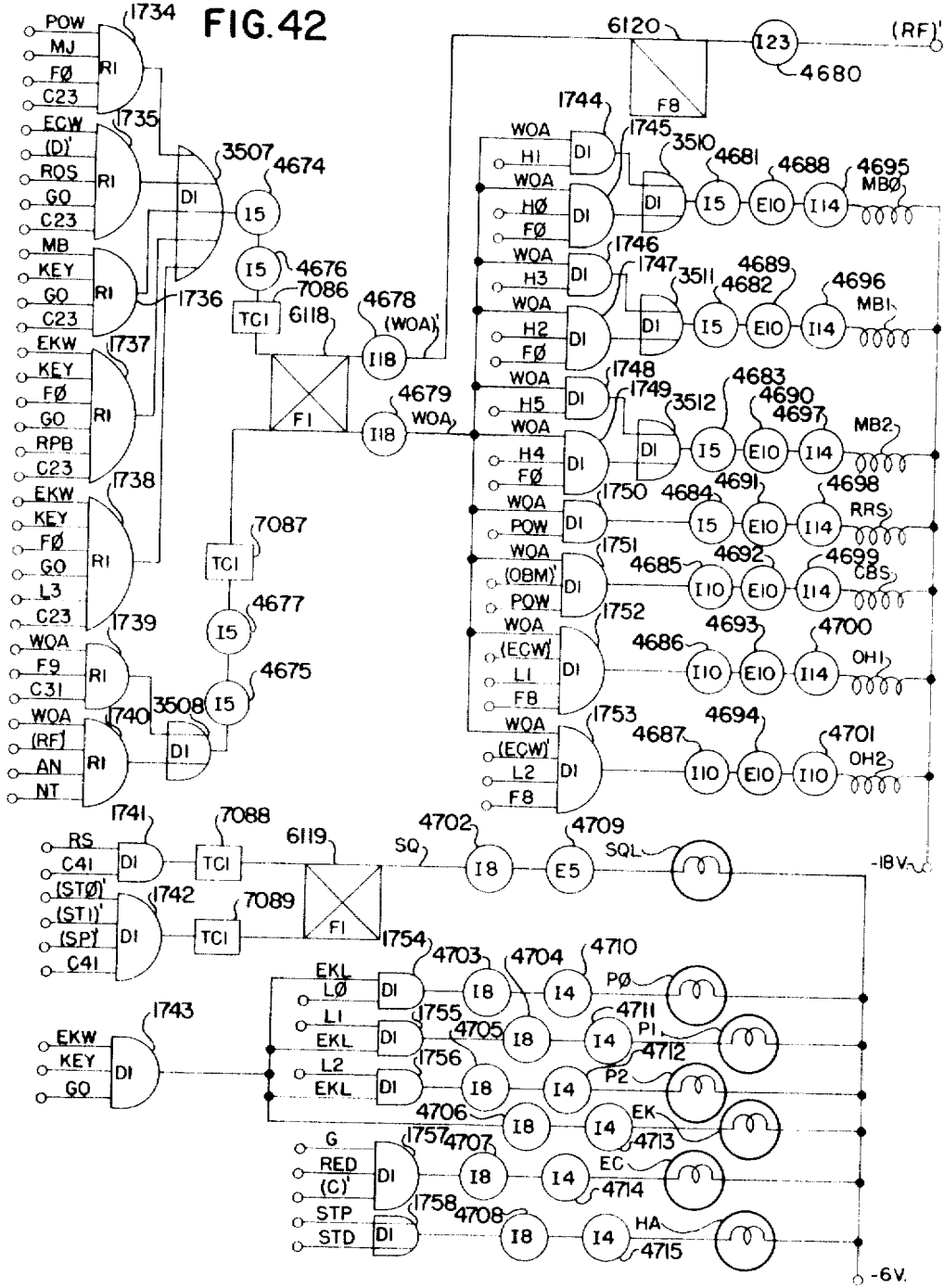
Figure 43:
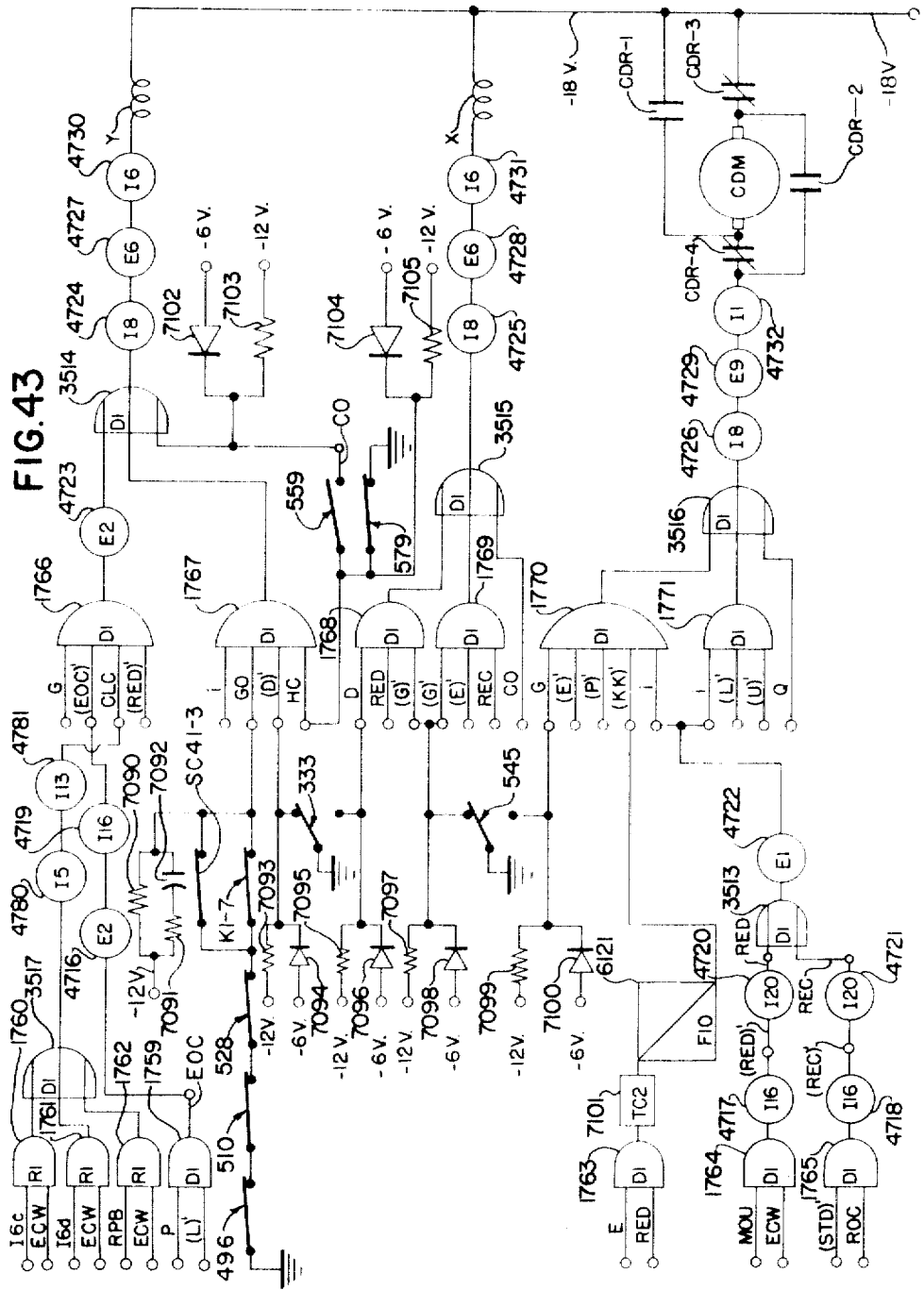
Figure 44:
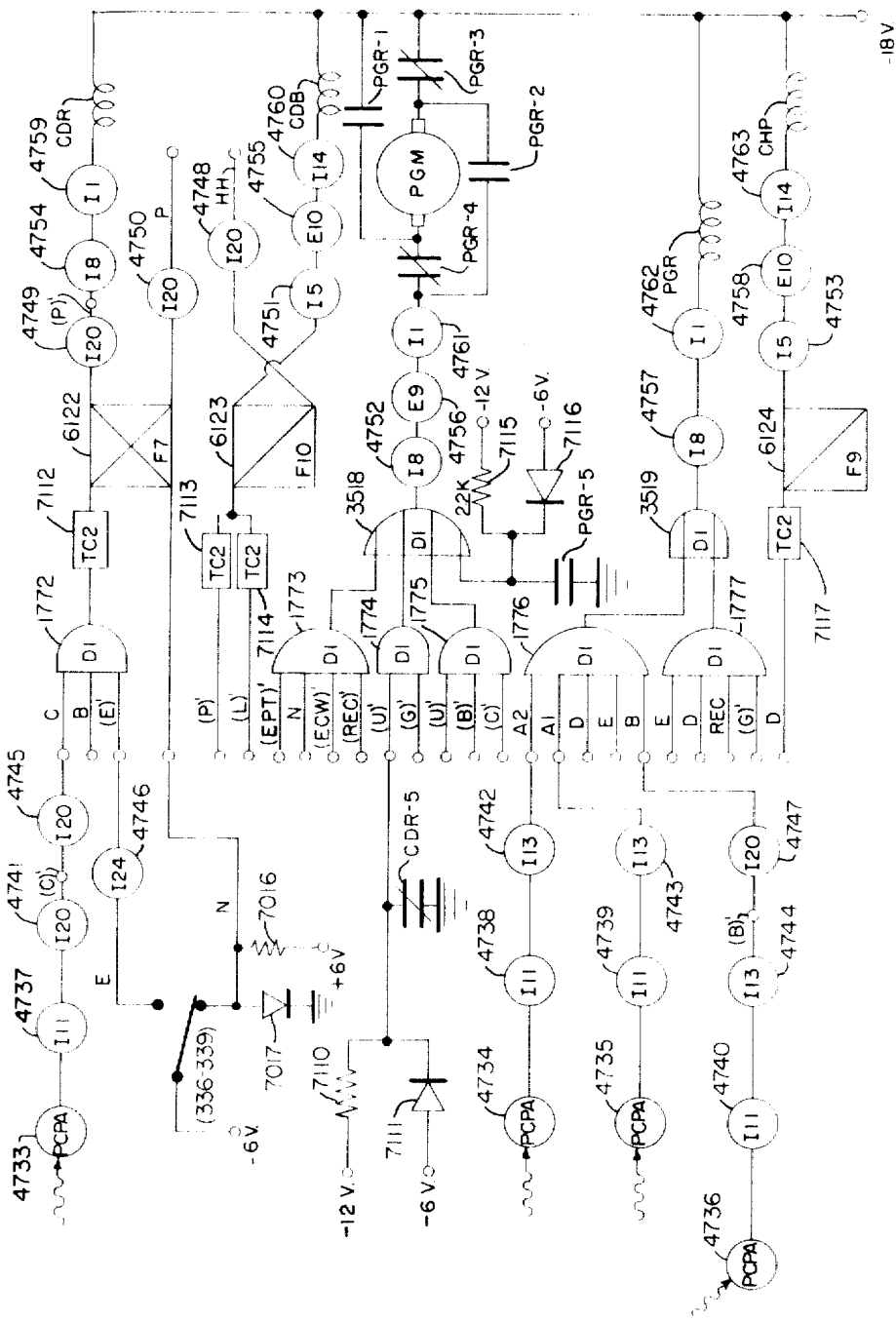
Figure 45:
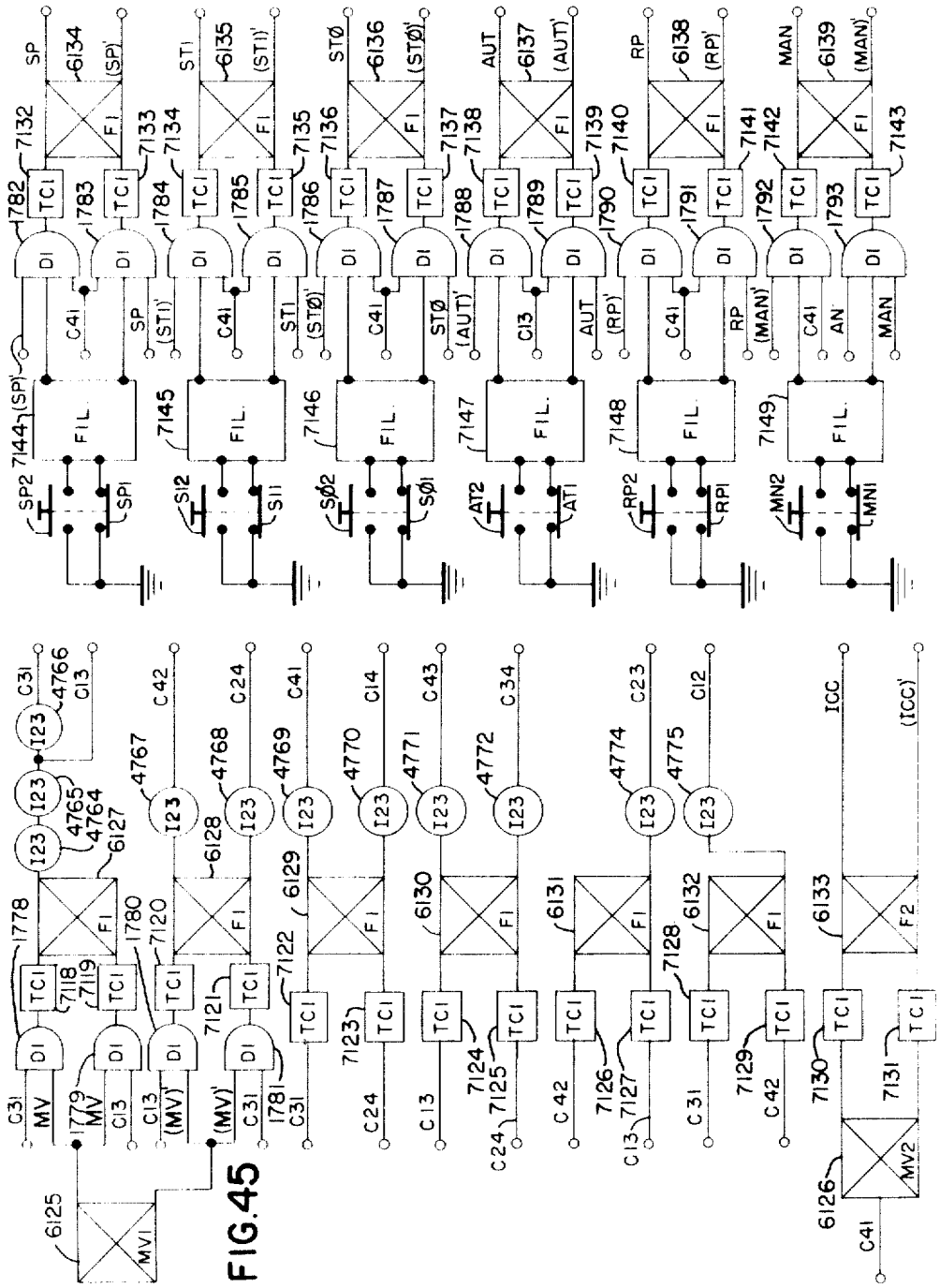
Figure 46:
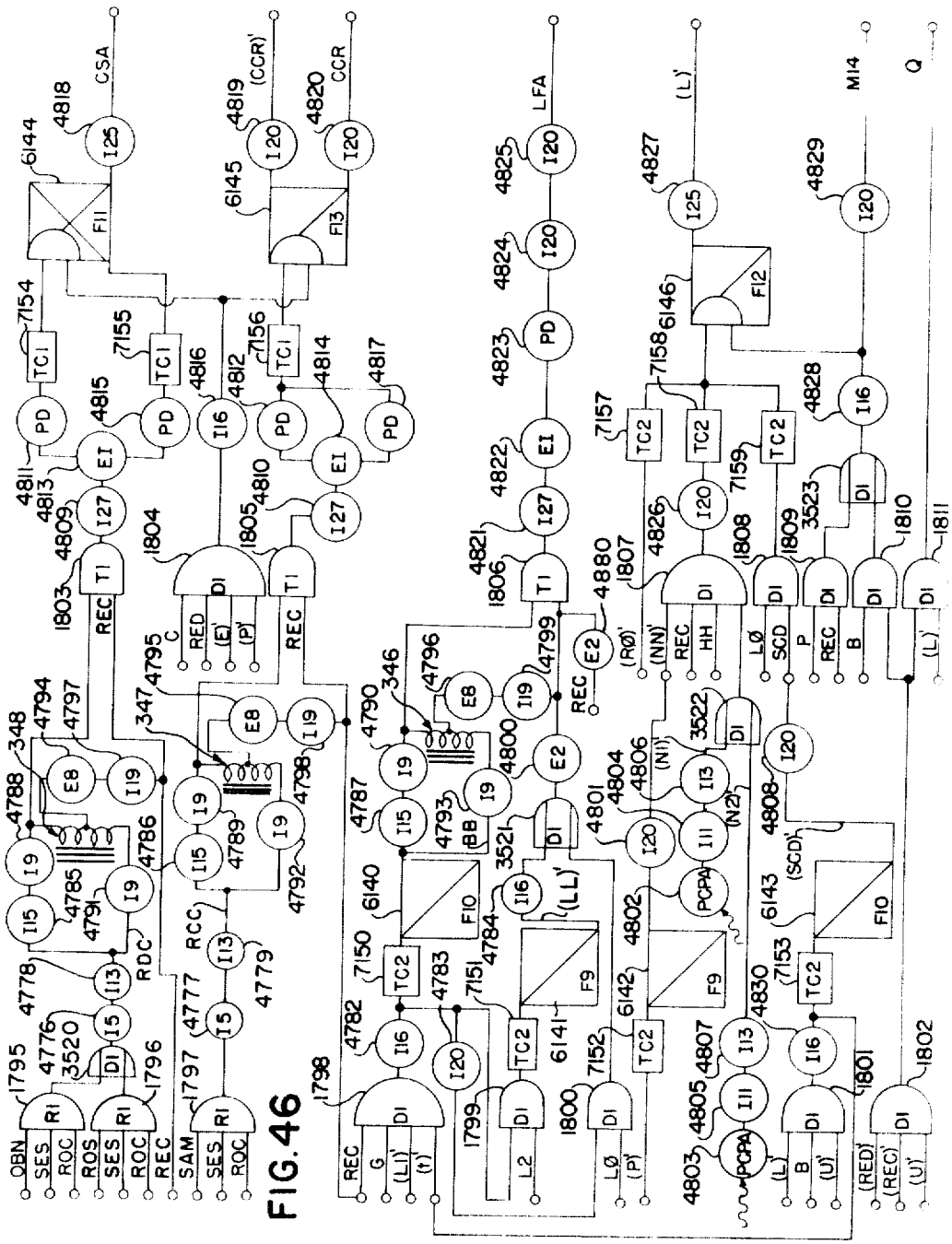
Figure 47:
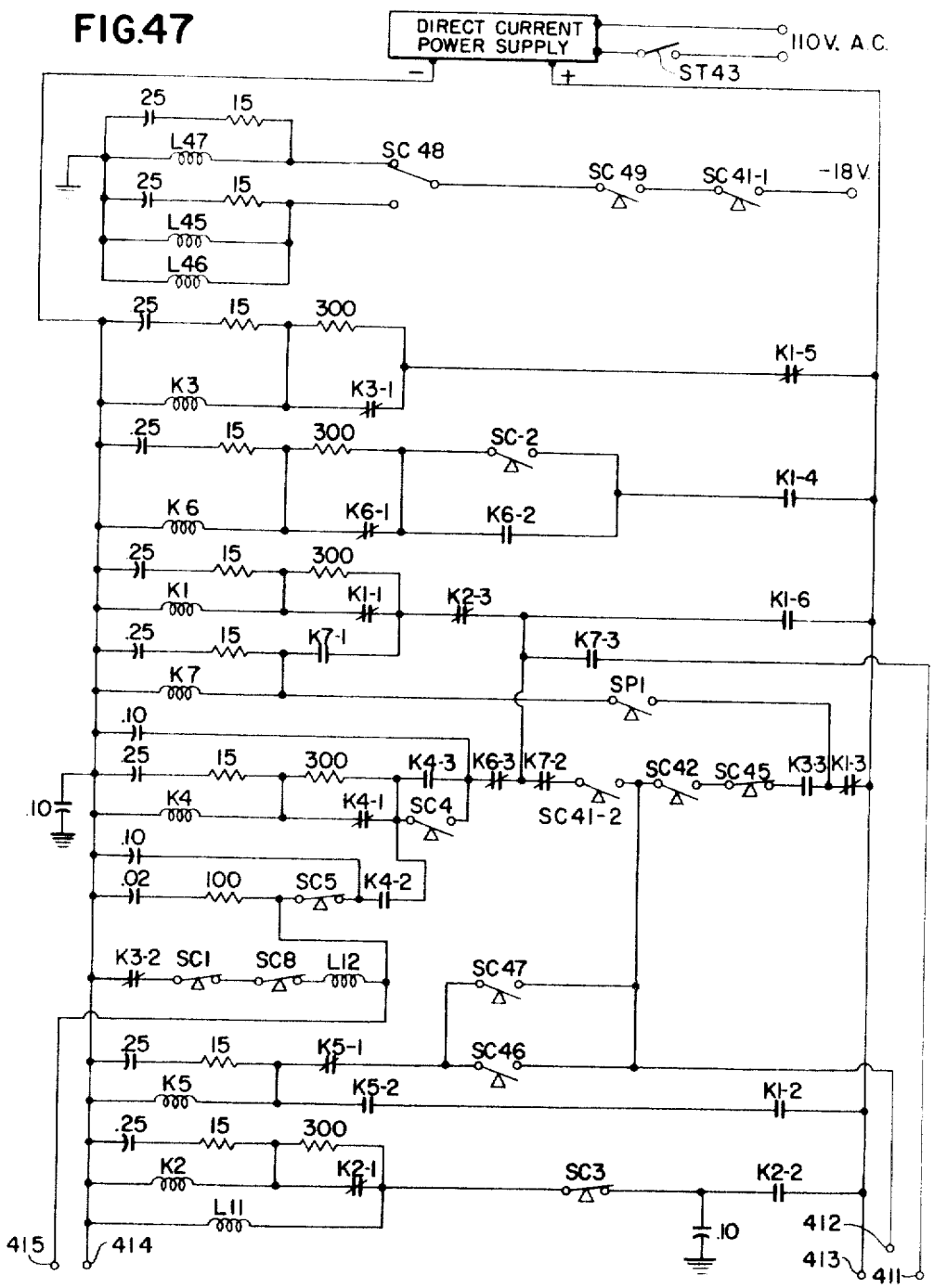
Figure 48:
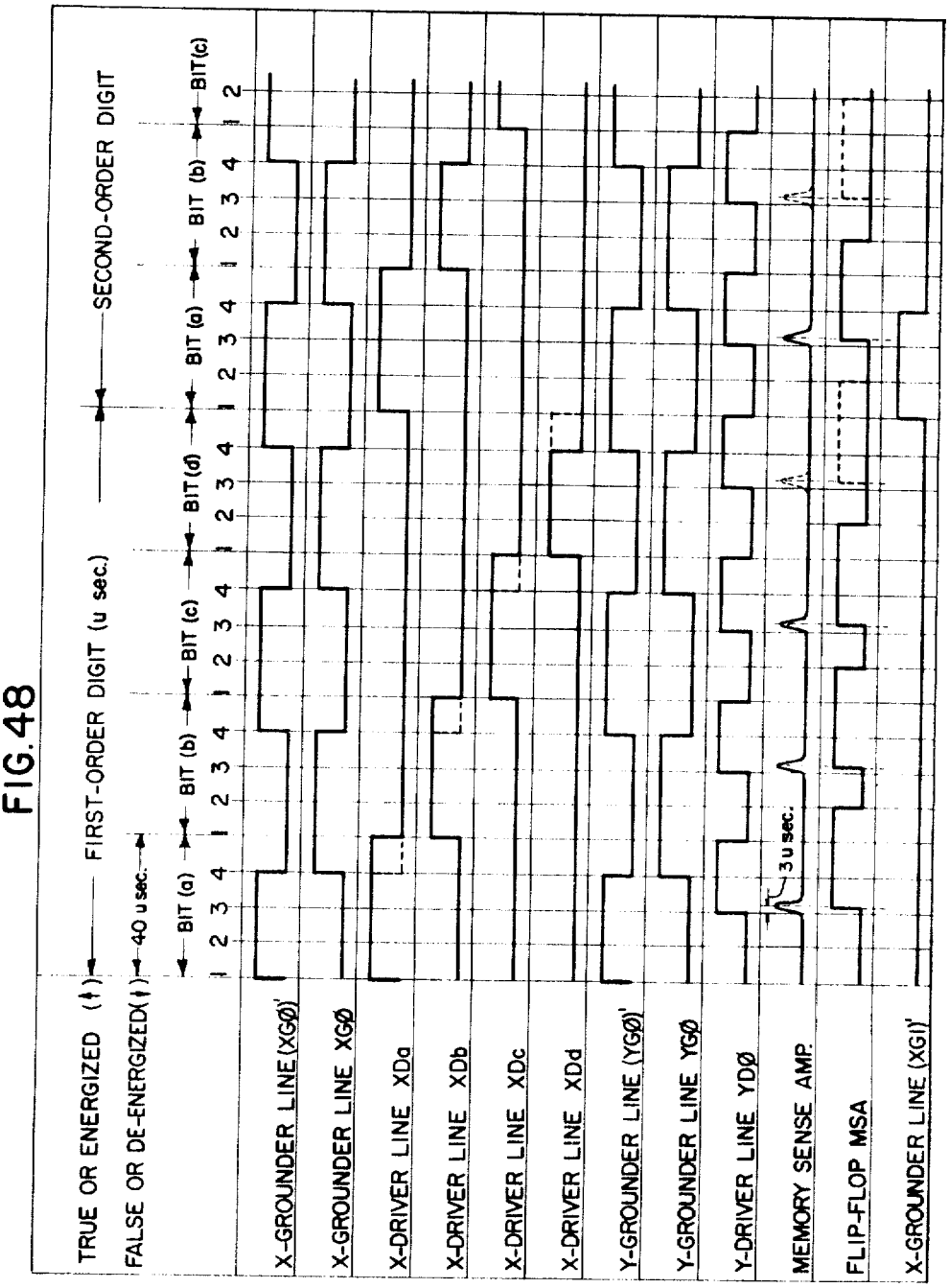
Figure 49:
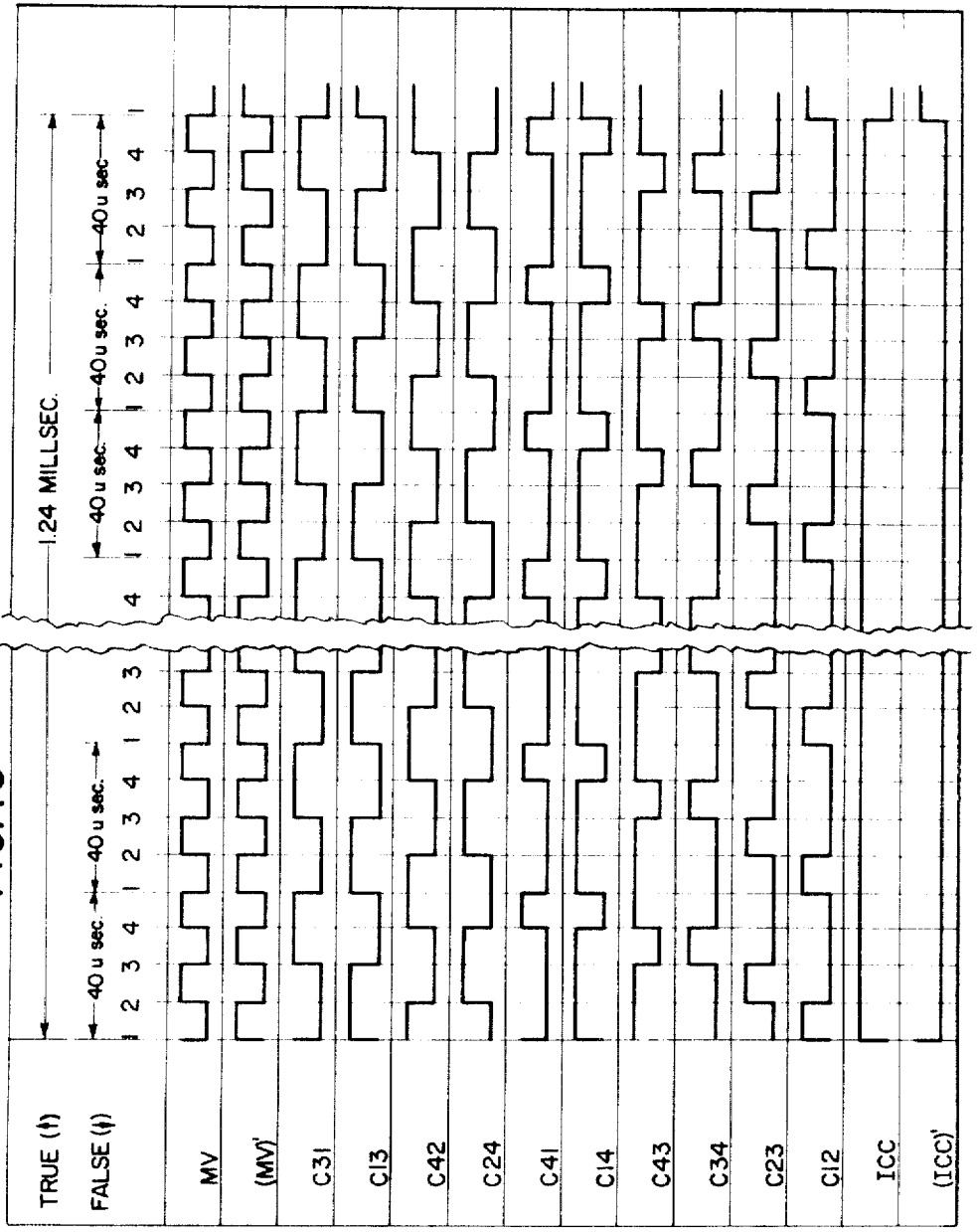
Figure 50:
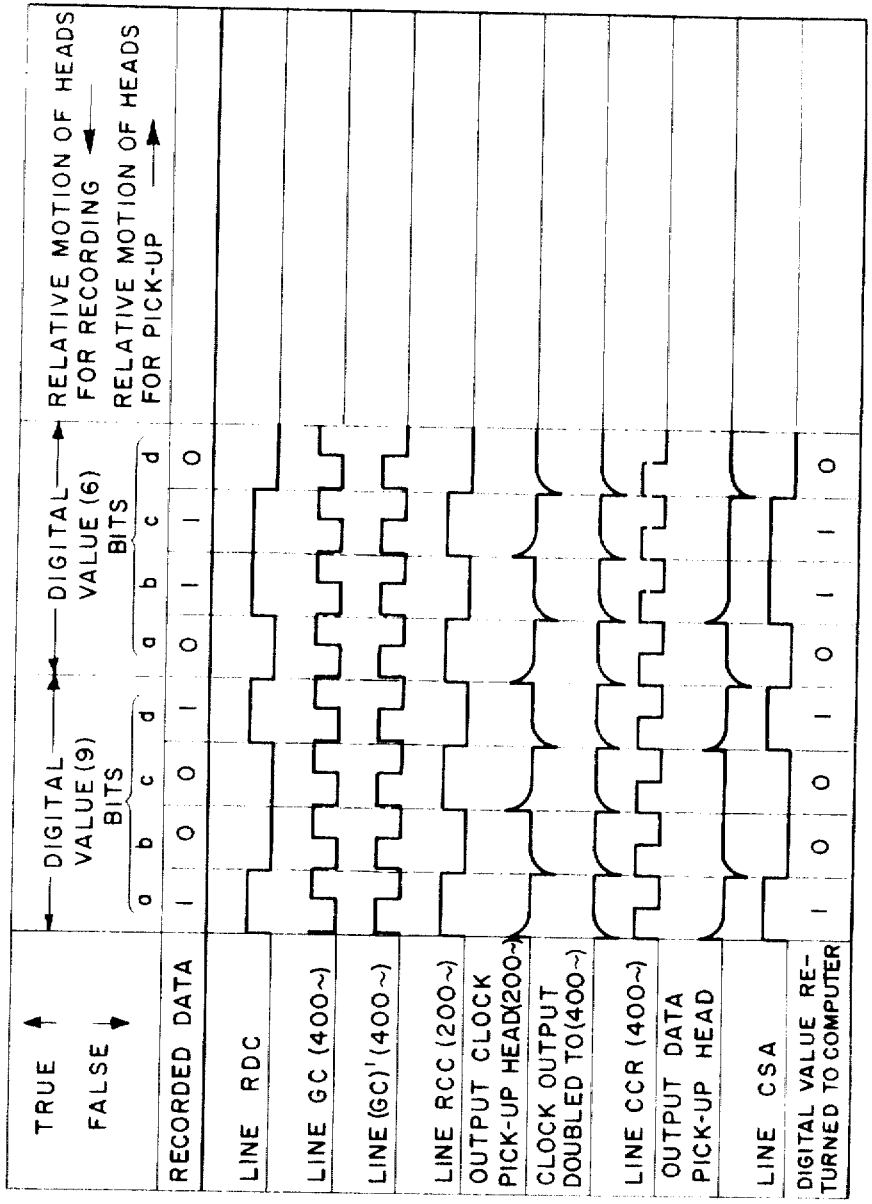
Figure 51:
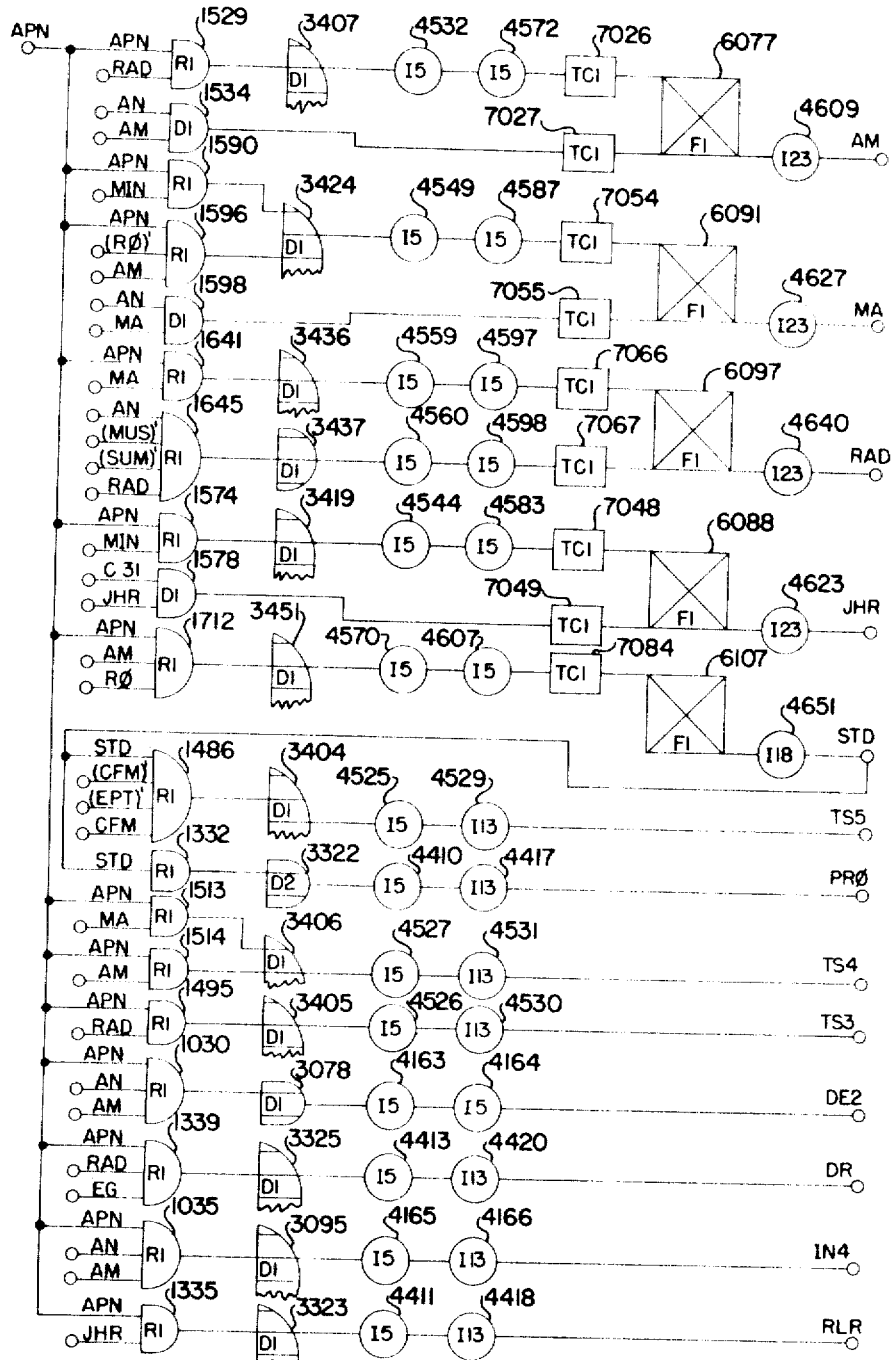

FIGS. 35 thru 40 are logical diagrams of the various word-cycle, time-delay and subcommand initiating flip-flops;

FIG. 41 is a logical diagram of the rack-stopping solenoids and flip-flops;

FIG. 42 is a logical diagram of various solenoid control and light indicating circuitry;

FIG. 43 is a portion of the logical diagram of the ledger card handling circuitry;

FIG. 44 is an additional portion of the logical diagram of the ledger card handling circuitry;

FIG. 45 is a logical diagram of the various timing clock and push-button control circuitry;

FIG. 46 is a logical diagram of the magnetic recording reproducing and control circuitry;

FIG. 47 is a schematic diagram of a portion of the tape punch control circuitry;

FIG. 48 is a timing chart illustrating the instantaneous logical states of the various control lines utilized during a memory read-write cycle of operation;

FIG. 49 is a timing chart illustrating the instantaneous logical states of the various synchronizing clock lines;

FIG. 50 is a timing chart illustrating the instantaneous logical states of the various control lines utilized during a magnetic recording and reproduction cycle of operation;

FIG. 51 logically illustrates the various portions of the circuitry utilized by the computer in carrying-out an add-pairs-of-numbers (APN) instruction.

Inasmuch as the following description of a physical embodiment of the present invention is of considerable length and complexity, and is essentially divided into a multiplicity of separate sections, the various section headings are herein serially numbered and listed below in order to facilitate immediate reference to the various portions of the specification.

TABLE OF CONTENTS

|  | Col. No. |
|---|---|
| 1. Building blocks generally | 3 |
| 2. Inverter building blocks | 3 |
| 3. Emitter-follower building blocks | 5 |
| 4. Logical OR building blocks | 5 |
| 5. Logical AND building blocks | 6 |

TABLE OF CONTENTS—Continued

| | Col. No. |
|---|---|
| 6. Flip-flop and multivibrator building blocks | 9 |
| 7. Miscellaneous building blocks | 12 |
| 8. Magnetic core memory | 17 |
| 9. X-drivers | 25 |
| 10. Bit-counter | 26 |
| 11. X and Y grounders | 27 |
| 12. Digit counter | 27 |
| 13. Y-drivers | 29 |
| 14. Word-selecting register | 29 |
| 15. Summary of word selection | 30 |
| 16. Synchronizing clocks | 31 |
| 17. Detailed read-write cycle | 32 |
| 18. Sense-amplifier strobe | 36 |
| 19. Format of instruction words generally | 37 |
| 20. Format of Add-Pairs-of-Numbers instruction word (APN-11) | 39 |
| 21. Instruction register generally | 40 |
| 22. Section-1 of instruction register | 41 |
| 23. Section-2 of instruction register | 42 |
| 24. Section-3 of instruction register | 44 |
| 25. Section-4 of instruction register | 45 |
| 26. Section-5 of instruction register | 45 |
| 27. Instruction register presets | 46 |
| 28. Summary of instruction register | 48 |
| 29. R-counter | 48 |
| 30. F-counter | 49 |
| 31. Compare F-counter and digit-counter | 50 |
| 32. J digit-register | 50 |
| 33. Compare F-counter and J digit-register | 51 |
| 34. K digit-register | 51 |
| 35. Adder-subtracter | 51 |
| 36. Control counter generally | 60 |
| 37. Detailed description of APN instruction | 61 |

1. Building blocks generally

Before going into a detailed description of the individual units making up the electrical circuitry of the computer shown by the block diagram thereof in FIGS. 1 and 2, there will now be described the building blocks with which these individual units and interconnections therebetween are constructed. A building block is herein defined as a structure which is basic to the operation of the individual units of the computing system, and is used repeatedly in the system for amplification, logic, or other control purposes. By establishing a set of building blocks and understanding the rules for their interconnection, such a complex computing system as that heretofore generally described is more readily understood. The building blocks that are of particular importance are inverters, amplifiers, triggers, and logical circuits such as AND's and OR's, etc.

2. Inverter building blocks

The building block to be first described is the inverter, which, as the name implies, effects an inversion of the signal applied to the input thereof. In a transistor circuit, the grounder-emitter amplifier is capable of performing such an operation. Thus, in order for the inverter to perform such a task, it must produce an output signal that is "up" when the input signal is "down," or, stated another way, it must produce a signal indicative of binary "one" upon the application of a signal to its input indicative of binary "zero"; conversely, it must produce a binary "zero" signal upon the application of a binary "one" to its input. However, throughout the following description of the electrical circuitry of the instant computer, for the purposes of clarity, when the output signal is "up"—i.e., substantially at or above ground potential—it will be referred to as being "TRUE," indicative of a binary "one." However, when the output signal is "down"—i.e., below ground potential at a potential of approximately −6 volts, it will be referred to as being "FALSE," indicative of a binary "zero."

Figure 4:
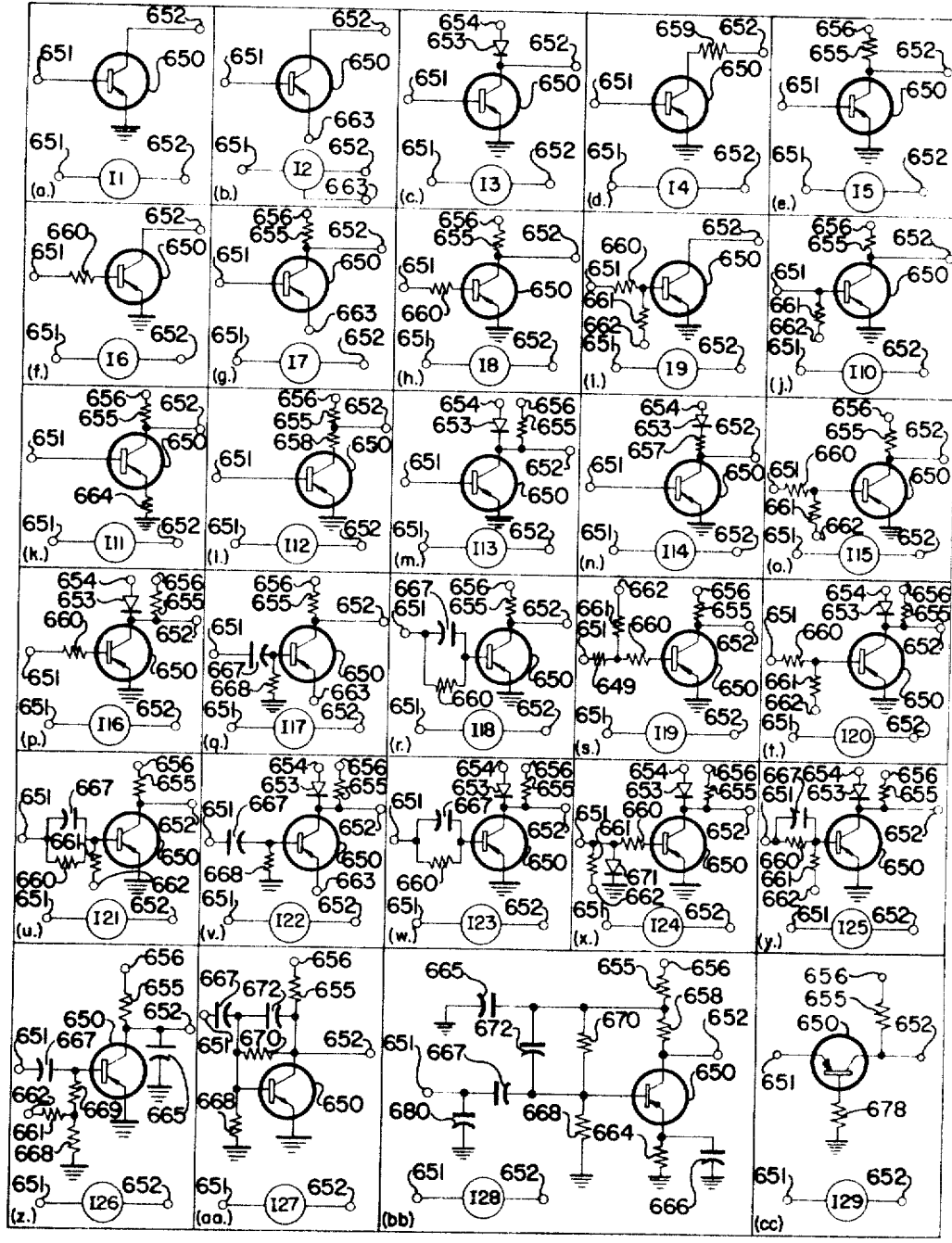

With reference to FIG. 4A, there is shown a simple grounded-emitter type inverter comprising transistor 650 having its base connected to input terminal 651 and its collector connected to output terminal 652. The symbol for this type of inverter is the notation "I1" enclosed by a circle, as shown at the bottom of the block. When a negative potential is applied to the base of transistor 650 via input terminal 651, base current flows outwardly from the base thereof toward input terminal 651. If the collector electrode of transistor 650 is connected to a negative potential via output terminal 652, emitter current flows from the emitter to the collector of transisor 650. Assuming a sufficient flow of base current, the resistance between the collector and the emitter becomes a very low value, and, as a result, output terminal 652 is essentially at ground potential, indicative of a TRUE signal. When either ground or a positive potential is applied to the base of transistor 650, the resistance between the collector and the emitter, and the resistance between the base and the emitter, are all of a substantially high value. Consequently, the values of both the base and collector currents go essentially to zero, and the voltage at output terminal 652 is thereafter negative.

Inverter (I2) shown in FIG. 4B is substantially the same as inverter (I1) of FIG. 4A, with the exception that the emitter electrode of transistor 650 is now returned to terminal 663 instead of ground potential. Inverter (I3) of FIG. 4C is essentially the same as inverter (I1) but is additionally provided with a clamping diode 653, connected between the collector of transistor 650 and bias terminal 654, to "clamp" the collector to the negative operating potential at bias terminal 654. Inverter (I4) is essentially the same as (I1) but, additionally, has a dropping resistor 659 in its output circuit. Inverter (I5) is essentially the same as (I1) but is additionally provided with a dropping resistor 655 connected between the collector of transistor 650 and bias terminal 656. (I6) is substantially the same as (I1), with dropping resistor 660 in its input circuit. (I9) is substantially the same as (I6) but further includes resistor 661, connected between the base of transistor 650 and bias terminal 662, to insure that the transistor remains non-conductive when so rendered. Inverters (I7), (I8), (I10), and (I12) through (I16) are substantially the same as (I1), except that they are additionally provided with various combinations of bias dropping resistors 655, 657, 658, and 661, clamping diodes 653, and input dropping resistor 660. (I11) is substantially the same as (I5), with dropping resistor 664 connected between the emitter of transistor 650 and ground potential. Inverter (I17) is substantially the same as (I7), except for the addition of input coupling condenser 667 and base resistor 668. The purpose of condenser 667 is to provide a large surge current in order to overdrive the transistor momentarily, to decrease the rise time of the output signal and thus increase switching speed. (I18) through (I23) and (I25) utilize various combinations of the dropping resistors, clamping diodes, and coupling condensers previously described. In (I24), diode 671 keeps the base of transistor 650 substantially at ground potential until the potential at terminal 651 becomes negative to render the transistor conductive. In (I26), bypass conductor 665, connected between collector and ground of the transistor, provides a short circuit to eliminate or attenuate undesirable high frequencies. In (I27), condenser 672 and resistor 670, each connected between collector and base of transistor 650, provide an inverse feedback to limit the gain of the stage at high frequencies. In (I28), condenser 666 and resistor 664 provide a suitable negative feedback voltage proportional to emitter current to limit the gain of the inverter stage, and also provide a degree of temperature compensation thereof; resistors 655, 658, 668, and 670 provide the necessary operating bias potentials thereto; condensers 665, 672, and 680 function as filter condensers which remove unwanted extraneous signals; and condenser 667 functions as a coupling condenser which A.C. couples input terminal 651 to the base of transistor 650. Inverter (I29)

is essentially a conventional emitter-input grounded-base amplifier with a series dropping resistor 678 in its base circuit.

3. Emitter-follower building blocks

Figure 6:
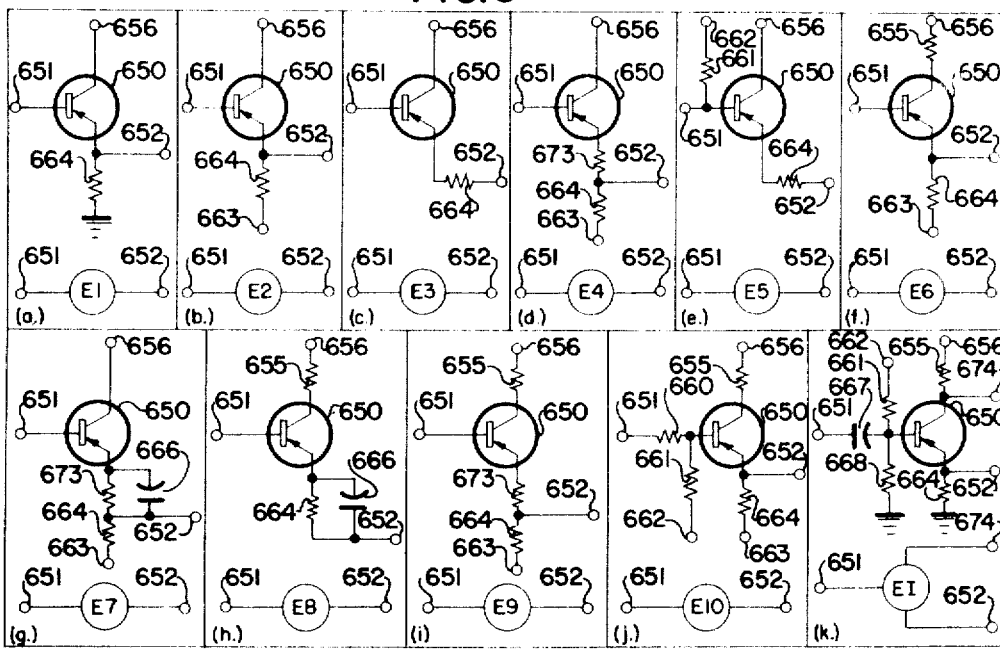

The next building block to be described is the emitter follower, which gets its name from its vacuum-tube counterpart, the cathode follower. The emitter follower type of amplifier provides power gain, has no phase inversion at low frequencies, has a slight attenuation of the input potential signal, and has a slight change in the D.C. level of the signal from input to output. With reference to FIG. 6, there are shown various types of emitter follower circuit configurations, each having a symbol which comprises the designation "E" normally followed by a numeral and both designations encompassed by a circle, as shown at the bottom of each sub-section (a) through (k) of FIG. 6.

As shown in sub-section (a), emitter-follower (E1) comprises a transistor 650 having its emitter returned to ground or reference potential through resistor 664. The collector is connected to bias terminal 656 to normally receive a suitable negative D.C. operating potential therefrom. Input terminal 651 is connected to the base, and output terminal 652 is connected to the emitter, of the transistor.

In operation, if the input signal and consequently the base of the transistor are TRUE—i.e., at ground potential—the transistor 650 is rendered substantially non-conductive, and the output at terminal 652 is therefore substantially at ground potential, or TRUE. However, when the input signal is FALSE—i.e., at a potential of −6 volts—the transistor is rendered conductive, and the potential at output terminal 652 is substantially equal to the negative potential on the base. Thus, when the input is TRUE, the output is TRUE, and, when the input is FALSE, the output is FALSE. Emitter follower (E2) in sub-section (b) is essentially the same as (E1), with the exception that the lower end of resistor 664 is returned to bias terminal 663 instead of ground potential. In (E3), output terminal 652 is connected to the emitter of transistor 650 through series dropping resistor 664. (E4) is substantially the same as (E2) but for the addition of resistor 673 between output terminal 652 and the emitter of the transistor. (E5) is essentially the same as (E3), with the addition of resistor 661 connected between the base of the transistor and bias terminal 662. (E6) is substantially the same as (E2) but for the addition of bias dropping resistor 655. (E7) is substantially the same as (E4), except that, in this instance, resistor 673 is now paralleled with bypass condenser 666. Emitter followers (E8) through (E10) and (EI) utilize various combinations of dropping and bias resistors and coupling and bypass condensers, as previously described. (EI), however, functions somewhat as both an inverter and an emitter follower in that an inverted output appears at output terminal 674, while simultaneously an output potential appears at terminal 652 which is of the same polarity or phase as the input signal.

For the sake of simplicity and brevity, the preceding building blocks were discussed but briefly. However, for a more detailed and comprehensive description thereof, reference is made to the "Handbook of Semiconductor Electronics," by L. P. Hunter, published by McGraw-Hill Book Company, Inc., wherein many similar circuit configurations are found.

4. Logical or building blocks

Performing logical operations is a well-known fundamental to the operation of a computer. The most basic logical operations are those of AND and OR. Even though many of the logical operations performed in digital computers are concerned with arithmetic operations such as addition, subtraction, division, and multiplication, herein many of the logical operations are assembled into decision-making and information-routing circuits. In order to perform such logical operations, it is generally necessary to utilize nonlinear circuit elements, such as diodes and transistors and the like.

Figure 5:
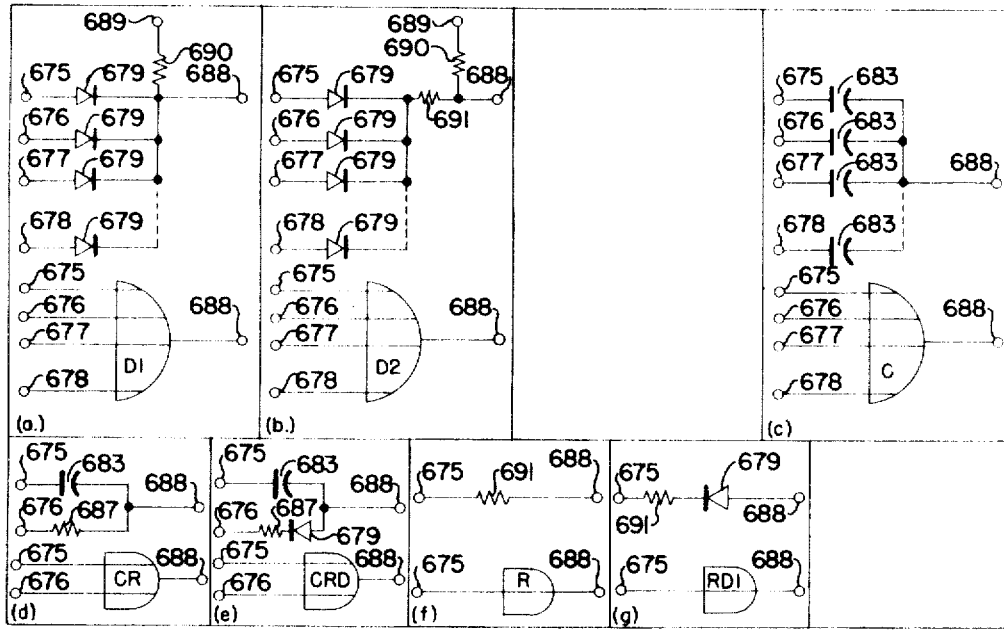

With reference to sub-sections (a) through (g) of FIG. 5, there are shown various logical OR circuit configurations. In (a), there is illustrated a logical OR building block of type (D1) comprising a plurality of diodes 679, each having its cathode connected to the other. A "pull-down" resistor 690 is connected to the junction of the diodes 679 and to bias terminal 689, which normally has a negative D.C. operating potential applied thereto. A plurality of input terminals, in this instance shown as 675 through 678, are individually connected to the anode of a different one of diodes 679, and output terminal 688 is connected to the junction of the diodes.

In operation, if the input signal to any one or all of terminals 675 through 678 is TRUE, or at a positive potential, the corresponding diode in each instance is conductive, its internal impedance is reduced substantially to zero, and consequently the potential appearing at output terminal 688 is substantially equal to the input potential. However, if the input signals to all of input terminals 675 through 678 are each at a negative potential, the output signal at terminal 688 goes negative via the negative potential at terminal 689 and resistor 690. However, the negative potential at terminal 688 is not permitted to go more negative than the least negative potential at one of input terminals 675 through 678. Thus, it is evident that the output of a logical OR circuit is TRUE (or positive) if any of the input signals to terminals 675, 676, 677, or 678 is TRUE (or positive); the output is effectively FALSE only when all of the inputs are FALSE. The symbol used herein for a logical OR is circular segment designation having the representative input lines extending through the helf-circle and terminating at the circumference thereof, as illustrated at the bottom of each of sub-sections (a) through (g).

Logical OR of type (D2), shown in (b) of FIG. 5, is substantially the same as type (D1), but for the addition of dropping resistor 691 connected between the junction of diodes 679 and resistor 690. In (c), a type (C) logical OR comprises a plurality of condensers 683, each connected to the other and connected to output terminal 688. A plurality of input terminals, illustratively shown as 675 through 678, are each connected to the remaining end of one of the condensers 683. In a type (CR) logical OR, the condenser 683 and the resistor 687 are each connected to output terminal 688, input terminals 675 and 676 being individually connected to the remaining end of the condenser and the resistor. Type (CRD) logical element is similar to type (CR) except for the addition of diode 679 connected between resistor 687 and output terminal 688. Type (R) OR comprises but a single resistor 691 connected between input terminal 675 and output terminal 688, and type (RD1) OR comprises a series-connected resistor 691 and diode 679, connected between input terminal 675 and output terminal 688.

5. Logical "and" building blocks

Figure 7:
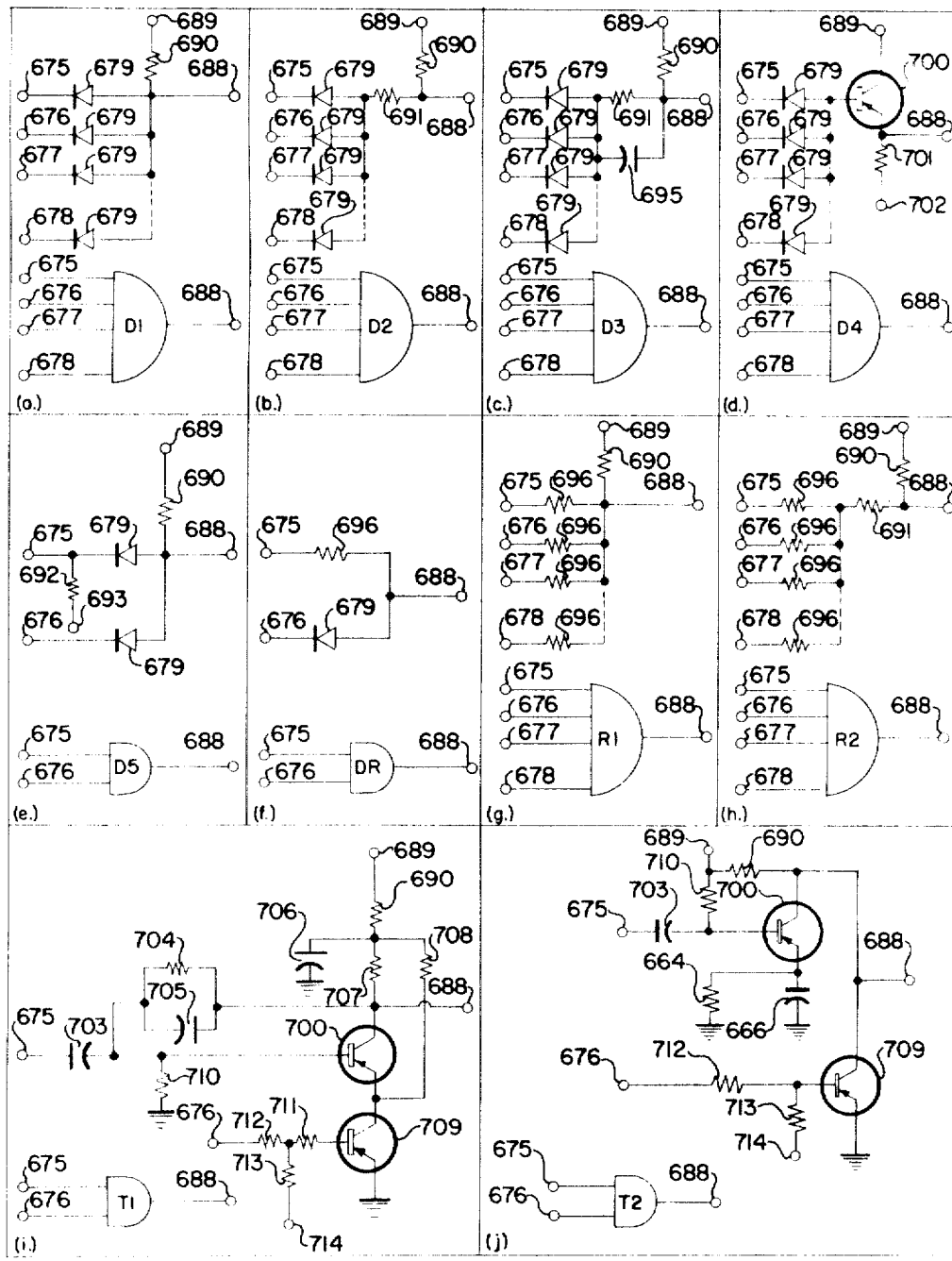

With reference to FIG. 7, there is illustrated a logical AND building block of type (D1) which comprises a plurality of diodes 679, each having their anodes connected together and connected to output terminal 688. A plurality of input terminals, illustratively shown as 675 through 678, are each individually connected to the cathode of a different one of diodes 679. A "pull-up" resistor 690 is connected to the junction of diodes 679 and to bias terminal 689, which is normally supplied with a suitable positive D.C. operating potential having a magnitude, in most instances, of 6 volts.

In operation, when the input signal to each of the input terminals 675 is TRUE—i.e., at zero or ground potential—the output signal at terminal 688 goes substantially to ground potential via the positive potential at bias terminal 689 and resistor 690. However, if any one or more of the input signals goes FALSE (−6 volts), the corresponding diode is conductive, and, consequently, the output signal at terminal 688 is substantially at −6 volts (FALSE). Therefore, it is seen that in a logical AND circuit, as just described, the output signal remains FALSE as long as any one or more of the input signals are FALSE; the output signal goes TRUE only when all of the input signals go TRUE and at no other time.

Type (D2) AND circuit shown in (b) is essentially the same as the (D1) type except for the addition of dropping resistor 691 connected between the anodes of the diodes 679 and the output terminal 688. The (D3) type shown in (c) is substantially the same as the (D2) type but for the addition of bypass condenser 695 connected in parallel with the dropping resistor 691. In the (D4) type of logical AND circuitry shown in (d), pull-up resistor 690 has been omitted and replaced with a circuit comprising transistor 700, having its base connected to the junction of the diodes 679. The collector of the transistor 700 is connected to bias terminal 689, having a negative D.C. operating potential of approximately 6 volts applied thereto. The emitter of transistor 700 is connected to output terminal 688 and is also connected to one end of resistor 701, the opposite end of resistor 701 being connected to bias terminal 702 having a positive D.C. operating potential of approximately 6 volts applied thereto. By the use of such an emitter follower type amplifier essentially as a pull-up resistor, a power gain of the output signal results, the input and output signals thereto being at all times of the same polarity as previously described with respect to the emitter follower type building blocks.

The (D5) type AND circuit shown in (e) is substantially the same as the (D1) type except for the addition of bias resistor 692, connected between input terminal 675 and bias terminal 693, which has applied thereto a negative D.C. operating potential. The (DR) type AND shown in (f) is somewhat different, in that resistor 696 now constitutes the pull-up resistor even though it is connected to one of the input terminals such as 675. In operation, if the input signal to either or both of input terminals 675 and 676 is FALSE (−6 volts), the signal at output terminal 688 is likewise FALSE. However, if the input signal to both of the input terminals is TRUE (ground potential), the signal at output terminal 688 is likewise TRUE, as in the logical AND circuits just described.

In (g) there is shown a resistor type of logical AND circuitry (R1) which comprises a plurality of resistors 696, each connected to output terminal 688 and having the remaining end thereof individually connected to one of a plurality of input terminals, illustratively shown as 675 through 678. A pull-up resistor 690 is connected at one end to the junction of resistors 696 and is connected at its remaining end to bias terminal 689, which has applied thereto a positive D.C. operating potential. This particular type of AND circuitry, however, does not render a TRUE or FALSE output signal respectively represented by a zero or a negative potential. In this instance, the TRUE or FALSE representation is by a positive or a negative output signal which is fed as an input signal to a suitable amplifier which re-establishes the proper voltage levels therefrom; i.e., zero and minus potentials indicative of TRUE and FALSE, respectively.

The operation of the device is as follows: The various resistor values are properly chosen so that, when all of the input signals to terminals 675 through 678 are TRUE (ground potential), the output signal at terminal 688 is positive by an amount proportional to the resistor divider network. However, should any one or more of the input signals be FALSE (negative), the output signal is also negative by an amount proportional to the resistor divider network, consequently FALSE also. AND circuit (R2) shown in (h) is substantially the same as type (R1) except for the addition of dropping resistor 691 connected between the junction of resistors 696 and output terminal 688.

In (i) there is shown a transistor type logical AND (T1) which utilizes a pair of transistors 700 and 709. Input terminal 675 is connected to the base of transistor 700 through coupling condenser 703, whereas input terminal 676 is connected to the base of transistor 709 through series connected resistors 711 and 712. Bias resistor 713 is connected to the junction of resistors 711–712 and is connected to bias terminal 714, which has applied thereto a suitable positive D.C. operating potential. The base of transistor 700 is returned to ground potential through resistor 710 and is also connected to the collector thereof through parallel-connected resistor 704 and condenser 705. The emitter of transistor 700 is connected to the collector thereof through series-connected resistors 707 and 708. The junction of resistors 707–708 is returned to A.C. ground through condenser 706 and is connected to bias terminal 689 through dropping resistor 690 connected therebetween, bias terminal 689 having applied thereto a suitable negative D.C. operating potential. The emitter of transistor 700 is directly connected to the collector of transistor 709, whereas the emitter of transistor 709 is directly returned to ground potential. Output terminal 688 of the logical AND gate is directly connected to the collector of transistor 700.

In operation, if the input signal at terminal 676 is sufficiently negative, transistor 709 is rendered conductive and thus presents a very low resistance from the emitter of transistor 700 to ground. Consequently, transistor 700 functions in the same manner as a conventional "class A" inverter type amplifier such that A.C. signals of the proper frequency appearing at terminal 675 appear amplified and inverted at output terminal 688. However, if the input signal at terminal 676 is ground, transistor 709 is rendered non-conductive and thus appears as a very high resistance from the emitter of transistor 700 to ground. Consequently, since no emitter current can flow through transistor 700, signals appearing at input terminal 675 are not amplified by transistor 700. Thus it is seen that, when input terminal 676 is negative, A.C. signals appearing at terminal 675 appear amplified and inverted at output terminal 688; when input terminal 676 is ground, A.C. signals appearing at terminal 675 do not so appear as amplified and inverted at output terminal 688.

In (j) there is shown a second type of transistor logical AND (T2), which also utilizes a pair of transistors 700 and 709. Input terminal 675 is connected to the base of transistor 700 through coupling condenser 703, whereas input terminal 676 is connected to the base of transistor 709 through series-connected resistor 71. The emitter of transistor 709 is returned through series-dropping resistor 713 to bias terminal 714 having a suitable positive unidirectional operated potential applied thereto. The emitter of transistor 700 is returned to ground potential through a parallel-connected resistor and condenser network 664 and 666, whereas the base of transistor 700 is returned through series-dropping resistor 710 to bias terminal 689, which has a suitable negative unidirectional bias potential applied thereto. The collector of transistor 700 is connected to bias terminal 689 through series-dropping resistor 690 and is also connected to the collector of transistor 709 with both of the collectors of transistors 700 and 709 being connected to output terminal 688.

In operation, if the input signal at terminal 676 is TRUE, transistor 709 is rendered non-conductive and appears as a very high resistance from output terminal 688 to ground. Transistor 700 normally is conductively-biased near saturation in such a manner that output terminal 688 is near ground potential. Thus, when positive-going pulses appear at input terminal 675, they appear amplified and inverted at output terminal 688. However, if input terminal 676 is FALSE, transistor 709 is rendered conductive, and its collector current flows through resistor 690 to bias terminal 689. This collector current is of sufficient magnitude that, even though no collector current were present in transistor 700, the potential at output terminal 688 is substantially ground. Thus, when positive-going signals appear at terminal 675, the resulting change in collector current of transistor 700 produces essentially no appreciable change of potential of output terminal 688. Therefore, when input terminal 676 is TRUE, positive-going pulses at input terminal 675 appear as amplified and inverted at output terminal 688; however, when input terminal 676 is FALSE, output terminal 688 remains essentially at ground potential, even though input positive-going signals appear at terminal 675.

6. Flipflop and multivibrator building blocks

Figure 8:
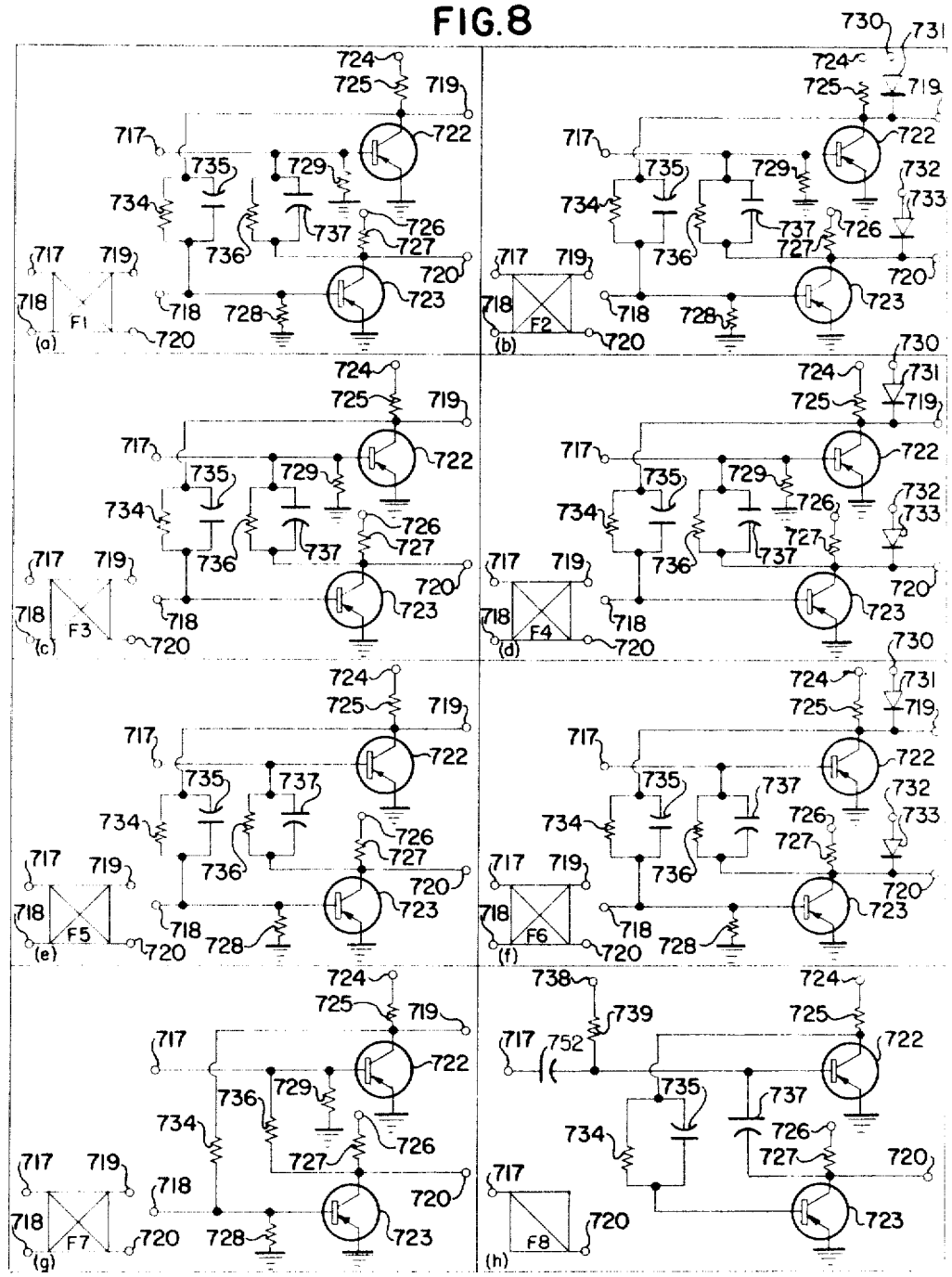

The "flipflop" building block is normally composed of two inverters, as shown in FIG. 8, which are connected in cascade with the input of each one being connected to the output of the other. As shown in section (a) of FIG. 8, flipflop of the (F1) type consists of two grounded emitter transistors 722 and 723 having input terminals 717 and 718 respectively connected to the base electrode, and output terminals 719 and 720 respectively connected to the collector electrode of transistors 722 and 723. The base of transistor 723 is connected to the collector of transistor 722 through parallel connected resistor 734 and condenser 735, whereas the base of transistor 722 is connected to the collector of transistor 723 through parallel connected resistor 736 and condenser 737. The base of each of transistors 722 and 723 is returned to ground potential through resistors 729 and 728, respectively, whereas the collector thereof is respectively connected through dropping resistors 725 and 727 to bias terminals 724 and 726, which have applied thereto a suitable negative unidirectional operating potential.

In order to describe a mode of operation, it will first be assumed that transistor 722 is non-conductive and transistor 723 is conductive. Thus, when the input signal to terminal 717 goes negative, transistor 722 is now rendered conductive, the internal impedance thereof drops essentially to zero, and consequently the output signal at terminal 719 is thereafter TRUE (i.e., at ground potential). In addition, when transistor 722 is rendered conductive, the base of transistor 723 is momentarily driven positive via coupling condenser 735, and, consequently, transistor 723 is rendered non-conductive. Transistor 723 being non-conductive, the output signal at terminal 720 is FALSE. A negative bias potential applied from terminal 726 to the base of transistor 722 via resistor divider network 727–736–729 insures that transistor 722 remains conductive when the input signal to terminal 717 is no longer present. Consequently, as terminal 719 is essentially at ground potential, very little base current is supplied to transistor 723 via resistor 734, and, as a result, transistor 723 remains non-conductive. Thus, the flipflop is now operating in one of its two stable states. It is to be noted at this point that during normal operation, a crystal diode, forming a part of a suitable triggering circuit, to be described later, is usually connected in series with each of input terminals 717 and 718 in such a manner that the states of both of transistors 722 and 723 remain unchanged even though the input signals to terminals 717 and 718, via their respective triggering circuit diode, effectively changes from FALSE back to a TRUE condition, respectively. In other words, the only time the states of transistors 722 and 723 change is only when the input signal to one of the terminals 717 and 718 goes from TRUE to FALSE. Now, when the input signal to terminal 718 goes negative, transistor 723 is rendered conductive, the output at terminal 720 is now TRUE, and the base of transistor 722 is momentarily driven positive and thereby renders transistor 722 non-conductive. Transistor 722 being non-conductive, the output at terminal 719 is FALSE, and a negative bias is applied from terminal 724 to the base of transistor 723 via network comprising resistors 725, 734, and 728, and coupling condenser 735, to insure that transistor 723 remains conductive. As before stated, insufficient base current is supplied to transistor 722, and, consequently, transistor 722 remains non-conductive. Thus, the flipflop is now operating in the other of its two stable states.

To summarize: When the input signal at terminal 717 momentarily goes negative, the flipflop is triggered to one of its two stable states, so that the output at the terminal 719 is TRUE (if not already TRUE) and the output at terminal 720 is FALSE; however, when the input to terminal 718 momentarily goes negative, the flipflop is reset to its initial state, so that the output at terminal 719 is now FALSE and the output at terminal 720 is now TRUE. If, for some reason, the input signals to both of terminals 717 and 718 simultaneously go momentarily negative, the flipflop will change state regardless of the state in which it was initially.

In order to simplify the following description of the computer circuitry as much as possible, input terminal 717 will hereinafter be referred to as the "reference input," input terminal 718 the "prime input," output terminal 719 the "reference output," and output terminal 720 the "prime output."

In (c), flipflop of type (F3) is essentially the same as (F1) with the omission of base resistor 728, whereas, in (e), flipflop of type (F5) is essentially the same as (F1) with the omission of base resistor 729. In (b), (d), and (f), flipflops of type (F2), (F4), and (F6) are essentially the same as flipflops (F1), (F3), and (F5), respectively, except for the addition of clamping diodes 731 and 733, which are utilized to fix the OFF level of the collector voltages of transistors 722 and 723, respectively, as heretofore stated, when the transistor is non-conductive. In (g), flipflop of type (F7) is essentially the same as flipflop (F1) with the omission of coupling condensers 735 and 737.

With reference to (h), there is shown a "single-shot" type flipflop (F8) which is somewhat of the same circuit configuration as (F1), except that in (F8) there are omitted base resistors 728 and 729, resistor 736, prime input terminal 718, and reference output terminal 719. However, there have been added a bias resistor 739, connecting the base of transistor 722 with bias terminal 738, which has a negative unidirectional operating potential applied thereto, and a coupling condenser 752, coupling the base of transistor 722 to reference input terminal 717.

The mode of operation of (F8) is not, however, as straightforward as the mode of operation of the just-described flipflops. In (F8), as a negative unidirectional bias potential from terminal 738 is normally maintained on the base of transistor 722, it is normally conductive and thus maintains the base of transistor 723 substantially at ground potential via resistor 734. The base of transistor 723 being at ground potential, the transistor is therefore normally non-conductive, and, consequently, the prime output at terminal 720 is normally FALSE. However, when the reference input goes from FALSE to TRUE (i.e., at ground potential), the base of transistor 722 is momentarily driven positive by condenser 752, and thus transistor 722 is immediately cut off and applies a negative potential spike via condenser 735 to turn on transistor 723. When transistor 723 is rendered conductive, the prime output at terminal 720 immediately goes TRUE. Since the charge on condenser 737 cannot change instantaneously, the base of transistor 722 is driven to some positive potential to maintain transistor 722 non-conductive even though the input signal at terminal 717 is no longer present. After a predetermined time delay, determined primarily by the discharge rate of condenser 737, a negative bias potential again appears on the base of transistor 722 to render it conductive. When transistor 722 is rendered conductive, the base of transistor 723 is momentarily driven positive and thereafter maintained essentially at ground potential by resistor 734 to turn off transistor 723, and thus the prime output at terminal 720 is again FALSE.

To summarize: The prime output is normally FALSE; a positive-going reference input gives an immediate TRUE prime output; however, after a predetermined time delay, the prime output changes from TRUE back to FALSE.

Figure 9:
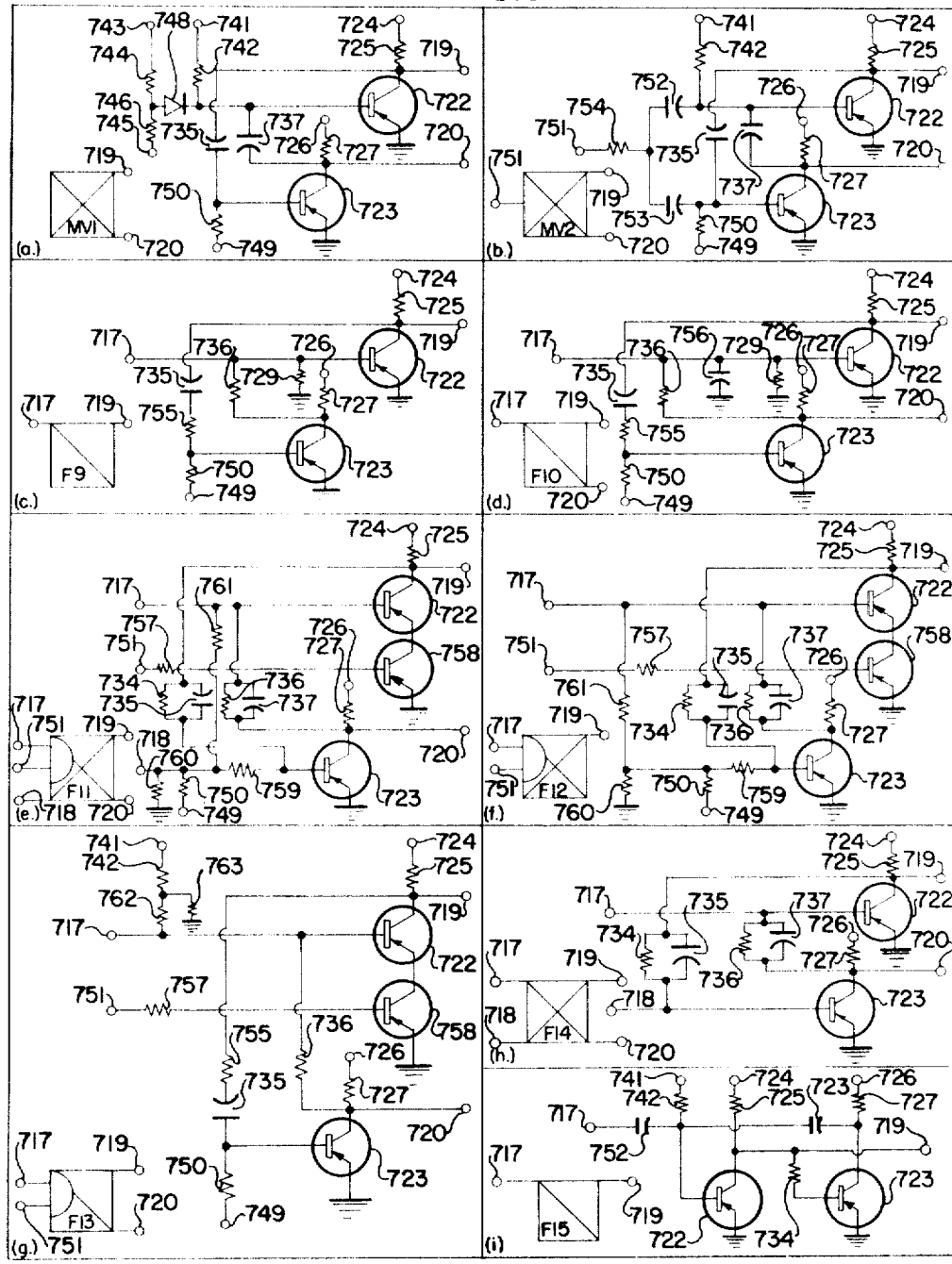

In section (*a*) of FIG. 9, there is shown a 50-kc. multivibrator building block (MV1) which comprises two grounded-emitter transistors 722 and 723, each having its collector electrode respectively connected, through dropping resistors 725 and 727, to bias terminals 724 and 726, which have negative unidirection operating potentials applied thereto. The collector output of transistor 722 is connected to the base input of transistor 723 via coupling condenser 735, whereas the collector output of transistor 723 is connected to the base input of transistor 722 via coupling condenser 737. The base of transistors 722 and 723 are respectively connected through dropping resistors 742 and 750 to bias terminals 741 and 749, each having a negative unidirectional operating potential applied thereto. The base of transistor 722 is connected to the cathode of crystal diode 748, whose anode is connected to the junction of resistors 744 and 746. Resistor 744 is connected at its opposite end to bias terminal 743, which has a positive unidirectonal operating potential applied thereto, whereas resistor 746 is connected at its opposite end to bias terminal 745, which has a negative unidirectional operating potential applied thereto.

The mode of operation of multivibrator (MV1) is as follows: When the circuit is first activated, the positive unidirectional operating potential at terminal 743 is the first to be turned on to apply a positive bias to the base of transistor 722. Therefore, when the negative bias potentials at 724, 741, and 749 are simultaneously turned on, transistor 722 is rendered non-conductive, the reference output at terminal 719 is FALSE, and a negative potential spike is applied to the base of transistor 723 via coupling condenser 735 to cause transistor 723 to be conductive. When transistor 723 is rendered conductive, the prime output at terminal 720 is TRUE, and condenser 737 begins to charge to a potential substantially equal to the negative bias potential at terminal 741. When condenser 737 is sufficiently charged, the potential on the base of transistor 722 is negative to the extent that transistor 722 is rendered conductive, the reference output goes from FALSE to TRUE, transistor 723 is rendered non-conductive, and consequently the prime output simultaneously goes from TRUE to FALSE. When condenser 735 is sufficiently charged from the negative source at terminal 749, the base of transistor 723 is then negative to the extent that the transistor is rendered conductive, the prime output goes from FALSE back to TRUE, transistor 722 is rendered non-conductive, and the reference output goes from TRUE back to FALSE. This sequence of events is repeated at a rate determined by the time constants in the charging and discharging paths of coupling condensers 735 and 737. In the instant computer, multivibrator (MV1) operates at a frequency of 50 kilocycles.

In (*b*), multivibrator (MV2) is essentially the same as (MV1) except that bias resistors 744 and 746 and crystal diode 748 are omitted and replaced by coupling condensers 752 and 753 respectively connected to the base of transistors 722 and 723. A dropping resistor 754 is connected at one end to the junction of condensers 752 and 753 and is connected at the remaining end thereof to input terminal 751.

Ignoring for the moment condensers 752 and 753 and resistor 754, the mode of operation of multivibrator (MV2) is substantially the same as that of (MV1), the frequency of (MV2) being determined, as before, by the time constants in the charging and discharging paths of coupling condensers 735 and 737. In the instant computer, multivibrator (MV2) operates at a frequency of 400 cycles per second. However, in order to synchronize the change of state of the output of (MV2) with a "clocking" network, to be described hereinafter, a "clocking" signal from such network is fed as the input to terminal 751 of (MV2) and synchronization of the 400-cycle output of (MV2) with the "clocking" network takes place.

Assuming that transistor 723 has just been rendered conductive and transistor 722 has just been rendered non-conductive, the base of transistor 722 is driven positive via condenser 737, as previously described, and condenser 737 is now charging toward the negative potential at terminal 741. At the same time, a rectangularly-shaped clock pulse at input terminal 751 causes positive-going and negative-going potential spikes to be superimposed on the potential appearing on the base of transistor 722 in such a manner that, when the potential on the base of transistor 722 is approaching the value sufficient to render transistor 722 conductive, a succeeding negative-going potential spike, caused by the clock pulse at terminal 751, is sufficient to render transistor 722 conductive. Thus, even though the time period of (MV2) is much longer than that of the synchronizing clock pulse, the change of state of (MV2) takes place at the same time the clock input goes from TRUE to FALSE.

The single-shot flipflop of type (F9), as shown in (*c*), comprises a pair of grounded emitter transistors 722 and 723, whose collectors are individually returned to negative bias terminals 724 and 726 through dropping resistors 725 and 727, respectively. The base of transistor 722 is returned to ground potential through resistor 729 and is also connected to input terminal 717. The base of transistor 722 is further connected to the collector of transistor 723, whereas the base of transistor 723 is connected to the collector of transistor 722 through series-connected resistor 755 and condenser 735, the base of transistor 723 being further connected to a negative bias terminal 749.

The mode of operation of flipflop (F9) is essentially the same as that of the previously-described flipflop (F8), and, consequently, a further detailed description thereof is not deemed necessary. The essential difference between (F9) and (F8) is that in (F9) the mode of triggering is such that a momentary negative-going potential at input terminal 717 causes a change of state of the flipflop, whereas in flipflop (F8) a momentary positive-going potential at input terminal 717 causes a change of state thereof.

Flipflop of the (F10) type, as shown in (*d*), is of substantial identical circuit configuration with (F9), except for the addition of bypass condenser 756, which bypasses to ground undesirable extraneous signals. Flipflops (F11) through (F13) are essentially the same as the previously described flipflops. The main difference is the addition of a third transistor 758, which is connected in series with the emitter circuit of transistor 722. In a sense, transistors 722 and 758 operate together in the form of a transistor type of logical AND circuitry, in that it is necessary for both to be conductive in order for the reference output to be TRUE. As is evident from the previous description, this can happen only when the inputs to both of terminals 717 and 751 are simultaneously negative. Flipflop of type (F14), shown in (*h*), is essentially the same as the previously described (F1) type, except for the omission of base resistors 728 and 729. Flipflop of type (F15) is essentially the same as flipflop of type (F8), except that in (F15) condenser 735 is removed.

7. Miscellaneous building blocks

With reference to (*a*) and (*b*) of FIG. 10, there are shown two types of pulse-shaping triggering circuits (TC1) and (TC2) which are utilized to provide "spike-type" triggering impulses for the various flipflops, in (*c*) and (*d*) are simple resistor-condenser networks, and in (f) is shown a resistor-condenser filter and biasing circuit which is used in conjunction with the various pushbutton controls, all of which are to be further shown hereinafter. As the modes of operation of the various types of circuitry (a) through (d) and (f) are well known to those skilled in the art, a detailed description thereof is not deemed necessary for a full and complete understanding of the present invention.

Figure 10:
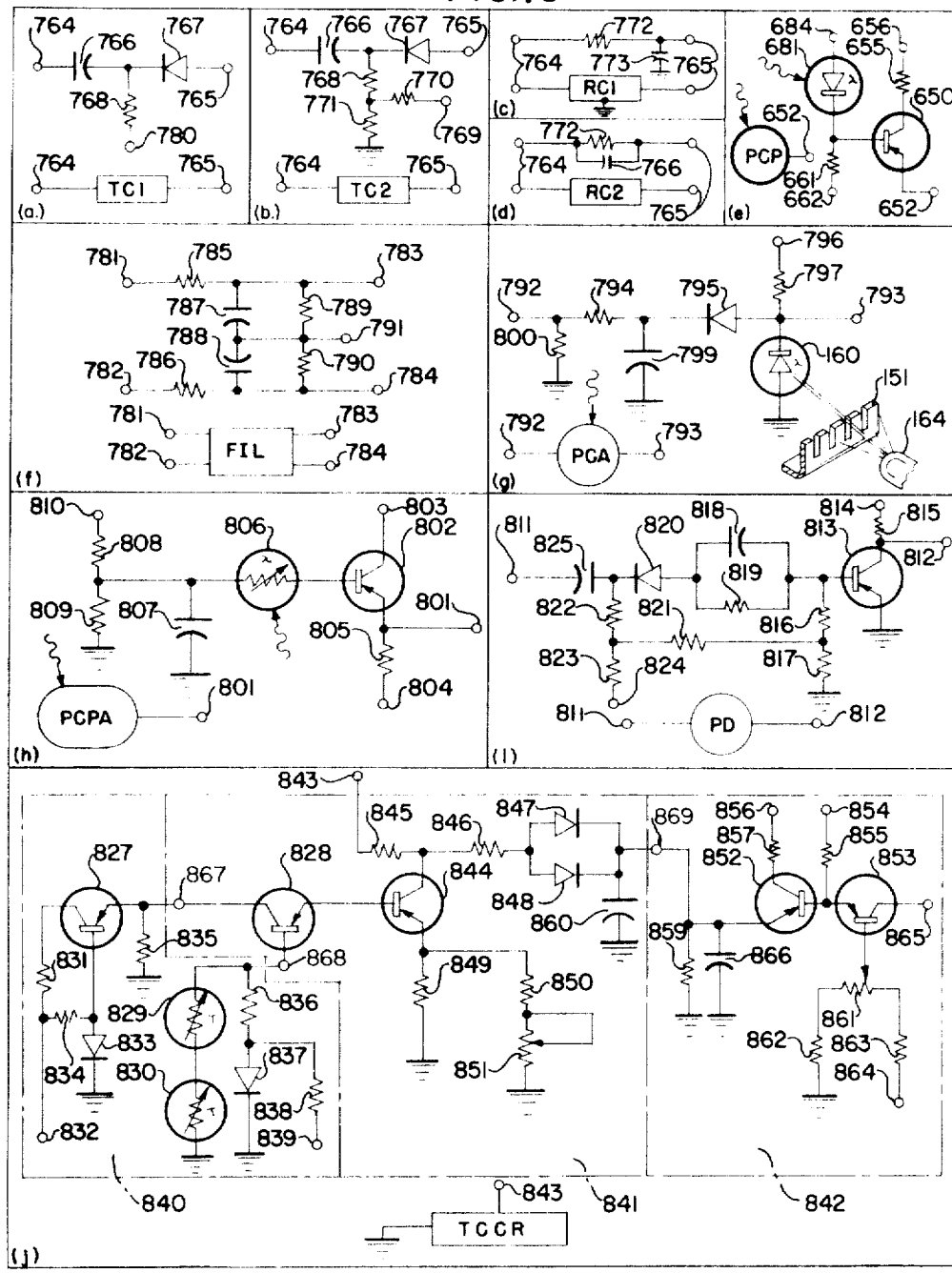

In section (g) of FIG. 10 there is shown a photocell circuit configuration (PCA) utilizing photocell 160 as the controlling element therein. In such circuitry, the anode of photocell 160 is grounded, and its cathode element is connected to output terminal 793. The cathode of photocell 160 is also connected through dropping resistor 797 to bias terminal 796 having a positive unidirectional operating potential applied thereto. The anode of crystal diode 795 is connected to the junction of output terminal 793, resistor 797, and photocell 160. Its cathode is bypassed to ground potential through condenser 799. The cathode of diode 795 is also connected to input terminal 792 through dropping resistor 794, and resistor 800 is connected between input terminal 792 and ground potential. As will be seen later, input terminal 792 is adapted to be selectively "open-circuited" or "short-circuited"; when open-circuited, the resistance between terminal 792 and ground is determined by the value of resistor 800, whereas, when short-circuited, the resistance between terminal 792 and ground is zero.

The mode of operation of (PCA) is somewhat straightforward. Assuming that terminal 792 is open-circuited and photocell 160 is non-exposed to the radiant energy from light source 164, the internal resistance of photocell 160 is at a maximum value such that the output potential at terminal 793 is at a maximum positive level. However, when photocell 160 is exposed to the radiant energy from light source 164, its internal impedance is decreased to a low value, and, consequently, the output at terminal 793 is decreased to a smaller value of positive potential. As will be seen later, the output from terminal 793 is normally fed as an input to a previously described inverter type amplifier which establishes the proper TRUE and FALSE logic signal levels in a well-known manner. The value of resistor 797 is properly chosen so as to be substantially greater than the value of resistor 794. Consequently, when input terminal 792 is short-circuited to ground potential, the output signal level at terminal 793 drops essentially to zero potential whether or not photocell 160 is exposed to light source 164.

With reference to FIG. 10e, a second type of photocell circuit configuration includes a transistor 650 having its emitter electrode connected to output terminal 652 and having its collector electrode connected through dropping resistor 655 to bias terminal 656, which has a negative unidirectional operating potential applied thereto. The base electrode of transistor 650 is connected to the junction of the anode of photocell 681 and bias dropping resistor 661, the opposite end of resistor 661 being connected to bias terminal 662, which has a positive unidirectional operating potential applied thereto. The cathode of photocell 681 is connected directly to bias terminal 684, which has a negative unidirectional operating potential applied thereto.

The mode of operation of such a circuit configuration is as follows: When photocell 681 is non-exposed to radiant energy, so that its resistance is at a maximum value, the potential on the base of transistor 650 is at a maximum positive value, and transistor 650 is thereby rendered non-conductive. However, when photocell 681 is exposed to radiant energy, its resistance is reduced to a substantially low value, so that a negative potential from terminal 684 is applied to the base of transistor 650 and thereby renders transistor 650 conductive.

In section (h) there is shown a photocell pre-amplifier circuit configuration (PCPA) which comprises a transistor 802 having its collector electrode connected to bias terminal 803, which has a negative unidirectional operating potential applied thereto. The emitter thereof is directly connected to output terminal 801 and is also connected through series dropping resistor 805 to bias terminal 804, which has a positive unidirectional operating potential appled thereto. The base electrode of transistor 802 is connected to one electrode of photoresistive element 806, whose remaining electrode is bypassed to ground potential through condenser 807. The junction of condenser 807 and photoresistor 806 is connected to the junction of resistors 808 and 809, remaining end of resistor 809 being grounded and the remaining end of resistor 808 being connected to bias terminal 810, which has applied thereto a negative unidirectional operating potential.

The mode of operation of photocell pre-amplifier (PCPA), again, is somewhat similar to the mode of operation of (PCA), previously described. When photoresistor 806 is exposed to radiant energy from a suitable light source, its internal resistance becomes a very low value, and, consequently, a negative potential is applied to the base of transistor 802, so that the output potential at terminal 801 is substantially that which appears on the base thereof, all in the same manner as previously described with respect to emitter-follower (E2) shown in section (b) of FIG. 6. However, when photoresistor 806 is not exposed to radiant energy, transistor 802 is virtually non-conductive, and the polarity of the output potential at terminal 801 is positive. As before stated with respect to photocell network (PCA), the output at terminal 801 appears as an input to a suitable amplifier which establishes the proper TRUE and FALSE logical signal levels.

With reference to section (i) of FIG. 10, there is illustrated a "peak-detector" circuit configuration (PD) which is utilized to detect the peaks of negative-going impulses, the reasons for which will become more apparent hereinafter. Such a detector comprises a grounded-emitter transistor 813, whose collector electrode is connected to output terminal 812 and is also connected through dropping resistor 815 to bias terminal 814, which has a negative unidirectional operating potential applied thereto. The base input of transistor 813 is returned to ground potential through series-conected resistors 816 and 817, and is also connected to one end of a parallel-connected condenser and resistor network 818–819. The opposite end of the condenser-resistor network 818–819 is connected to the anode of crystal diode 820, whose cathode is coupled to input terminal 811 through condenser 825. The junction of condenser 825 and crystal diode 820 is connected through series-connected resistors 822 and 823 to bias terminal 824, which has a positive unidirectional operating potential applied thereto. Finally, a resistor 821 is connected between the junction of resistors 822–823 and the junction of resistors 816–817.

The relative values of the various resistor components are properly chosen so that a relatively small-valued positive bias appears on the base of transistor 813 to render the transistor normally non-conductive, so that the output at terminal 812 is normally FALSE (i.e., negative). However, a positive bias of slightly greater value appears on the cathode of crystal diode 820 to "back-bias" and thereby render diode 820 non-conductive. Thus, when the leading slope of a negative-going impulse appears at input terminal 811, crystal diode 820 remains non-conductive until the leading slope reaches a predetermined threshold level, thereby preventing any undesirable low-level noise impulses from entering the system. However, after the leading slope of the negative-going impulse exceeds the negative threshold level, diode 820 is rendered conductive, the incoming impulse is differentiated, and the negative-going potential "spike," derived from the differentiation, is applied to the base of transistor 813 and simultaneously begins to charge condenser 818. When the negative-going spike is applied to the base of transistor 813, the transistor is rendered conductive, and the output at terminal 812 is thereafter TRUE. However, when the peak of the negative-going impulse begins to appear at terminal 811, the slope of the impulse is now much less than before, so that condenser 818 begins to discharge and thereby decreases the magnitude of the negative bias potential on the base of transistor 813. When the peak of the incoming impulse appears at terminal 811, its slope being zero, condenser 818 is now fully discharged, and a positive bias is applied to the base of transistor 813 to render the transistor non-conductive. As a result, the output at terminal 812 reverts from a TRUE condition back to a FALSE condition at a time coincidental with the arrival of the negative peak of the incoming impulse.

During operation of the memory of the present computer, it was found that, when the ambient temperature of a ferromagnetic memory core is increased above normal room temperature, less drive current is needed to "switch" the core from one stable state of magnetic remanence to the other. Conversely, when its operating temperature is decreased, a drive current of greater magnitude is necessary. Consequently, means are provided for automatically increasing and decreasing the drive current to the memory, depending upon whether its temperature has respectively decreased or increased above nominal room temperature.

With reference to the final building block in section (j), there is shown a temperature-compensated current regulator (TCCR) which comprises a current control section 840, a regulator section 841, and a "dummy load" voltage section 842. The current control section 840 comprises a transistor 827, whose base is connected to the anode of a Zener diode 833, the cathode of diode 833 being returned to ground potential. The emitter of transistor 827 is connected to terminal 867 and is also returned to ground potential through resistor 835. The collector and base electrodes of transistor 827 are respectively returned to bias terminal 832 through resistors 831 and 834, bias terminal 832 having a suitable negative operating potential applied thereto. Two series-connected thermisters 829 and 830 are connected between terminal 868 and ground potential, whereas resistor 836 is connected between terminal 868 and the anode of Zener diode 837, the cathode of diode 837 being returned to ground potential. A dropping resistor 838 is connected between the junction of resistor-diode 836–837 and bias terminal 839, which has a suitable negative unidirectional operating potential applied thereto.

Regulator section 841 comprises a transistor 828 having its collector electrode connected to terminal 867, the base electrode connected to terminal 868, and the emitter electrode connected to the base of transistor 844. The emitter of transistor 844 is returned to ground potential through resistor 849 and also through series-connected resistor 850 and potentiometer 851. The collector of transistor 844 is connected to output terminal 843 through dropping resistor 845, and is also connected through dropping resistor 846 to the anodes of parallel-connected crystal diodes 847 and 848. Each cathode of diodes 847 and 848 is connected to terminal 869, which is bypassed to ground potential by means of filter condenser 860.

The dummy-load voltage section 842 of the current regulator comprises transistor 852, whose emitter is connected to terminal 869 and is also returned to ground potential through resistor 859, which is bypassed by condenser 866. The collector of transistor 852 is connected through dropping resistor 857 to bias terminal 856, which has a suitable negative unidirectional operating potential applied thereto. The base of transistor 852 is connected to the emitter of transistor 853 and is also connected through dropping resistor 855 to bias terminal 854, which has a negative unidirectional operating potential applied thereto. The collector of transistor 853 is directly connected to bias terminal 865, which has a negative unidirectional operating potential applied thereto, whereas its base is connected to the movable arm of potentiometer 861. One end of potentiometer 861 is returned to ground potential through resistor 862, and its opposite end is connected through resistor 863 to bias terminal 864, which has a negative unidirectional operating potential applied thereto.

During operation, thermisters 829 and 830 are physically positioned in close proximity to the memory matrix, and, being in such contiguous relationship with respect to the ferrite cores of the memory, the resistance of each thermister either increases or decreases in response to a corresponding decrease or increase of the operating temperature of the memory cores. Zener diode 833 maintains a regulated bias potential of approximately −6 volts on the base of transistor 827, and, as transistor 827 is being operated as an emitter follower type amplifier, a regulated collector bias potential of approximately −6 volts is also applied to the collector of transistor 828, which is likewise operating as an emitter follower type amplifier. Zener diode 837 maintains a regulated bias potential of approximately −6 volts at the junction of resistors 836 and 838. Consequently, the variation of bias potential on the base of amplifier 828 is dependent solely upon the combined values of the resistances of thermisters 829 and 830, which, in turn, are dependent upon the operating temperature of the computer memory. Therefore, it is evident that the negative bias voltage on the base of transistor 844 is likewise dependent primarily upon the operating temperature of the computer memory.

During operation of the computer, there are times when there is no information either being "stored" or being "read out" of memory. Consequently, there are times when transistor 844 is not supplying any drive current to the memory. Due to the fact that the "alpha cutoff" characteristic of transistor 844 is less than one megacycle, its switching speed is not sufficient for the desirable switching requirements of the ferrite cores. Therefore, transistor 844 is maintained conductive at all times, and its output current is switched to the ferrite cores, when needed, or is adsorbed by dummy load 842, as the situation dictates.

The two emitter follower type amplifiers 852 and 853 of dummy load 842 function together essentially as a 600 ma. low impedance bias supply and provides a bias potential of approximately −8.5 volts at terminal 869, depending upon the setting of potentiometer 861, which adjusts the magnitude of the output voltage. Under the condition in which the various memory "driver" and "grounder" amplifiers, which are to be described in detail hereinafter, are non-conductive, diodes 847 and 848 are biased in the forward direction by the negative potential at terminal 869, and, consequently, the drive current, delivered by transistor 844, passes through diodes 847 and 848 and is adsorbed by the dummy load. However, when the memory drivers and grounders are rendered conductive, the collector bias voltage on transistor 844 becomes approximately −10 volts and, consequently, is then more negative than the bias voltage at terminal 869. Therefore, diodes 847 and 848 are rendered non-conductive and prevent any further drive current from flowing therethrough. As a result, all of the drive current supplied by transistor 844 flows from terminal 843 and is delivered to the memory drivers and grounders.

The emitter bias on transistor 844 is adjusted by potentiometer 851 so that a "half-select" drive current of approximately 170 ma. is delivered thereby at a core operating temperature of 30 degrees centigrade. However, due to the action of thermisters 829 and 830 as previously described, the base bias on transistor 844 is automatically adjusted so that a range of "half-select" drive currents of from approximately 145 ma. at a temperature of 50 degrees centigrade to approximately 210 ma. at a temperature of 20 degrees centigrade is supplied to the memory cores via the driver and grounder amplifiers. Due to the fact that transistor 844 is operating as a class A amplifier, a constant current is supplied thereby at a given temperature even with changing load conditions thereon. Thus it is seen that transistor 844 is continually supplying a constant current for a given temperature, which current is automatically switched from the memory drivers and grounders to the dummy load, and the magnitude of current not varying substantially with a switching of loads.

In the instant computer, it is necessary to utilize three such constant-current regulators: one is utilized to supply half-select drive current to the ferrite cores located in addresses A and B of the memory; one is utilized to supply half-select drive current in the X direction through the memory cores located in each of the forty rows; and the other is utilized to supply half-select drive current in the Y direction through memory cores in addresses $\phi\phi$ through 99, all of which will be described in detail hereinafter. However, to avoid the necessity of constructing three identical temperature-compensated current regulators, as just described, it has been found expedient to construct but a single current regulator which is substantially identical to the one shown and described, with the exception that three identical regulator sections 841 are utilized instead of one, and all three are connected in parallel at terminals 867, 868, and 869. Output terminal 843 of each of the three regulator sections is connected to one of lines "CRA," "CRX," and "CRY" shown in FIGS. 20 and 26. However, for the sake of simplicity of description and illustration, each of the temperature-controlled current regulators 7000, 7001, and 7002 is illustrated as separate units even though, in fact, all are part of a composite unit as just described.

8. Magnetic core memory

As previously mentioned, binary information is magnetically stored in the computer in a ferrite core memory. The core memory consists of a muliplicity of toroidally-shaped cores which possess a substantially square magnetic hysteresis-loop characteristic. Each core has an outside diameter of .080 inch and an inner diameter of .050 inch, and is approximately .025 inch thick. It is well known to those skilled in the art that, due to the fact that the ferrite core possesses a substantially square hysteresis-loop characteristic, it therefore has two stable states of magnetic remanence, each of which is respectively indicative of a binary "one" and a binary "zero." If a current-carrying conductor is threaded through the hole in the core, current in one direction through the conductor causes the core to be permanently magnetized in one direction, whereas current flow in the opposite direction through the conductor causes the core to be permanently magnetized in the opposite direction. Thus, a core is permanently magnetized in one direction or the other, depending upon the direction of current flow in the conductor threaded through the hole in the core. To summarize, when a core is magnetized in one direction, it represents a binary "one," and when the core is magnetized in the other direction it represents a binary "zero." Four cores are utilized as a group to collectively represent a single decimal digit, although, with the use of the binary form of notation, each group of four cores could possibly represent a number from "0" to "15." However, in the present computer, only the numbers "0" through "9" are actually stored in the memory.

In order to reverse the magnetic remanence of the core from a binary one to a binary zero notation, or from a binary zero to a binary one by reversing the direction of magnetization thereof, a magnetomotive force of approximately three hundred and sixty milliampere turns is required at 25 degrees centrigrade. This is obtained by the equivalent of passing 360 milliamperes of current through a single conductor threaded through the aperture of the core. A magnetomotive force of one-half this value—i.e., 180 milliampere-turns—does not appreciably disturb the magnetic remanence of the core.

After a core has been magnetized in a predetermined direction to represent a binary "one" or a binary "zero," it remains in that state of magnetic remanence indefinitely. The magnetic remanence state of the core is reversed only by a "full-amplitude" current impulse passing through the conductor threaded through the core. However, at certain predetermined times, it is necessary to "read" or determine the state of magnetic remanence of each core. Therefore, an additional conductor or "sense wire" is also threaded through the core aperture, so that, whenever the magnetic state of the core is changed from a binary "zero" to a binary "one" representation, or from a binary "one" to a binary "zero" representation, a voltage impulse is induced in the "sense wire" indicative of the reversal of magnetic remanence of the core. Thus it is seen that an impulse is induced in the "sense wire" only when the magnetic state of the core is reversed. In order to determine whether a particular core has been previously magnetically conditioned to represent a binary "one" or a binary "zero," a full-amplitude current of approximately 360 milliamperes is sent through the first-mentioned conductor in a direction to "set" the core to a binary "zero" representation. However, if the core had been previously set to a binary "zero" representation, a voltage impulse is not induced in the "sense wire." However, if the core was previously in a binary "one" representation, its magnetic remanent state is reversed, and, consequently, a voltage impulse is induced in the "sense wire" indicative of the reversal of the magnetic state of the core. After the magnetic state of the core is sensed, however, its magnetic state is immediately thereafter indicative of a binary "zero" representation regardless of its initial state. It is therefore necessary to restore the core to its original magnetic state normally by sensing a full-amplitude current impulse through the first-mentioned conductor to set the core back to a binary "one" representation if the core was previously in that particular state.

The core memory, utilized by the instant computer, has a capacity of one hundred ten-decimal-digit numbers which are hereinafter termed "words." Due to the fact that a negative word is stored in the memory as a positive complement, there is no need for a binary sign bit, as is conventional in most computers. A word is selectively stored in the memory in one of a hundred different locations which are called "addresses" and which are numbered from $\phi\phi$ through 99. In addition to the one hundred normal addresses, there are two additional addresses labeled A and B. The words stored in addresses $\phi\phi$ through 99 not only represent arithmetic data, but also represent "instructions" which are utilized by the computer to dictate the sequence of operations therein. The words previously stored in addresses $\phi\phi$ through 99 of the memory may be changed by instructions given by the computer; however, the words located in addresses A and B are used by the computer to store intermediate results during arithmetic computations and cannot be changed directly by instructions.

Figure 11:
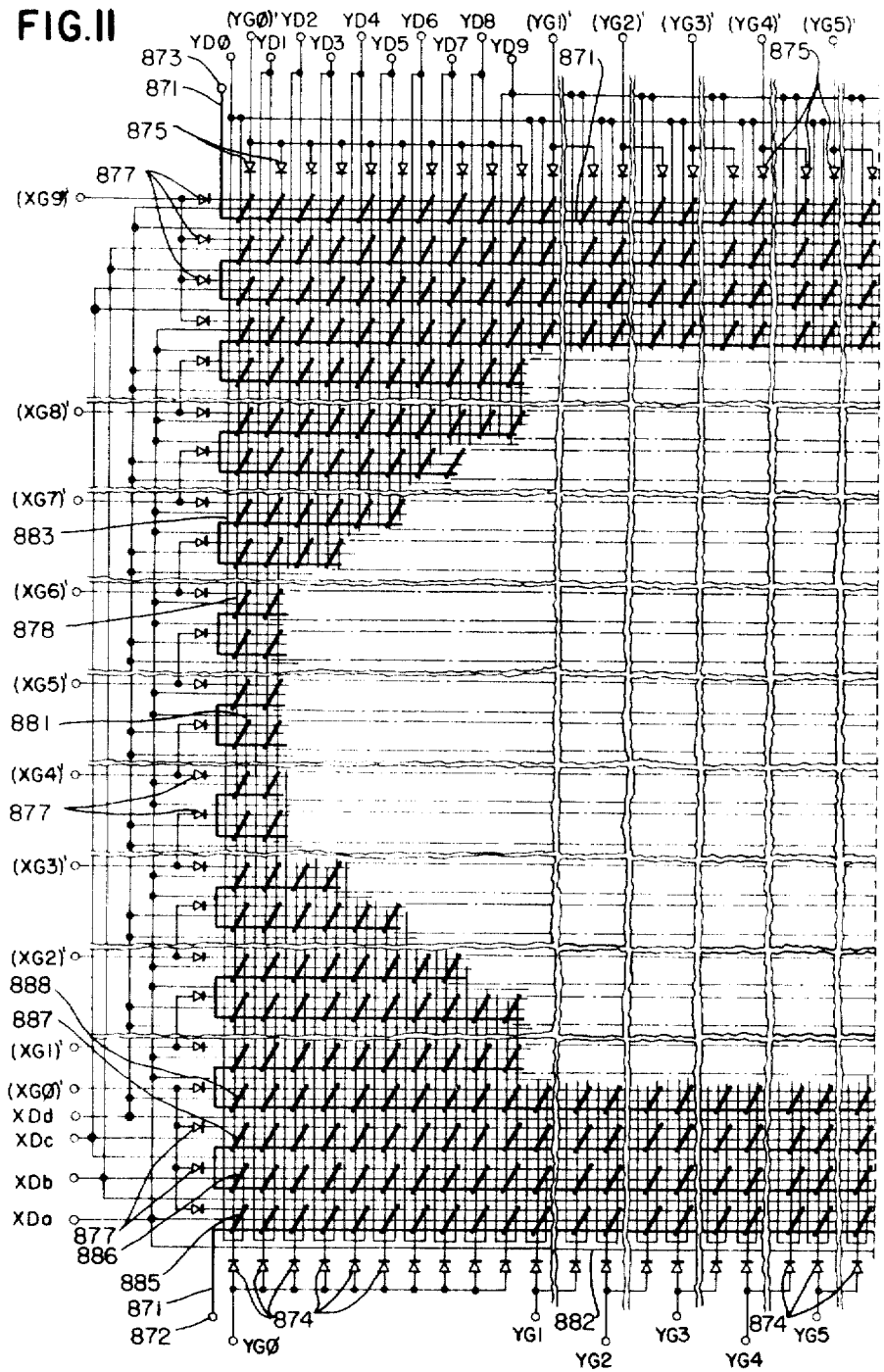
Figure 12:
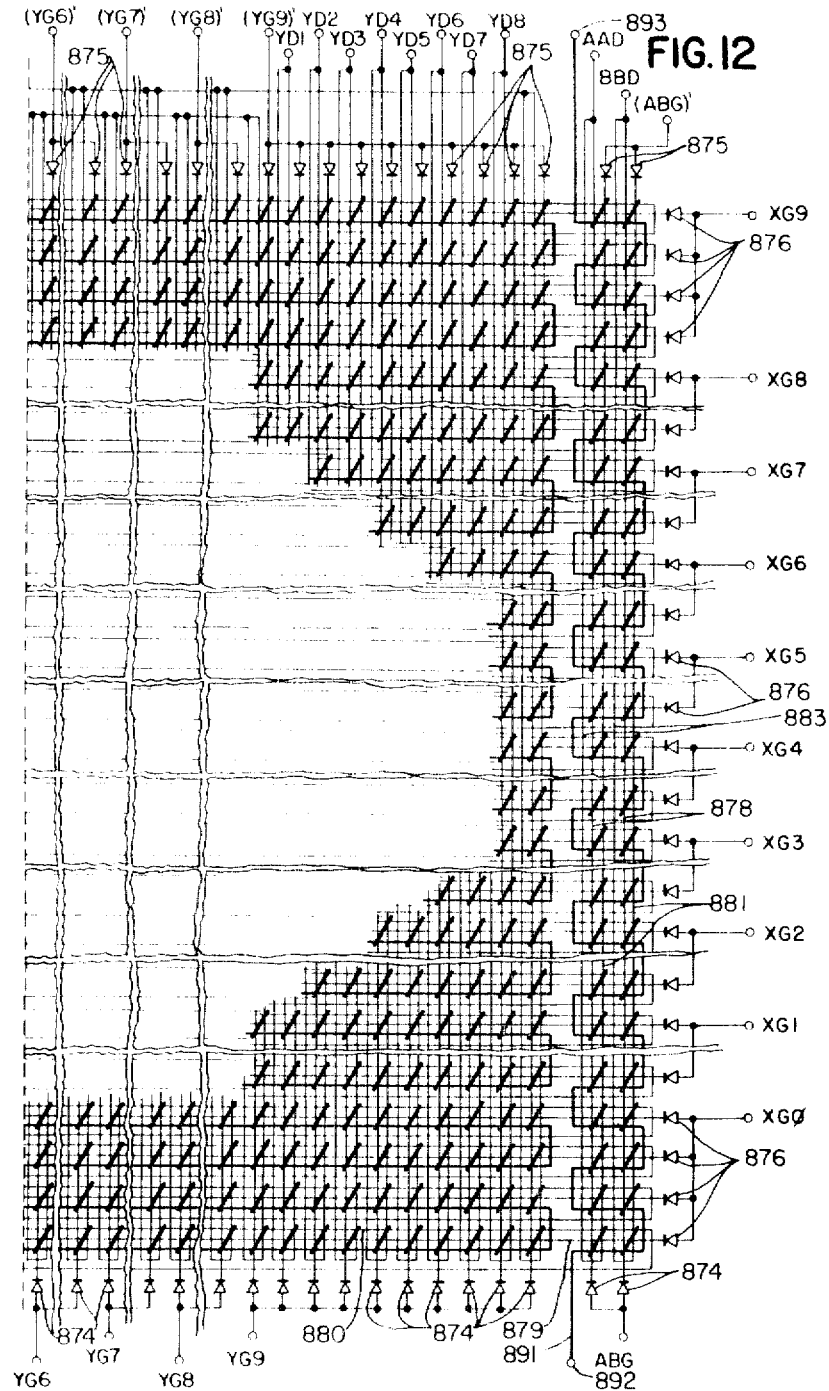

With reference to FIGS. 11 and 12, there is schematically shown the ferrite core memory utilized by the present computer. Such a memory comprises four thousand and eighty type N–400–080 ferrite cores at present manufactured by the assignee of the instant application.

The ferrite cores of the memory are selectively arranged in a pattern of rectangularly-shaped configuration having one hundred two vertical columns and forty horizontal rows thereof. The first one hundred columns, as viewed from left to right, respectively represent memory address locations $\phi\phi$ through 99, whereas the two remaining rightmost columns respectively represent address locations A and B. In each of the columns, from the topmost to the bottommost core, the forty cores are arranged in a succession of ten groups, with each group containing four cores. Each group of four cores is representative of a decimal digit of a predetermined order, whereas all of the groups of a particular column collectively represent all of the orders of a word ten decimal digits in length. Each of the ten successive decimal digits of the word located in any address is respectively identified as the "first-order" digit through the "tenth-order" digit, where the first order is the lowest or "penny" digit and the tenth order is the highest order digit of the number or word. The four cores used to store the first-order digit of a word which is residing in an address in the memory are located in the first row through the fourth row, counting from bottom to top. The four cores used to store the second-order digit of the word are located immediately above in the fifth through the eighth rows; in the drawing, only the fifth and eighth rows are shown, rows six and seven being omitted for the sake of simplicity. The four cores used to store the third-order digit are located immediately above in rows nine through twelve, where rows nine and twelve are the only ones illustrated, rows ten and eleven being omitted for the reasons just mentioned. The location of each higher-order digit progresses upward, as just described, so that the tenth or highest-order digit is located at the top of the column in the last four rows shown; i.e., thirty-seven through forty. Therefore, it is seen, the maximum storage in each memory address is a ten-digit number which will hereinafter be called a "word," the lowest-order digit thereof being located at the bottom of each address and the highest-order digit thereof being located at the top of each address.

As the instant computer utilizes the well-known "binary-coded decimal-digit" system of numerical representation, each of the four cores in a group making up a particular order decimal digit of the word is known as a "binary-bit." The binary-bits are consecutively labeled $(a)$, $(b)$, $(c)$, and $(d)$, where bit $(a)$ is the lowest-order bit represented by the magnetic state of the cores located in rows #1, #5, #9, and #37, and bit $(d)$ is the highest-order bit represented by the magnetic state of the cores located in rows #4, #8, #12 ... and #40. As previously mentioned, each group of four cores is capable of representating a particular order numerical digit having a value from "0" through "9." For example, to represent a decimal digit having a value of "0," all of the four cores in a group are selectively set to binary bit representations (0000); for a decimal digit having a value of "1," the cores are set to (0001) binary bit representations; a decimal digit having a value of "2," the cores are set to bit representations (0010); a "3" is represented by (0011); "4" by (0100); "5" by (0101); "6" by (0110); "7" by (0111); "8" by (1000); and finally, to represent a decimal digit having a value of "9," the cores are sequentially set to binary bit representations (1001).

To illustrate, supposing that the word 0000000695 is stored in memory at address $\phi\phi$. In the leftmost vertical column, the four lowermost cores, indicated by reference numerals 885 through 888, are respectively conditioned to collectively represent binary bits (0101) indicative of the first-order digit "5." In other words, core 885, representative of binary bit "$a$," is set to binary "1"; core 886, representative of binary bit "$b$," is also set to binary "0"; core 887, representative of binary bit "$c$," is set to binary "1"; and, finally, core 888, representative of bit "$d$," is set to binary "0" representation. Collectively, the magnetic state of cores 885 through 888 represents the penny digit "5." The next group of four cores, located directly above group 885 through 888, are set to binary bit representations (1001) and collectively represent the second-order decimal digit "9." The next group of four cores are set to binary bit representations (0110), collectively representing the third-order decimal digit "6." All of the remaining cores in address $\phi\phi$ are individually set to binary "0" representations. Thus, with the non-significant decimal digits, removed, the word becomes "695."

In one mode of operation, when a column of cores is to be "read out" to determine the word stored in that particular memory address, the cores are sequentially read, one at a time, starting with the core at the bottom of the address and concluding with the core at the top of the address. For example, in address $\phi\phi$, core 885 is read first to produce the binary value of bit "$a$" of the first-order digit; core 886 is read next to produce bit "$b$" of the first-order digit; core 887 is read next to produce bit "$c$"; and core 888 is next read to produce bit "$d$" of this digit. The next four bits, representing the second-order digit, are successively read out, and the remainder of the bits for successive higher-order digits are thereafter sequentially read out in the same sequence, concluding with bit "$d$" of the tenth-order decimal digit.

After a core has been read out, it is generally desired to restore the core to its original magnetic state as before being read. That is, after each bit-representing core is read out, if the core was originally set to represent a binary "1," the core is returned to the "1" state following reading thereof. Therefore, following the reading of each bit, a predetermined unit of time is permitted to lapse before the next bit is read out; it is during this time lapse that the core, just read, is returned to the "1" state if it had previously been set to that state.

For the sake of simplicity of the following description, the vertical or column orientation of the memory will hereinafter be termed the Y direction, and the horizontal or row orientation will hereinafter be termed the X direction.

Even though, in reality, each of the memory cores has five conductors threaded therethrough for purposes to be more fully described hereinafter, only three of these conductors are to be considered at this time in describing a mode of operation of the memory in terms of the electrical schematic diagram thereof shown in FIGS. 11 and 12. The first of the three just-mentioned conductors is a "sense winding" 871, which starts at terminal 872 at the lower left corner of the memory and is alternately threaded through each row of cores bounded by addresses $\phi\phi$ through 99. As shown, sense winding 871 is successively threaded from left to right through all of the cores of the first row, is threaded from right to left through the cores of the second row, from left to right through the third row, and alternately continues on from row to row. Finally, sense winding 871 is threaded from right to left through the topmost or fortieth row of cores, and terminates at terminal 873. All of the cores in address $\phi\phi$ are threaded in the Y direction by common current-carrying conductor 878, which is shown positioned to the left within the apertures thereof. Also, all of the cores located in the first row bounded by address $\phi\phi$ and address B are threaded in the X direction by a common current-carrying conductor 879, which is shown centrally positioned within the apertures thereof, address B being the rightmost one of the memory addresses.

It will now be assumed that it is desired to read out the contents of address $\phi\phi$. Thus, in order to read bit "$a$" of the first-order decimal digit of the word stored in address $\phi\phi$, a half-amplitude or "half-select" current impulse is delivered to conductor 878, and, simultaneously therewith, a half-select current impulse is present in conductor 879. The two half-select impulses are in such directions that the magnetomotive forces associated therewith are additive in the region of core 885, with the resultant force being of sufficient magnitude to magnetically saturate the core in a direction indicative of a binary "zero." Due to the fact that core 885 is the only core in the entire memory that has received the necessary magnetomotive force to cause a reversal of its magnetic state, all of the remaining cores essentially remain magnetically undisturbed. It is known that whenever the state of magnetic remanence of any one of the memory cores is reversed, a voltage impulses is induced thereby in sense winding 871. However, due to the fact that in the present memory only one core at a time is sensed, there is no ambiguity as to which core was responsible for the impulse induced in the sense winding.

Therefore, if core 885, whose magnetic state is indicative of bit "*a*" of the first-order digit of the number, is storing a binary "1," its magnetic state is reversed by the coincidental X and Y read impulses, and, consequently, a voltage impulse appears between terminals 872–873 of the sense winding 871, indicating that core 885 was previously storing a binary "1." If core 885 had previously been storing a binary "0," however, a voltage impulse does not appear across the output terminals of the memory sense winding, thus indicating a binary "0" storage.

After core 885 has been read, its magnetic state is thereafter indicative of a binary "0," as previously mentioned. Thus, if the magnetic state of the core was indicative of a binary "0" before being read, there is no need for "resetting" the core after it is read. However, if the state of the core was indicative of a binary "1" before being read, it is often necessary to "reset" the core to a binary "1" representation after it has been read. To do this, the directions of both of the current impulses applied through the X and Y conductors are effectively reversed simultaneously. This causes a corresponding reversal of the additive magnetomotive force in the vicinity of the core, which reverses the magnetic state thereof. Again, as only a half-select current impulse is applied to each of the X and Y conductors, core 885 is the only core in the entire memory that is magnetically affected thereby.

Now that core 885 has been read and afterwards reset to its initial state, core 886 is read next to determine the binary value of the bit "*b*" of the first-order digit of the word. Again, a half-select current impulse is applied in the Y direction to conductor 878, and, essentially, a half-select current impulse is simultaneously applied in the X direction to the conductor of the second row corresponding to 879. As before, both half-select currents are in such directions to effect storage of a binary "0" in core 886. If the state of core 886 was indicative of a "1" before being read, the current in each of the X and Y conductors threaded therethrough is reversed to reset core 886 to "1" after it is read. This reading and writing sequence of operation is sequentially continued from core to core until all forty cores of address have been read and thereafter restored to their respective magnetic states.

The just-described combined reading and writing cycle of operation of each core is hereinafter called a "read-write" cycle. The time required to complete a read-write bit cycle in the instant computer is approximately 40 microseconds. During the first 30 microseconds of the read-write cycle, the core is set to a binary "0" representation; during the remaining 10 microseconds of the cycle, the core is often reset to a binary "1" representation if it was originally in that state. However, if the core was originally in a binary "0" state before being read, there is no resetting operation necessary during the last 10-microsecond interval. Therefore, to read out an entire ten-digit word from an address in memory requires a total time of 40×40, or 1,600, microseconds.

Due to the fact that, in the present memory, it is not desired to reverse the current flow in a conductor, an additional conductor is individually threaded in the "X" direction through each of the rows of cores. This is illustrated by conductor 880, shown threaded through the cores of the first row and disposed parallel with respect to conductor 879, previously described. By the same token, an additional conductor is also individually threaded in the Y direction through the cores of each of memory addresses $\phi\phi$ through 99, and also addresses A and B. This conductor is illustrated by conductor 881, shown threaded through the cores of address $\phi\phi$ and disposed parallel with respect to conductor 878, previously described. Thus, two conductors are threaded in the X direction and two conductors are threaded in the Y direction through each of the cores of the memory; each of the four wires transmits current in only one direction, as will be shown hereinafter. The fifth wire through memory cores in addresses $\phi\phi$ through 99 is sense wire 871, heretofore described. A separate sense winding 891, which originates at terminal 892 and terminates at terminal 893, is alternately threaded, in one direction and then the other, through the forty rows of cores making up memory addresses A and B in the same manner as memory sense winding 871.

Before attempting to give a more detailed description of the memory, it is to be appreciated that each of the rows of cores, from the first to the fortieth row, is connected in a same circuit configuration with respect to the others. Likewise, each of the columns of cores, from addresses $\phi\phi$ through 99 and including addresses A and B, is also of the same circuit configuration with respect to the others. Thus, a description and full comprehension of the mode of operation of address $\phi\phi$ with respect to the first row of cores for producing bit "*a*" of the first-order digit of the word stored in address $\phi\phi$ should suffice for the remaining bits of that digit, and also the remaining digits of that word. As the mode of operation of address $\phi\phi$ is exactly the same as that of the remaining memory addresses, a further description of the remaining addresses, again, would result only in unnecessary repetition. It is also to be appreciated that, in an attempt to simplify the schematic representation of the memory as shown in FIGS. 11 and 12, addresses $\phi\phi$ through $\phi 9$ are consecutively shown, reading from the extreme left to the right; addresses $1\phi$ and 19 are shown next, with addresses 11 through 18 being omitted, as indicated by the vertical "break" in the drawing between addresses $1\phi$ and 19; following in sequence are addresses $2\phi$, 29, $3\phi$, 39, $4\phi$, 49, $5\phi$, 59, $6\phi$, 69, $7\phi$, 79, $8\phi$, 89, and $9\phi$, through 99, and finally addresses A and B; addresses 21–28, 31–38, 41–48, 51–58, 61–68, 71–78, and 81–88 are omitted. Starting from the bottom of the drawing, the first four rows are shown which make up the low-order digit of the word stored in memory; rows #5 and #8 are shown next, with rows #6 and #7 omitted as indicated by the horizontal "break" in the drawing between rows #5 and #6; following in sequence are rows #9, #12, #13, #16, #17, #20, #21, #24, #25, #28, #29, #32 #33, #36, and #37 through #40; rows #10–#11, #14–#15, #18–#19, #22–#23, #26–#27, #30–#31, and #34–35 are omitted.

With particular attention directed to the first row of cores, on emergence from the rightmost end of the first row of cores, conductor 880 is connected to conductor 882, which passes below the first row and is connected at its opposite end to line XD*a*, located at the bottom left corner of the memory. The leftmost end of conductor 879 also is connected to line XD*a*, and its opposite end is connected to the cathode of one of crystal diodes 876, its anode being connected to line XG$\phi$; and, finally, the remaining left end of conductor 880, on emergence from the leftmost end of the first row of cores, is connected to the cathode of one of crystal diodes 877, whose anode is connected to line (XG$\phi$)'.

Whenever line XD*a* is activated, that line is effectively connected to a source of potential of approximately −12 volts. Thus, if line XG$\phi$ is simultaneously activated therewith, that line is effectively connected to terminal 843 of a temperature-compensated current regulator, of the type previously described with respect to FIG. 10*g*, so that a half-select drive current impulse flows from line XG$\phi$ through diode 876 from right to left through conductor 879 and out at line XD*a*. However, if line (XG$\phi$)' is simultaneously activated instead of line XG$\phi$, line (XG$\phi$)' is effectively connected to terminal 843 of the current regulator, so that a half-select current impulse from line (XG$\phi$)' flows through diode 877, thereafter flows from left to right through the upper loop of conductor 880, and is returned to line XD*a* by way of conductor 882. Consequently, it is seen that, when line XD*a* is activated, the half-select drive impulse flows in one of two directions through the cores of the first row, depending upon whether XG$\phi$ or (XG$\phi$)' was simultaneously activated with line XD$a$.

The electrical connections for rows #2 through #4, respectively representing bits "$b$," "$c$," and "$d$" of the first-order digits of the words stored in memory, are exactly the same as for row #1, the anodes of the four crystal diodes 877 each being connected to line (XG$\phi$)' and the anodes of the four crystal diodes 876 being connected to line XG$\phi$. When line XD$b$ is activated, the line is effectively connected to a potential source of −12 volts, as was line XD$a$. Thus, when line XG$\phi$ is activated simultaneously with XD$b$, the half-select current impulse flows from right to left through the cores of the second row; if (XG$\phi$)' is activated instead of XG$\phi$, a half-select current impulse flows from left to right through the cores of the second row. By the same token, if XD$c$ and XG$\phi$ are simultaneously activated, a half-select current impulse flows from right to left through the third row of cores; a simultaneous activation of XD$c$ and (XG$\phi$)' effectively causes a reversal of current flow through the third row of cores. Finally, XD$d$ and XG$\phi$, or XD$d$ and (XG$\phi$)' operate together to effectively send a half-select impulse from right to left or from left to right, respectively, through the fourth row of cores in the same manner as just described.

As just described, the first four of diodes 877 (i.e., the ones respectively associated with rows #1 through #4) have their anodes connected together and returned to lines (XG$\phi$)'. The second group of four diodes 877, associated with rows #5 through #8, of which only rows #5 and #8 are illustrated, all have their respective anodes connected to line (XG1)'. The anodes of the third group of diodes are each connected to line (XG2)', the anodes of the fourth group being connected to (XG3)', and so on up the column, with the anodes of the tenth group of diodes 877 being connected to line (XG9)'. Also, as shown, the left end of each of the conductors corresponding to 879 and 882 associated with rows #1, #5, #9, #13 . . . #33, and #37, which rows successively correspond to bit "$a$" of each successive-order decimal digit of the word stored in memory, are connected together and returned to line XD$a$. Likewise, although not fully illustrated, the left end of each of the conductors corresponding to 879 and 882 but associated with rows #2, #6, #10, #14 . . . #34, and #38, which rows successively correspond to bit "$b$" of each successive-order decimal digit of the word in memory, are connected together and returned to line XD$b$. By the same token, although not fully illustrated, the left end of each of the conductors corresponding to 879 and 882 but associated with rows #3, #7, #11, #15 . . . #35, and #39, which rows successively correspond to bit "$c$" of each successive-order decimal digit of the word in memory, are connected together and returned to line XD$c$. And finally, the left end of the conductors corresponding to 879 and 882 but associated with rows #4, #8, #12, #16 . . . #36, and #40, which rows successively correspond to bit "$d$" of each successive-order decimal digit of the word in memory, are connected together and returned to line XD$d$.

With respect to the vertically-disposed column of diodes located to the right of address B and indicated as 876, the first bottom group of four diodes thereof associated with rows #1 through #4 each has its anode connected to line XG$\phi$; the second group of four diodes 876 located directly above the first group have their anodes returned to common line XG1; the anodes of the third group of diodes 876 are connected to line XG2, and so on, with the anodes of the last four diodes 876 at the top of the column and associated with rows #37 through #40 being connected to common line XG9.

Referring to the lowermost row of diodes 874 located below row #1, counting from left to right, the anodes of the first ten of diodes 874 respectively associated with addresses $\phi\phi$ through $\phi$9 are connected to line YG$\phi$. With respect to the next group of diodes 874 located immediately to the right of the first group of diodes and respectively associated with addresses 11 through 19, of which only addresses 11 and 19 are illustrated and addresses 12 through 18 are omitted, their anodes are connected to line YG1; the anodes of the third group of diodes 874 respectively associated with addresses 20 through 29 are connected to line YG2; and so on, with the anodes of the last group of ten diodes 874, respectively associated with addresses 9$\phi$ through 99, being connected to line YG9. With respect to the upper row of diodes 875, which are located directly above row #40, the first group of ten diodes which are respectively associated with addresses $\phi\phi$ through 99 have their anodes connected to line (YG$\phi$)' in the same manner as the lower row of diodes 874. The anodes of each successive group of ten diodes 875, counting from left to right, are respectively connected to lines (YG1)' through (YG9)'.

To complete the electrical connections to memory addresses $\phi\phi$ through 99, the upper ends of vertical conductors corresponding to 878 and 883, which are respectively associated with addresses $\phi\phi$, 1$\phi$, 2$\phi$, 3$\phi$, . . . 8$\phi$, and 9$\phi$, are connected to line YD$\phi$. The upper ends of vertical conductors corresponding to 878 and 883, which are respectively associated with addresses 01, 11, 21, 31, . . . 81, and 91, are connected to line YD1. Only addresses $\phi$1 and 91 of this group are illustrated, the remaining addresses of this group being omitted for simplicity purposes. Likewise, the upper ends of vertical conductors 878 and 883, which are respectively associated with addresses $\phi$2, 12, 22, 32, . . . 82, and 92, are connected to line YD2. This sequence of connections continues from lines YD3 through YD9, where YD9 is connected to vertical conductors corresponding to 878 and 883, which are respectively associated with addresses $\phi$9, 19, 29, 39 . . . 89, and 99.

To summarize: Selective energization of line YD$\phi$ essentially selects all addresses whose low-order digit is a "0"; YD1 essentially selects all addresses whose low-order digit is a "1"; YD2 essentially selects all addresses whose low-order digit is a "3"; and so on from YD3 through YD9, where YD9 essentially selects all addresses whose low-order digit is a "9." Forgetting about "prime-notations" for the present, selective energization of line YG$\phi$ essentially selects all addresses whose high-order digit is a "0"; YG1 essentially selects all addresses whose high-order digit is a "1"; YG2 essentially selects all addresses whose high-order digit is a "2"; and so on from YG3 to YG9, where selective energization of line YG9 essentially selects all addresses whose high-order digit is a "9." Thus, suppose that it is desired to select a particular address; say address 9$\phi$. To accomplish this, YD$\phi$ is energized corresponding to the low-order digit "0" of the address, and, simultaneously therewith, YG9 is energized corresponding to the high-order digit "9" of the address. Thus, when YD$\phi$ and YG9 are simultaneously energized, a binary "1" representative half-select current flows upwardly from line YG9 through all of the cores in address 9$\phi$ and out at line YD$\phi$. To select address 99, YD9 and YG9 are energized simultaneously.

As far as "prime notations" are concerned, it is to be pointed out at this time that throughout the electrical circuitry of the computer signal lines bearing a "prime" notation—i.e., (XG$\phi$)' and (YG$\phi$)' et al.—essentially have diametrically opposite states or energization conditions to their respective "primeless" counterparts; i.e., XG$\phi$, YG$\phi$, et al. For example, lines (YG$\phi$)' through (YG9)' are effective to selectively send a half-select drive-current impulse downwardly through any one of addresses $\phi\phi$ through 99 to "half-select" a particular address to a binary "0" representation, whereas lines YG$\phi$ through YG9 are effective to send a half-select impulse upwardly through any one of the same respective addresses to "half-select" that particular address to a binary "1" representation. It is also to be appreciated at this point that, when the state of a signal line bearing a "prime" notation is de-energized or is FALSE, the "primeless" signal line counterpart is respectively "energized" or is TRUE, and vice versa. In other words, when one is energized, the other is de-energized; when one is TRUE, the other is FALSE, etc.

In the X direction of the memory, line XD*a* selects those ten rows corresponding to a bit "*a*" of each order decimal digit of the word; line XD*b* selects those ten rows corresponding to bit "*b*"; line XD*c* selects the ten rows corresponding to bit "*c*"; and, finally, line XD*d* selects the final ten rows corresponding to bit "*d*" of each order decimal digit of the word. Lines (XG$\phi$)' through (XG9)' are effective to send a half-select drive-current impulse from left to right through any one of rows #1 through #40 to "half-select" a particular row to a binary "0" representation, whereas lines XG$\phi$ through XG9 are effective to send a half-select impulse from right to left through any one of the same respective rows to "half-select" that particular row to a binary "1" representation.

Thus, combining X and Y selection of the memory, in order to store a binary "1" representation in a core, say core 885 as an example, which is located at the junction of row #1 and address $\phi\phi$, lines YD$\phi$, YG$\phi$, XD*a*, and XG$\phi$ are all simultaneously energized. To store a binary "0" representation therein, lines YD$\phi$, (YG$\phi$)', XD*a*, and (XG$\phi$)' are all effectively energized simultaneously. To store binary information in core 886, line XD*b* is energized instead of line XD*a*. The manner of X and Y selection of addresses A and B is exactly the same as the manner of selection of memory addresses $\phi\phi$ through 99. Consequently, further detailed description thereof is not deemed necessary.

Before proceeding further with the description of the logical control circuitry of the computer, it is to be pointed out that an attempt has been made to simplify and thus alleviate the inherent complexity of the schematic representation in order to facilitate a full and complete understanding of the circuitry, both as to its organization and as to its mode of operation. For example, throughout the drawings, all input lines are appropriately labeled and are positioned to the leftmost side of the various building blocks previously described, and the various output lines thereof also are appropriately labeled and are positioned to the rightmost side of the building blocks. However, for illustrative purposes only, but a selected few of the input and output lines are actually shown connected. It is, of course, to be understood that, in order to obtain a full and complete electrical circuit diagram of the computer, it first is necessary to substitute the appropriate type of building block circuitry (taken from FIGS. 4 through 10) for each of the correspondingly-labeled building blocks which are logically illustrated throughout the drawings. Afterwards, all like-labeled lines (whether input lines, output lines, or otherwise) are to be connected together, thus forming a complete circuit diagram from the schematic representation thereof.

9. X-drivers

With reference to the lower right-hand section of FIG. 20, there are schematically illustrated four "X-drivers," which are utilized to selectively energize input lines XD*a* through XD*d*, previously described in connection with the core memory shown in FIGS. 11 and 12. Each of the X-drivers comprises a two-input logical AND of type "R1," an inverter amplifier of type "112," and an emitter follower amplifier of type "E3," each connected in cascade with respect to the others. More specifically, the X-driver for bit "*a*" includes logical AND 1108, inverter 4237, and emitter follower 4250; the X-driver for bit "*b*" comprises logical AND 1109, inverter 4238, and emitter follower 4251; the X-driver for bit "*c*" comprises logical AND 1110, inverter 4239, and emitter follower 4252; and, finally, the X-driver for bit "*d*" comprises logical AND 1111, inverter 4240, and emitter follower 4253.

During a read-write cycle of operation for reading a word from an address in memory, line SMC goes TRUE for 1600 microseconds to allow line XDW to effectively "condition" the selected X-driver to effectively be turned "ON" at, and for, the proper amount of time. At 40 microseconds intervals, lines B*a*M through B*d*M sequentially go TRUE for a period of 40 microseconds each, and then respectively go FALSE. Consequently, at the beginning of the read-write cycle, output line XD*a* is energized, and a potential of approximately −12 volts appears thereon. Line XD*a* stays energized for a maximum period of 40 microseconds and then is de-energized. Forty microseconds after line XD*a* was first energized, output line XD*b* is energized for a maximum period of 40 microseconds, and then is de-energized. Forty microseconds after line XD*b* was first energized, line XD*c* is energized for a maximum period of 40 microseconds. Finally, 40 microseconds after line XD*c* was first energized, line XD*d* is energized for a maximum period of 40 microseconds, lines XD*a* through XD*d* of FIG. 60, of course, being identical to lines XD*a* through XD*d* of FIGS. 11 and 12, as previously stated. Thus it is evident, as a maximum total time of 160 microseconds is required to read each digit out of memory, that a maximum time of 1600 microseconds is required to read a ten-digit number out of a particular address in memory.

10. Bit-counter

Figure 1:
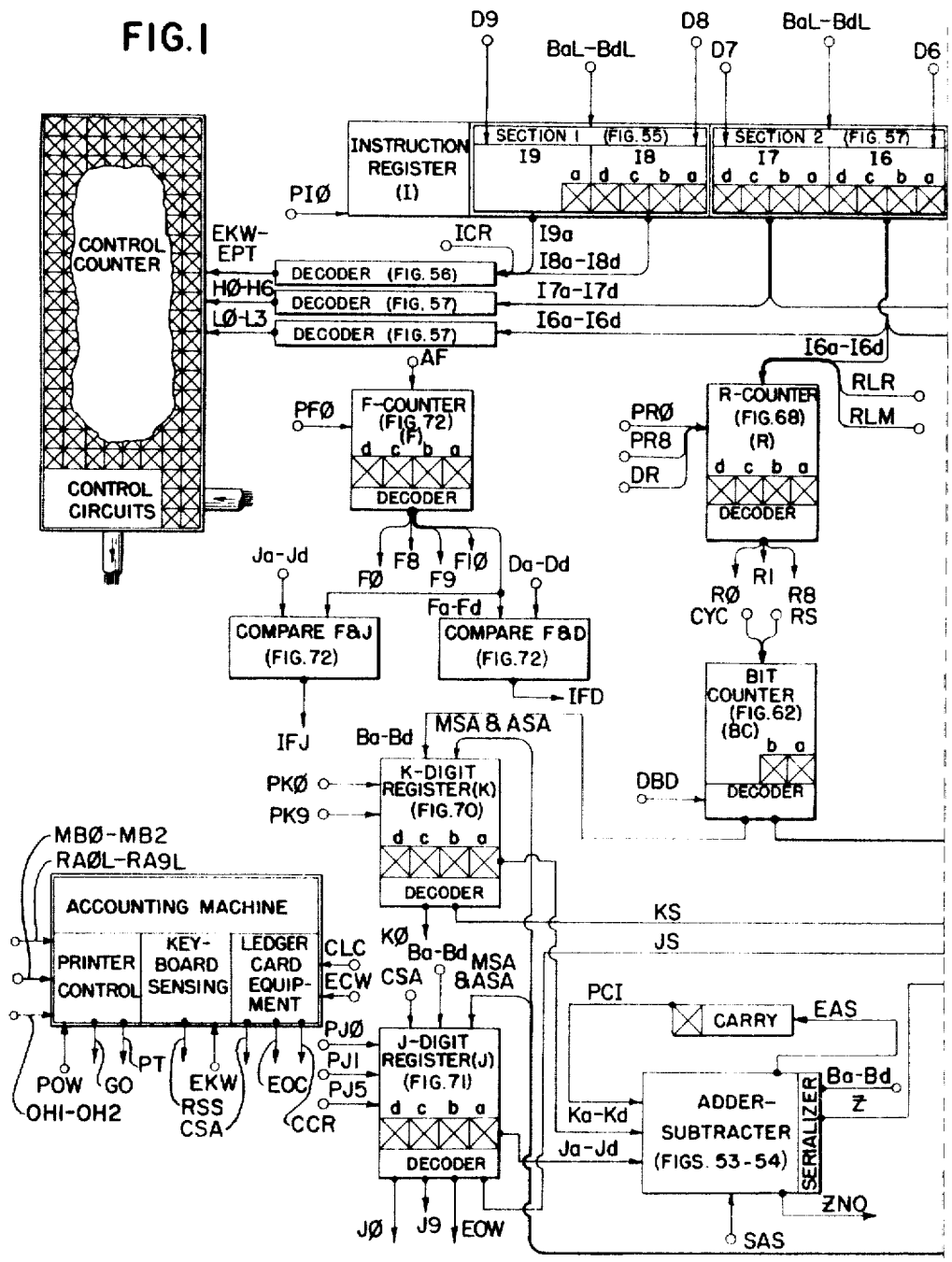
Figure 22:
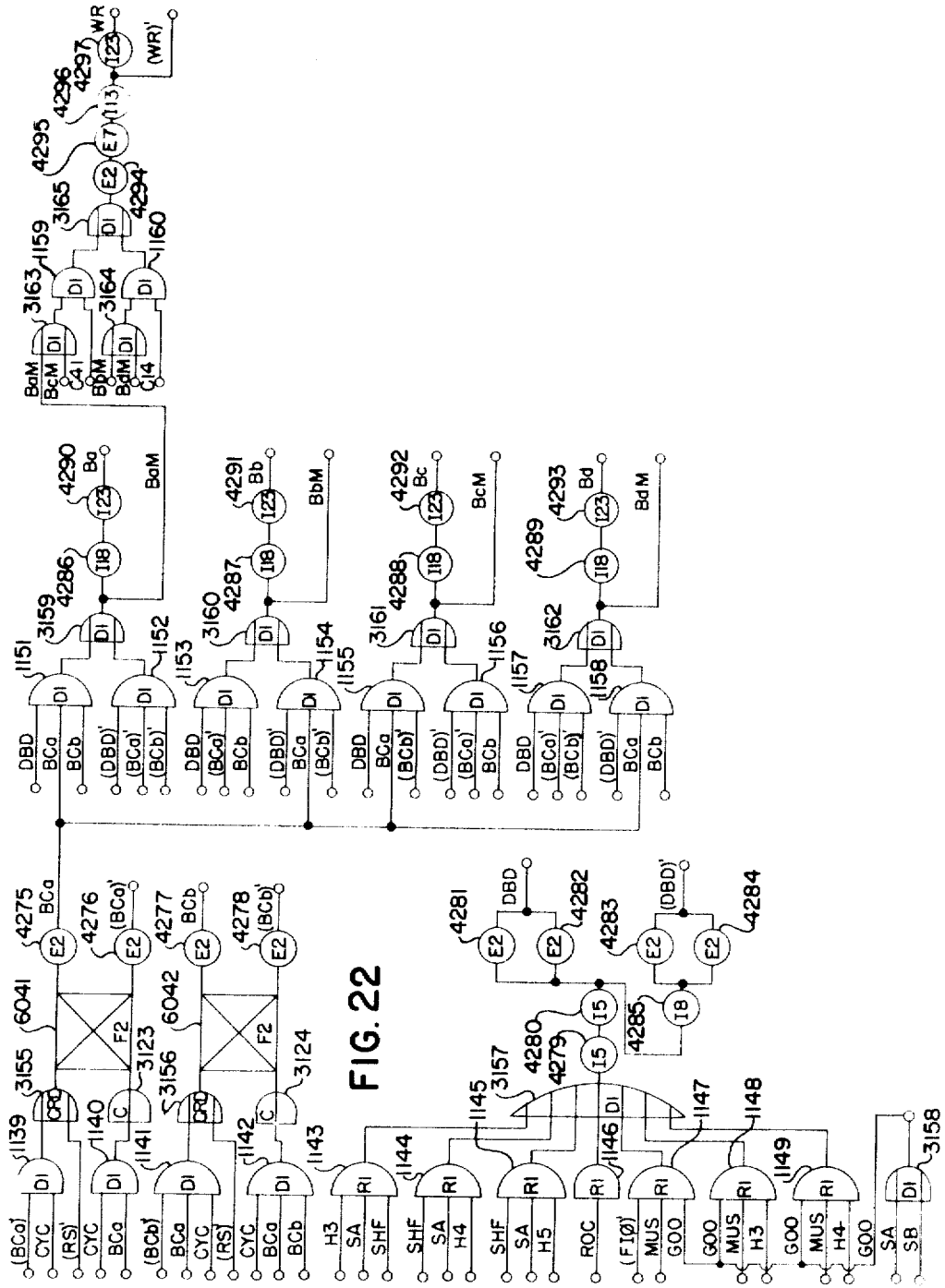
FIG. 22 is a logical diagram of the bit-counter.

The bit-counter, logically shown in the upper portion of FIG. 22, includes two type "F2" flip-flops 6041 and 6042, connected as a scale-of-four binary counter, and is utilized to select the binary bit of the word to be read out of an address in memory during a read-write cycle, as illustrated in the block diagram of FIG. 1. When the computer is first turned ON, or when pushbutton RS1 (FIG. 37) is actuated, flip-flops 6041 and 6042 are unconditonally set TRUE by reset line (RS)' going FALSE. That is, the states of flip-flops 6041 and 6042 are such that reference output lines BC*a* and BC*b*, respectively therefrom, are TRUE, and prime output lines (BC*a*)' and (BC*b*)' are both FALSE.

The bit-counter usually counts in a forward direction, as will be shown later. However, there are times when the bit-counter is required to effectively count in a reverse direction. When counting in a reverse direction, the read-write word cycle begins by reading out the high-order bit of the high-order digit; i.e., bit "*d*" of digt #9. The signal which provides for this reverse operation of the bit-counter comes from line DBD. When line DBD is TRUE (line (DBD)' thus being FALSE), the bit-counter counts in a reverse direction. Conversely, when line DBD is FALSE (line (DBD)' thus being TRUE), the bit-counter counts in a forward direction.

If it be desired that the bit-counter is to count in a forward direction, lines (DBD)', BC*a*, and BC*b* must first be TRUE. Therefore, as all three inputs to logical AND 1158 are simultaneously TRUE, lines B*d* and B*d*M are also TRUE, the remainder of output lines B*a* through B*c* and B*a*M through B*d*M being FALSE. When input line CYC goes from TRUE to FALSE, the prime inputs to both of flipflops 6041 and 6042 go from TRUE to FALSE. Consequently, both flipflops 6041 and 6042 change state, so that lines BC*a* and BC*b* go FALSE and lines (BC*a*)' and (BC*b*)' go TRUE. As lines (DBD)', (BC*a*), and (BC*b*)' are now TRUE, all of the inputs to logical AND 1152 are simultaneously TRUE, and thus output line B*a* is TRUE, with the remaining outputs B*b* through B*d* being FALSE. When line CYC goes from FALSE back to TRUE, the state of both flipflops remains unchanged.

However, when line CYC again goes from TRUE to FALSE, the reference input to flipflop 6041 goes from TRUE to FALSE. At this time, lines BCa and (BCb)' are TRUE, and lines (BCa)' and BCb are both FALSE. Thus, as inputs (DBD)', BCa, and (BCb)' of logical AND 1154 are simultaneously TRUE, output line Bb is TRUE, and remaining outputs Ba, Bc, and Bd are FALSE. When line CYC goes from TRUE to FALSE a third time, all input lines to logical AND 1156 are simultaneously TRUE, and output line Bc is likewise TRUE, with lines Ba, Bb, and Bd being FALSE. Finally, when CYC goes from TRUE to FALSE a fourth time, line Bd is TRUE, with lines Ba through Bc being FALSE.

To summarize, only readout line Bd is initially set TRUE when the computer is first turned "ON" or when pushbutton RS1 (FIG. 37) is actuated; the remaining readouts, Ba through Bc, are FALSE. At this time, for each successive occurrence of a TRUE-to-FALSE reversal of line CYC, the bit-counter is incremented by a count of one binary bit. Thus, with four such reversals of line CYC, the bit-counter counts Ba, Bb, Bc, and back to Bd. When the bit-counter is to count backwards, line DBD is rendered TRUE instead of line (DBD)'. Consequently, at this time, line Ba instead of line Bd is TRUE; remaining lines Bb through Bd are FALSE. Thereafter, for each successive occurrence of a TRUE-to-FALSE reversal of line CYC, the counter is decremented by a count of one bit. Thus, with four such reversals of line CYC, the bit-counter counts Bd, Bc, Bb, and back to Ba. It is to be appreciated, of course, that lines BaM through BdM are all at times of the same state as lines Ba through Bd, respectively. It is also to be appreciated, as before stated, that lines BaM through BdM of FIG. 22 are respectively identical to lines BaM through BdM of FIG. 20 and anywhere else they may appear in the computer circuitry.

*11. X and Y grounders*

Figure 26:
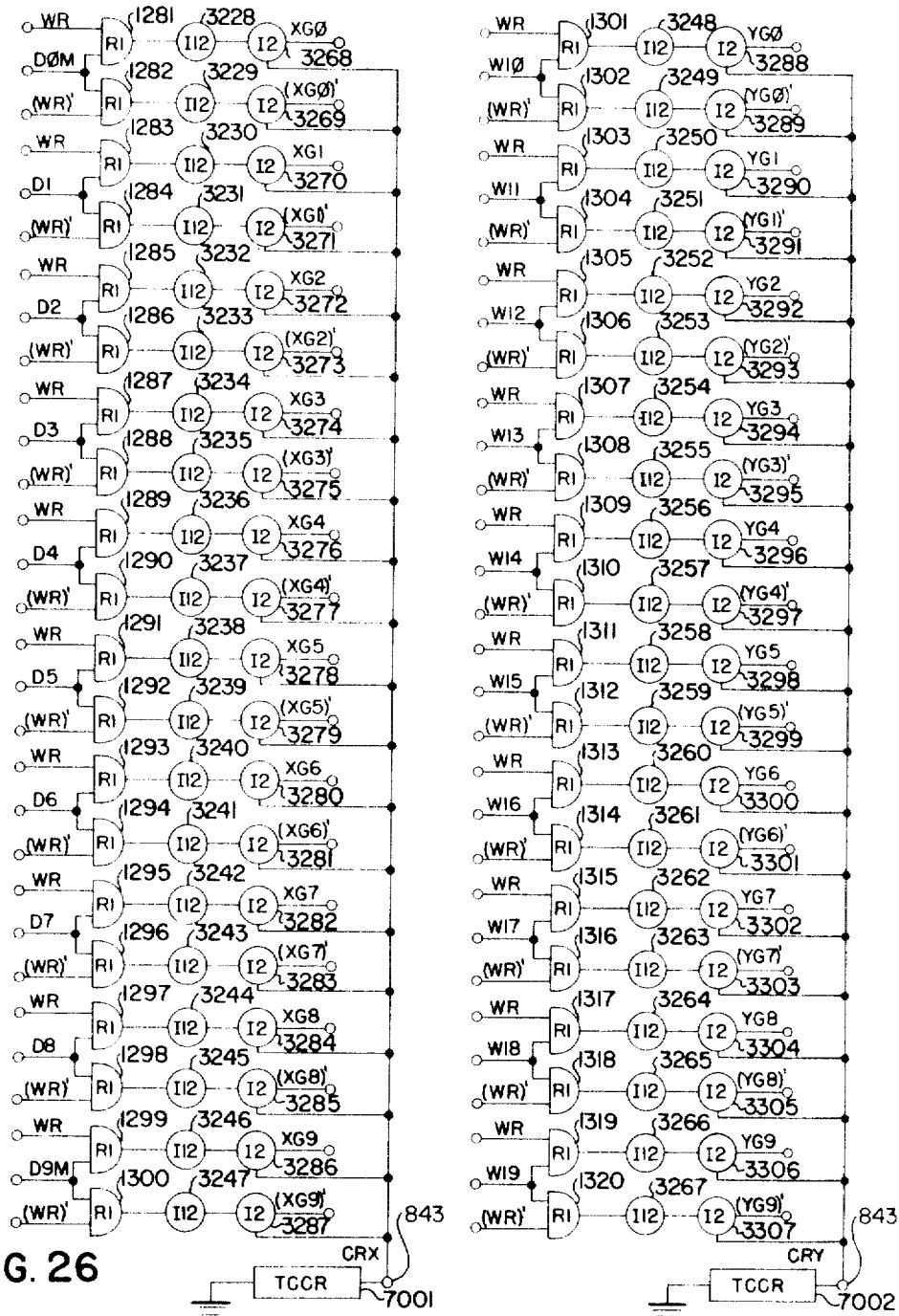
FIG. 26 is a logical diagram of the X and Y grounders.
Figure 29:
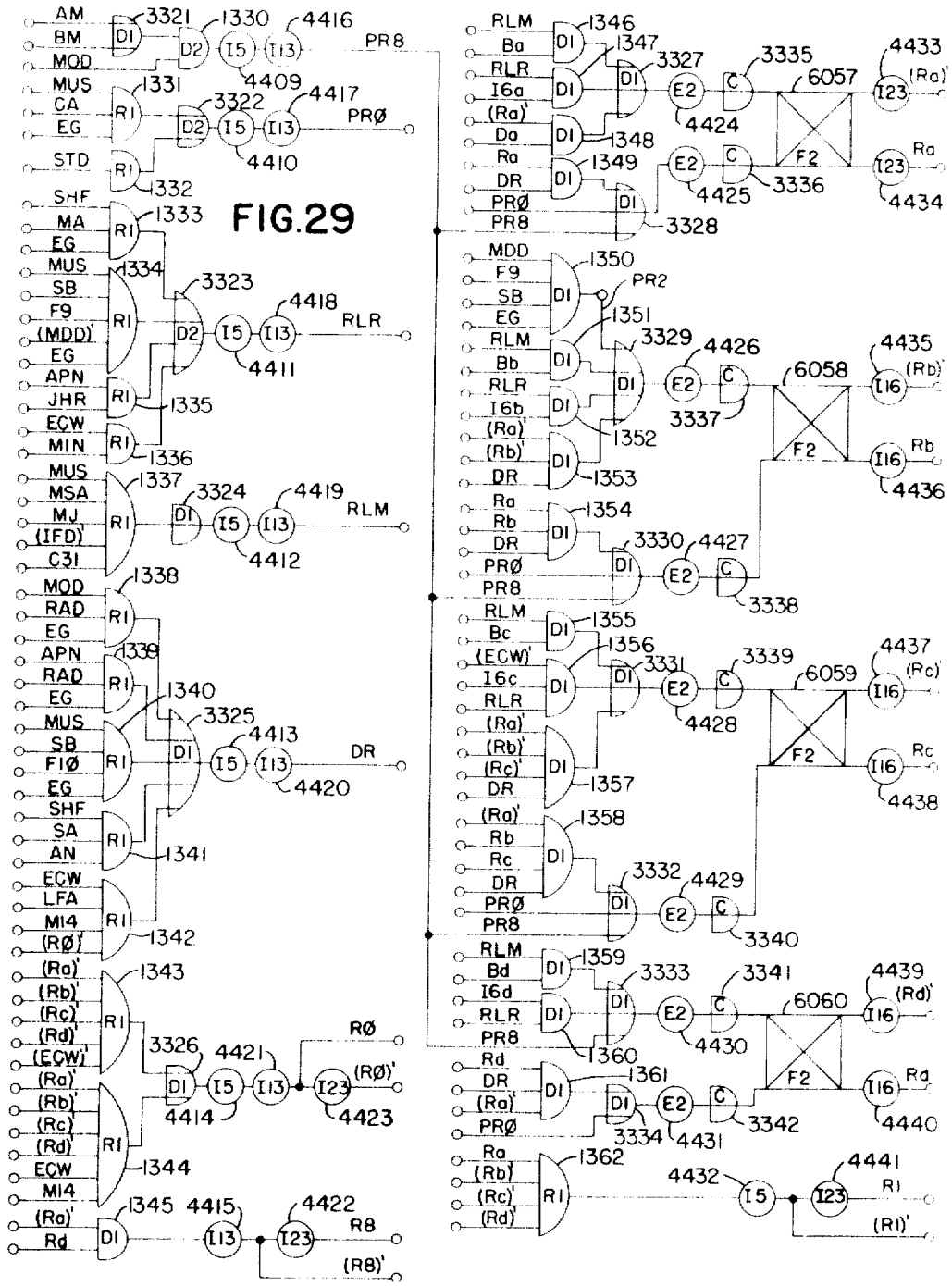
FIG. 29 is a logical diagram of the R-counter.

In the left portion of FIG. 26, there are diagramatically shown two sets of ten X-grounders, one set of ten represented by output lines XG$\phi$ through XG9, and the other represented by output lines (XG$\phi$)' through (XG9)'. Each of the twenty X-grounders comprises a serially-connected network of a two-input logical AND of type "R1," an inverter amplifier of type "I12," and an inverter amplifier of type "I2." The emitter electrodes of inverters 3268 through 3287 are connected together and returned via line CRX to output terminal 843 of temperature-compensated current regulator 7001, which has previously been shown and described in detail in connection with section (g) of FIG. 10.

The mode of operation of each of the X-grounders is somewhat straightforward. When both inputs to any one of logical AND's 1281 through 1300 are simultaneously TRUE, that particular AND circuit effectively causes a constant-current operating potential of approximately −10 volts to be applied to its respective output lead; i.e., one of leads XG$\phi$ through XG9 or (XG$\phi$)' through (XG9)'.

The Y-grounders shown in the right section of FIG. 26 are of essentially identical circuit configuration to the just-described X-grounders, and, as their mode of operation is also essentially the same as that of the X-grounders, a detailed description thereof would result in unnecessary repetition. The prime difference between the X and Y-grounders is that lines WR and (WR)' are individually ANDED with lines D$\phi$M, D1 through D8, and D9M for the X-grounders and individually ANDED with lines W1$\phi$ through W19 for the Y-grounders, lines D$\phi$M, D1 through D8, and D9M being the output leads of a digit counter to be described next.

*12. Digit counter*

Figure 23:
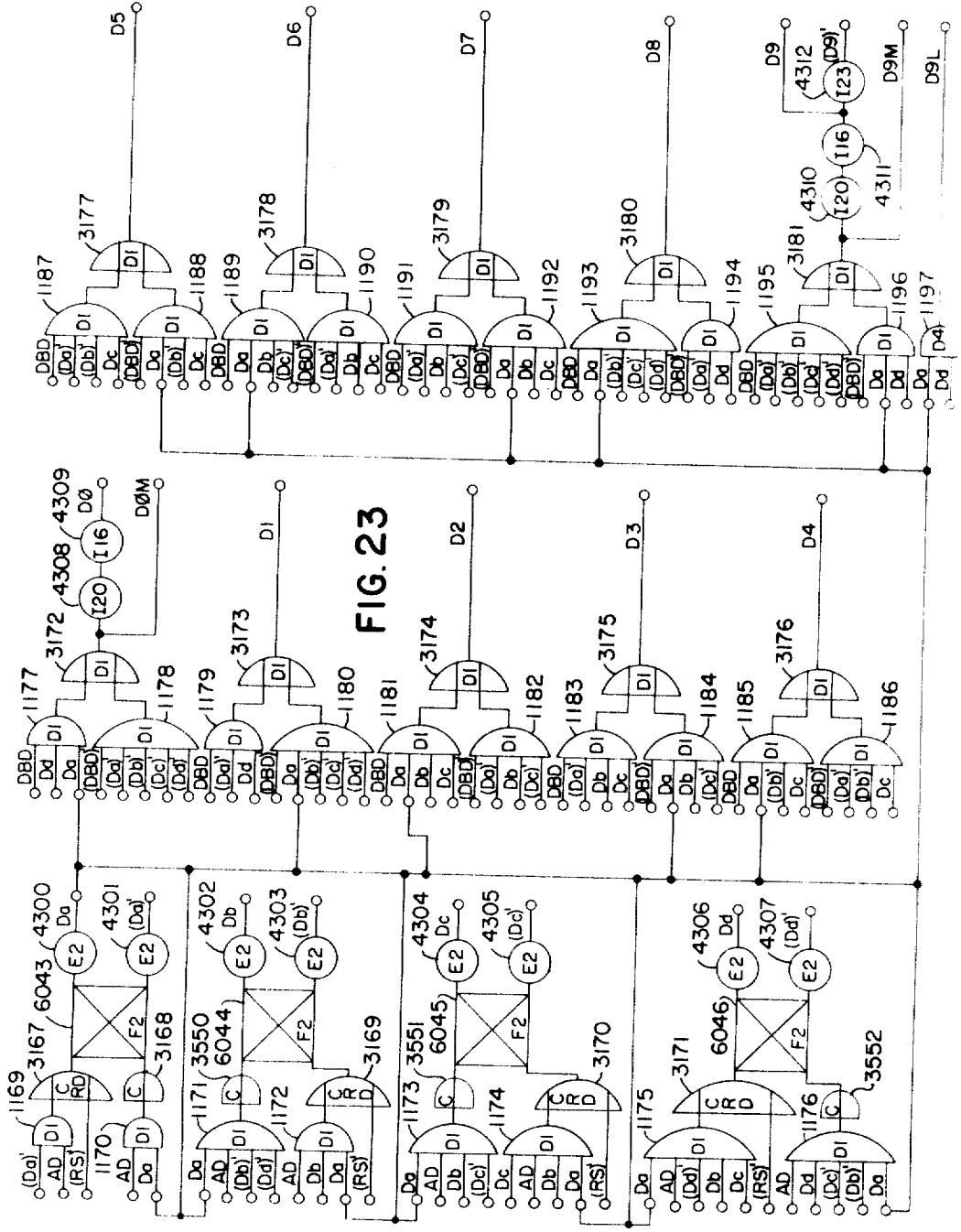
FIG. 23 is a logical diagram of the digit-counter.

With reference to FIG. 23, there is shown a scale-of-ten binary counter, herein called a "digit counter," which is utilized, among other purposes, to select a particular order digit of the word stored in an address in memory. The digit counter includes four type "F2" flipflops 6043 through 6046 effectively connected in cascade in a manner such that, each time line AD goes from TRUE to FALSE, the following takes place: flipflop 6043 changes state; except during a so-called "recycling" mode of operation, which will be described hereinafter, flipflop 6044 changes state if the state of line Da goes from TRUE to FALSE; flipflop 6045 changes state if the state of line Db goes from TRUE to FALSE; and flipflop 6046 changes state if the state of line Dc goes from TRUE to FALSE.

For example, for a count of "0," flip-flops 6043 through 6046 are in a FALSE state; that is, their states are such that lines Da through Dd are FALSE and lines (Da)' through (Dd)' are all TRUE. If it is desired for the digit counter to count in a forward direction (i.e., 0, 1, 2, 3, . . . 7, 8, 9), line (DBD)' is selectively set TRUE. After flipflops 6043 through 6046 are set FALSE, all of the inputs to logical AND 1178 are simultaneously TRUE. Thus, readout line D$\phi$ is also TRUE and thereby represents a count of "0." Thereafter, the first time line AD goes from TRUE to FALSE, flipflop 6043 changes state, and line D1, at that time, is the only readout line that is TRUE, thus indicative of a count of "1." The second time line AD goes from TRUE to FALSE, flipflops 6043 and 6044 both change states, so that line D2 is TRUE, with the remaining readout lines being FALSE. The counting continues until a count of "9" has been reached, as indicated by lines Da and Dd being TRUE. Thereafter, the next time line AD goes from TRUE to FALSE, flipflops 6043 and 6046 both change state, so that lines Da through Dd are thereafter FALSE and lines (Da)' through (Dd)' are thereafter TRUE, thus representing the original count of "0."

When the computer is first turned "ON," or when pushbutton RS1 (FIG. 37) is actuated, the digit counter is preset to a count of "9" by reset line (RS)' going from TRUE to FALSE. There is no need to preset the digit counter to "9" at any other time, as it is always returned to a count of "9" at the conclusion of every "word cycle" or "sub-command," which are to be described hereinafter.

To summarize: the ten readout lines D$\phi$ through D9 individually and sequentially go from FALSE to TRUE, representing counts from "0" through "9" respectively. That is, line D$\phi$ is TRUE when the digit counter is at a count of "0," line D1 is TRUE when the digit counter is at a count of "1," etc. When the digit counter counts in a forward direction, it starts at a count of "9," and for each successive TRUE-to-FALSE change of state of line AD, output line D$\phi$ goes TRUE, and, thereafter, a successively higher-order readout line goes TRUE, the remaining readout lines, of course, being FALSE in each instance.

At certain times, it is desirable to read a word out of memory in reverse order by starting with the tenth-order digit thereof. In this instance, flipflops 6043 through 6046 still essentially count in a forward direction, however; only the manner of decoding the outputs thereof is changed. Such a change is made simply by causing line DBD to be TRUE instead of line (DBD)'. When line (DBD)' is TRUE, the digit counter counts in a forward direction; however, when line DBD is TRUE, the digit counter starts at a count of "0." Thereafter a succession of TRUE-to-FALSE transitions of line AD produces a retrogressive count of 9, 8, 7, 6, . . . 1 and back to 0.

Figure 2:
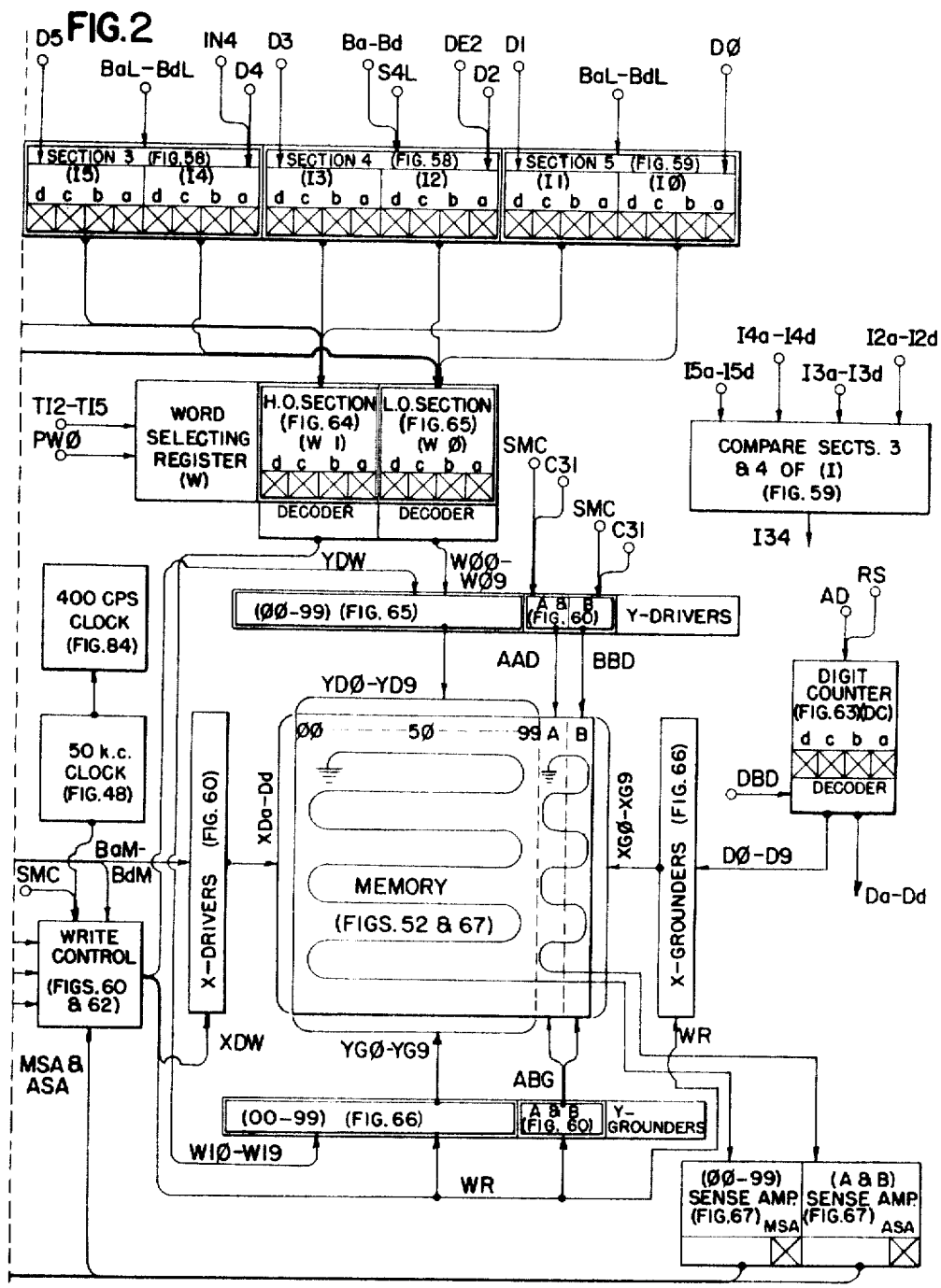

As illustrated in the block diagram of FIG. 2, readout lines D$\phi$ through D9 are also utilized by the computer for various control purposes, in addition to memory digit selection. In addition to the read-out lines following the forward-reverse logic, there is an additional readout line D9L, which is TRUE each time lines Da and Dd are simultaneously TRUE, regardless of whether the digit counter is operating in a forward or a reverse direction.

13. Y-drivers

Figure 25:
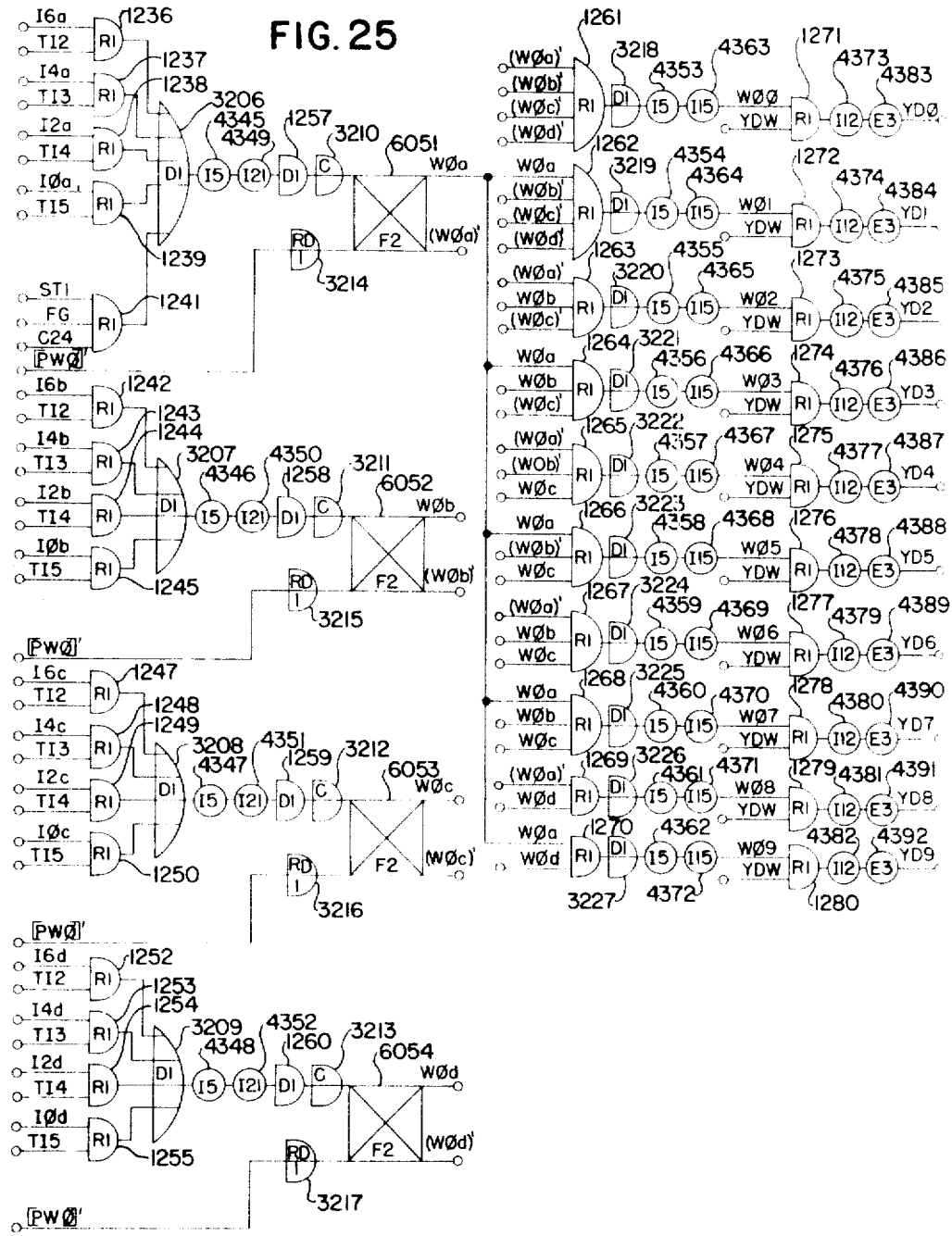
FIG. 25 is a logical diagram of the low-order section of the word-selecting register and a logical diagram of of the Y-drivers.

In the rightmost section of FIG. 25 there are shown ten Y-drivers, whose output lines are respectively labeled YD$\phi$ through YD9. Each driver includes a serially-connected network comprising a two-input type "R1" logical AND, a type "I12" inverter, and a type "E3" emitter follower amplifier. As previously described, by selective energization of line YD$\phi$, all addresses whose low-order digit identification is a "zero" are effectively "selected"; i.e., addresses $\phi\phi$, 1$\phi$, 2$\phi$, . . . 8$\phi$, and 9$\phi$; by selective energization of line YD1 all addresses ending in a "one" are effectively selected; i.e., 11, 21, 31, . . . 81, and 91; by selective energization of line YD2, all addresses ending in a "two" are effectively selected; and so on, with line YD9 effectively selecting all addresses ending in a "nine"; i.e., addresses $\phi$9, 19, 29, . . . 89, and 99. Selective energization of lines YD$\phi$ through YD9 is effected by logically ANDING line YDW with each of lines W$\phi\phi$ through W$\phi$9 which originate at the decoder portion of the low-order digit section of a "word-selecting" register next to be described.

14. Word-selecting register

The word-selecting register is a two-digit register which is utilized to temporarily store a two-decimal-digit number representing the address location of the word in memory from which reading is to take place. That is, the word located in memory at the address corresponding to the number stored in the word-selecting register will be the next word read out upon occurrence of a read-write work cycle. The word-selecting register includes eight type "F2" flipflops, four of which effectively store, in binary-coded form, the low-order digit, and the remaining four effectively store, in binary-coded decimal form, the high-order digit of the address-representing number stored therein.

With reference to FIG. 25, the four flipflops which are utilized to store the low-order decimal digit of the number in the word-selecting register are 6051 through 6054. Flipflop 6051 effectively stores low-order bit "$a$," flipflop 6052 effectively stores second-order bit "$b$," flipflop 6053 effectively stores the third-order bit "$c$," and flipflop 6054 effectively stores the fourth or high-order bit "$d$" of the low-order decimal of the number.

Output lines W$\phi a$ through W$\phi d$ and (W$\phi a$)' through (W$\phi d$)' from flipflops 6051 and 6054 are connected as inputs to a decoder network comprising ten type "R1" logical AND's 1261 through 1270, which are individually cascaded with a type "D1" logical OR, a type "I5" inverter, and a type "I15" inverter. Thus, when the low-order section of the word-selecting register is storing a count of "zero," output lines W$\phi a$ through W$\phi d$ are FALSE, and lines (W$\phi a$)' through (W$\phi d$)' are TRUE. As all of the input lines to logical AND 1261 are simultaneously TRUE, output lines W$\phi\phi$ is TRUE, indicative of the "zero" storage in flipflops 6051 through 6054. In a like manner, it is seen that only one of output lines W$\phi\phi$ through W$\phi$9 of the decoder is TRUE at any given instant, and a TRUE state of each is indicative of a corresponding one of decimal digits "0" through "9" being stored in the low-order section of the word-selecting register.

There are two "presets" for the word-selecting register. The first preset is by means of selective energization of line (PW$\phi$)', which unconditionally presets the word-selecting register to "00." The second preset is by means of selective energization of line ST1, which presets the word-selecting register to "01" representation as indicated by a TRUE state of line W$\phi$1, lines W$\phi\phi$ and W$\phi$2 through W$\phi$9, of course, being FALSE. However, both the low-order section and the high-order section of the word-selecting register must first be set to zero via line (PW$\phi$)' in order for line ST1 to be effective to preset the word-selecting register to "01." The reason for this is that, as shown, line ST1 is effective only in presetting the state of flipflop 6051 and does not affect the states of the remaining flipflops of both sections of the word-selecting register.

Figure 24:
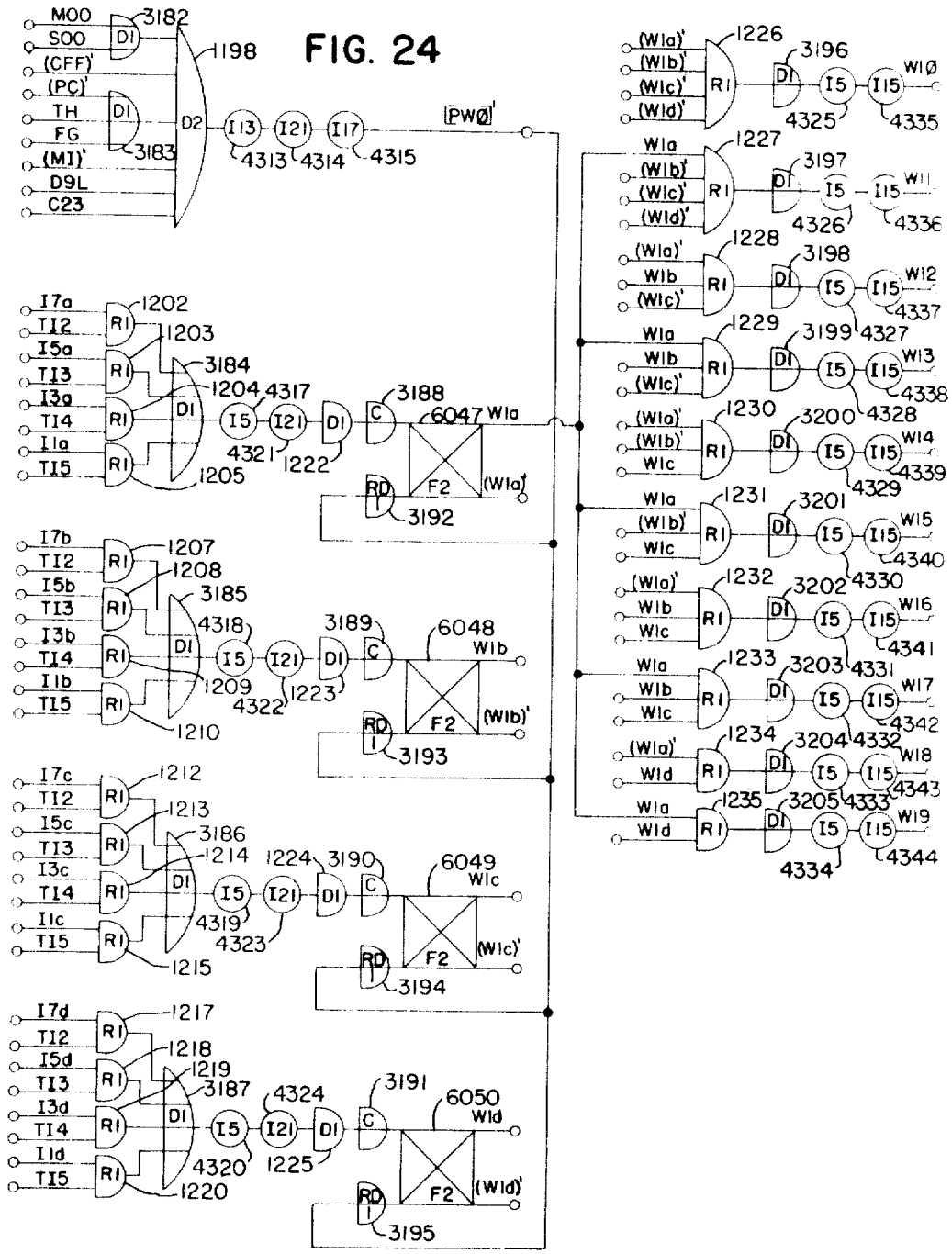
FIG. 24 is a logical diagram of the high-order section of the word-selecting register.

With reference to FIG. 24, the four flipflops which are utilized to store the high-order decimal digit of the number stored in the word-selecting register are 6047 through 6050. The state of flipflop 6047 represents the low-order bit "$a$," the state of flipflop 6048 represents the second-order bit "$b$," the state of flipflop 6049 represents the third-order bit "$c$," and the state of flipflop 6050 represents the fourth or high-order bit "$d$" of the decimal digit. Output lines W1$a$ through W1$d$ and (W1$a$)' through (W1$d$)' from flipflops 6047 through 6050 are connected as inputs to a decoder network comprising ten type "R1" logical AND's 1226 through 1235, which are individually cascaded with a type "D1" logical OR, a type "I5" inverter, and a type "I15" inverter. As in the low-order section of the word-selecting register, as previously mentioned, its high-order section is also unconditionally preset to "zero" by line (PW$\phi$)', which presets the reference outputs of flipflops 6047 through 6050 FALSE.

Included in the high-order section of the word-selecting register are ten readouts which decode the decimal digit representation as represented by the states of flipflops 6047 through 6050, the readouts being by way of output lines W1$\phi$ through W19. For example, when the high-order digit in the word-selecting register is a "0," only line W1$\phi$ is TRUE. Line W11 is TRUE only when the high-order digit is a "1," and so on, so that line W19 is TRUE only when the high-order digit is a "9." The ten output lines W1$\phi$ through W19 are each logically ANDED with each of lines WR and (WR)', as shown in FIG. 26, to selectively energize the Y-grounders which effectively select the high-order digit of the address in memory of the word to be read out upon occurrence of the next read-write cycle.

15. Summary of word-selection

There has now been shown and described the mode of selection of a particular string or addresses of cores and how a particular binary bit of a particular digit of the word is selected during a read-write cycle of operation. However, in summary, the word-selecting register effectively stores a two-digit decimal number which corresponds to the address in memory that is to be effected during the next read-write cycle. Even though there are, in fact, only twenty readout lines W$\phi\phi$ through W19 for the word-selecting register, in combination they effectively function as one hundred readouts. In other words, one of lines W1$\phi$ through W19 is TRUE, indicative of the high-order digit of addresses $\phi\phi$ through 99. At the same time, one of lines W$\phi\phi$ through W$\phi$9 is TRUE, indicative of the low-order digit of the address. As an illustrative example, address 96 is represented by lines W19 and W$\phi$6 simultaneously being TRUE; address 48 is represented by lines W14 and W$\phi$8 simultaneously being TRUE, and so on. Thus, a half-select current is allowed to flow in the "Y" direction only in the vertical string of cores located in the address corresponding to the number stored in the word-selecting register. The number in the word-selecting register remains therein during the entire time the ten-digit word is being read out of memory. Other suitable means have been provided for selecting addresses A and B, as will later be seen.

The bit and digit counter combination determines which row of cores is to receive a half-select current impulse during a read-write cycle. That is, the output of the bit counter determines which bit is to be read out—i.e., bit "$a$," "$b$," "$c$," or "$d$," and the digit counter determines which order digit is to be read out. For example, if the bit counter is at "$a$" and the digit counter at "1," a half-select current impulse is permitted to flow only through the row of cores corresponding to the low-order bit of the second-order digit. If the bit counter is at "$d$" and the digit counter at "9," a half-select current impulse is permitted to flow only through the row of cores corresponding to the high-order bit of the tenth-order digit, and so on.

16. *Synchronizing clocks*

Before going into a detailed description of a complete read-write cycle of a word stored in a particular address in memory, it is deemed desirable, at this point, to briefly describe the various "clocks" which are utilized by the computer for synchronization purposes, to insure the proper sequence of data handling and transfer.

With reference to FIG. 45, a 50-kilocycle multivibrator 6125, substantially identical to the one heretofore shown and described in connection with section (*a*) of FIG. 9, has the reference output thereof essentially connected, through AND gates 1778 and 1779, to both the reference and the prime inputs of flip-flop 6127. As multivibrator 6125 is essentially a 50 kc. square-wave generator, the signal voltage appearing on the reference output lead MV thereof is as shown by the topmost waveform in FIG. 49. If at "TIME–1" the state of line MV is reversed from TRUE to FALSE, the state of line MV reverses from FALSE back to TRUE ten microseconds later at "TIME–2." Ten microseconds later, at "TIME–3," the state of line MV again reverses from TRUE to FALSE, and so on. As heretofore mentioned, the state of line (MV)′ is effectively 180 degrees out of phase with the state of line MV.

If it is assumed that directly preceding TIME–1 the states of lines MV and C31 are both TRUE, as shown, at TIME–1 the reference input to flipflop 6127 is reversed from TRUE to FALSE. Consequently, flipflop 6127 is triggered so that the state of line C31 is rendered FALSE and the state of line C13 is rendered TRUE. At TIME–3, when the state of line MV again is reversed from TRUE to FALSE, the state of line C31 is rendered TRUE and the state of line C13 is rendered FALSE. This sequence of events is continually repeated during operation of the computer.

At TIME–2, the state of line (MV)′ is reversed from TRUE to FALSE, and consequently, flipflop 6128 is triggered so that the state of line C42 is thereby rendered FALSE and the state of line C24 is thereby rendered TRUE. At TIME–4, when the state of line (MV)′ again reverses from TRUE to FALSE, the state of lines C42 and C24 are reversed. At TIME–1, when the state of line C31 reverses from TRUE to FALSE, flipflop 6129 is triggered so that the state of line C41 is thereby rendered FALSE, and simultaneously therewith, the state of line C41 is rendered TRUE. Thirty microseconds later, the state of line C24 reverses from TRUE to FALSE. Therefore, at TIME–4, flipflop 6129 is reset to its initial state, so that immediately thereafter the state of line C41 is rendered TRUE and the state of line C14 is simultaneously rendered FALSE.

As shown, output lines C31, C13, C42, and C24 are variously connected as inputs to flipflops 6129 through 6132 to provide suitably phased clock pulses on output lines C41, C14, C43, C34, C23, and C12. It is to be noted that the highest-order numeral designation thereof denotes the time at which the state of that particular line is rendered TRUE and the lowest-order numeral designation denotes the time at which the state of that particular line is rendered FALSE. For example, the state of line C41 is rendered TRUE at each TIME–4 and FALSE at each TIME–1, the state of line C23 is rendered TRUE at each TIME–2 and FALSE at each TIME–3, and so on.

The 400-cycle multivibrator 6126 has a "period" of approximately 1.24 milliseconds. Consequently, due to the synchronizing action with respect to the state of line C41, as heretofore described in connection with section (*b*) of FIG. 9, the state of line ICC is rendered TRUE and the state of line (ICC)′ is rendered FALSE at TIME–1; approximately 1.24 milliseconds thereafter, at TIME–1, the state of line ICC is rendered FALSE and the state of line (ICC)′ is rendered TRUE. Again, approximately 1.24 milliseconds thereafter, at TIME–1, the state of line ICC again is rendered TRUE and the state of line (ICC)′ is again rendered FALSE. As this sequence of events is continually repeated during operation of the computer, it is evident that the output from the 400-cycle multivibrator 6126 is effectively synchronized with the output from the 50-kc. multivibrator 6125.

17. *Detailed read-write cycle*

Figure 20:
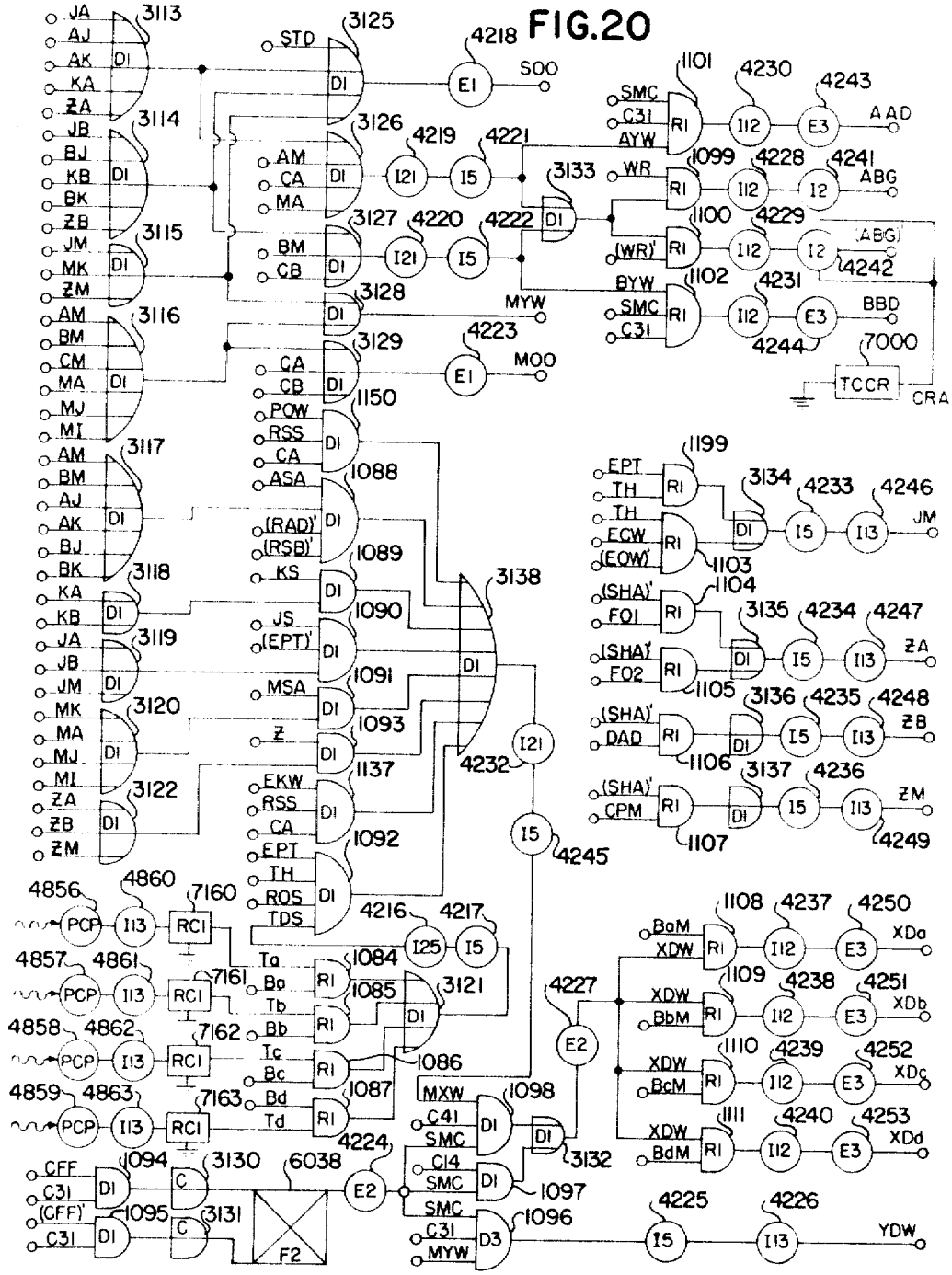
FIG. 20 is a portion of the logical diagram of the read-write, digit-cycle, word-cycle and subcommand initiating circuitry.

With reference to FIG. 20, during a complete read-write cycle of a word stored in a particular address in memory, line SMC is TRUE for a period of 1600 microseconds, and line MYW is TRUE for a period of 1650 microseconds. Therefore, as all the inputs to logical AND 1096 are simultaneously TRUE at TIME–3, line YDW also goes TRUE at TIME–3 and stays TRUE for a period of 20 microseconds until TIME–1; at TIME–1, line YDW goes FALSE and stays FALSE for 20 microseconds until TIME–3; at TIME–3 line YDW again goes TRUE, and so on. Thus, it is seen, at TIMES 1 and 3, line YDW goes FALSE and TRUE, respectively, for periods of 20 microseconds each. This is done to permit one of Y-driver output lines YD$\phi$ through YD9 (FIG. 25) to be selectively energized for a period of 20 microseconds by selected ones of output lines W$\phi\phi$ through W$\phi$9 of the decoding portion of the low-order section of the word-selecting register, as will more fully be described hereinafter.

As previously described in connection with FIG. 26, selected pairs of Y-grounder output lines YG$\phi$–(YG$\phi$)′, YG1–(YG1)′ . . . YG9–(YG9)′ are conditioned at predetermined times by a corresponding one of output lines W1$\phi$ through W19 of the decoding portion of the high-order section of the word-selecting register (FIG. 24), a selected one of each pair being selectively energized by one of lines WR and (WR)′. As shown in FIG. 26, lines WR and (WR)′ alternately effect energization of only one of the Y-grounder output lines. That is, only one of the Y-grounder output lines is energized at any given time; when that particular Y-grounder output line is de-energized, another Y-grounder output line is energized, and so on. This is clearly illustrated in the timing chart of FIG. 48, which is to be referred to, from time to time, during the following detailed description of a complete read-write cycle.

It will be assumed that it is desirous to read a word out of memory address $\phi\phi$, that the reading operation is to begin with the lowermost core in address $\phi\phi$, and that all data read out is to be re-stored in address $\phi\phi$. Thus, to begin the reading operation, lines (WR)′ and W1$\phi$ (FIG. 26) simultaneously go TRUE, thereby energizing Y-grounder output line (YG$\phi$)′ at TIME–1, as shown in the just-mentioned timing chart of FIG. 49. Simultaneously therewith, lines XDW and B$a$M (FIG. 20) go TRUE, thereby energizing X-driver output line XD$a$ at TIME–1. Also simultaneously therewith, lines D$\phi$M and (WR)′ (FIG. 26) are TRUE to energize X-grounder output line (XG$\phi$)′ also at TIME–1. Consequently, as both the X-driver, XD$a$, and the X-grounder (XG$\phi$)′ (FIG. 11) are simultaneously energized at TIME–1, a current impulse of half-select magnitude (approximately 180 ma.) flows from left to right through the bottom row of cores to "half-select" each of the cores in the row toward a binary "zero" representation, as previously described, the binary value of the low-order bit of the first-order digit of the word stored in memory address $\phi\phi$ being represented by the initial state or direction of magnetization of core 885, as before stated.

Twenty microseconds later, at TIME–3, line YDW (FIG. 20) goes TRUE to effect energization of Y-driver output line YD$\varphi$ (FIG. 25). Thus, as the Y-driver output line YD$\varphi$ and Y-grounder output line (YG$\varphi$)′, shown in FIG. 11, are both, for the first time, simultaneously energized at TIME–3, a current impulse of half-select magnitude (approximately 180 ma.) flows downwardly through the leftmost column of cores to "half-select" each of the cores in address φφ toward a binary "zero" representation. As the magnetic fields produced by the two half-select currents are additive in the region of core 885 only, immediately following TIME–3 core 885 is the only core in the entire memory that is magnetically set to a binary "zero" representation at this time. If it is assumed that core 885 previously was in a magnetic remanent state representative of a binary "one," the state of magnetization of the core is reversed immediately following TIME–3. Consequently, with respect to terminal 872, a negative-going output pulse is induced in memory sense winding 871 (FIG. 11) having a peak amplitude occurring approximately 3 microseconds after TIME–3.

The negative-going output pulse induced in memory sense winding 871 renders memory sense amplifier 4399 (FIG. 27) conductive during presence thereof, so that the uppermost input to logical AND 1163 goes TRUE during presence of the pulse from memory, as shown in FIG. 48. Assuming that the signal on the lowermost input to AND 1163 from flipflop 6149 is also TRUE, both of the common-load transistors making up AND 1163 (FIG. 7j) are rendered non-conductive, so that the signal applied to the reference input of flipflop 6055 goes FALSE approximately 3 microseconds after TIME–3 and flipflop 6055 is trigged thereby, so that output line MSA goes TRUE, indicating that a binary "one" had previously been stored in core 885 (FIG. 11); output line (MSA)', when TRUE, indicates that the core was previously storing a binary "zero."

At TIME–4, line (WR)' goes FALSE (FIG. 26) and line WR goes TRUE. Therefore, X and Y-grounder lines (XGφ)' and (YSφ)' are both de-energized, and simultaneously therewith, X and Y-grounder lines XGφ and YGφ are energized. As core 885 (FIG. 11) was previously storing a binary "one," X and Y-driver output lines XD*a* and YDφ remain energized, and, consequently, a full-select current impulse flows through the core in the opposite direction to "re-set" the core back to its initial binary "one" state immediately following TIME–4.

However, if the core had been initially storing a binary "zero," instead of a binary "one," a voltage impulse would not have been induced in the memory sense winding, and, consequently, output line MSA (FIG. 27) remains FALSE instead of going TRUE, thus indicative of the binary "zero" storage in core 885. In that instance when line MSA remains FALSE, line MXW (FIG. 20) likewise remains FALSE, and, consequently, not all of the inputs to logical AND 1098 are TRUE, as before. As a result, line XDW goes FALSE and causes X-driver output line XD*a* to be de-energized. This is illustrated in FIG. 48 by the dotted portion of the output signal representation of X-driver line XD*a* between TIME–4 and TIME–1 for bit "*a*." X-driver line XD*a* now being de-energized at TIME–4, a binary "one" representing half-select current flows through core 885 in the Y direction only, and, consequently, the core is not "reset" to a binary "one" state, but, instead, remains in its initial binary "zero" state.

It is to be noted that, during a read-write cycle, half-select current is first applied in the X direction for a period of 20 microseconds—i.e., from TIME–1 to TIME–3—before a coincidental half-select current is applied in the Y direction through the core being "read." One reason for operating the computer memory in this manner is due to the physical placement of memory sense winding 871 (FIG. 11). Due to the fact that the sense winding is oriented parallel with respect to the conductors threaded through the core in the X direction, when a half-select current is first applied in the X direction, a voltage impulse is induced in the sense winding even though the magnetic state of each core remains unchanged. In fact, the amplitude of this voltage may be from ten to fifteen times greater than the amplitude of the voltage induced in the sense winding due to a "change-of-state" of one of the cores. Consequently, it is desirable to allow sufficient time to lapse after application of a half-select current in the X direction so that this unwanted voltage impulse is dissipated and thus alleviate any undesirable effects therefrom.

Another reason for this 20-microsecond delay is that a half-select current through a core causes a noise impulse to be induced in the sense winding especially if the previous half-select current through the core was in the opposite direction. The amplitude of this noise impulse is, in most instances, approximately 7 millivolts per core and requires from ten to fifteen microseconds to be dissipated. As there are 100 cores in the X direction per row, and, as the noises from all of the cores in each row is additive, the total maximum amplitude of the noise impuse is approximately 700 millivolts.

In an attempt to simplify the description and to insure a complete understanding of the inherent complexity of the mode of operation of the computer memory, it has been assumed to this point that all of the cores making up memory addresses φφ through 99 and addresses A and B are magnetized in the same direction to represent either a binary "one" or a binary "zero." However, in the actual operation of the computer memory, this is not the case, the reasons for which are as follows:

As previously described with respect to FIGS. 11 and 12, memory sense winding 871 is sequentially threaded in the same direction through every other one of the forty rows of cores making up the entire memory. Thus, if every core in the memory was magnetically set in the same direction to represents, say, a binary "one," opposite polarity output pulses are induced in the memory sense winding during a read-write cycle, all of which pulses individually represent a binary "one" storage in the respective core. For example, the cores making up the odd-numbered rows are responsible for output pulses of one polarity indicative of a binary "one" storage, whereas the cores making up the even-numbered rows are responsible for output pulses of an opposite polarity also indicative of a binary "one" storage.

Also, as previously mentioned, it has been found that a subsequently-applied half-select current impulse through a core causes a noise impulse to be induced in the sense winding if the previously-applied half-select current impulse through the core was in the opposite direction to the subsequently-applied half-select current impulse; however, the subsequently-applied half-select current impulse through the core causes a much smaller ampltiude noise impulse to be induced in the sense winding if the subsequently-applied half-select current impulse is in the same direction as the previously-applied half-select current impulse.

Therefore, to alleviate the need for sensing amplifiers which must be responsive to input impulses of opposite polarity, and also, during reading of a particular core, in order to subsequently apply a half-select current impulse therethrough in the Y direction, which is in the same direction as the half-select current impulse previously applied in the Y direction therethrough during writing of a previously-read core, it has been found desirable during the operation of the memory of the present computer for all of the cores making up the odd-numbered rows to be magnetically set in one direction to represent storage of a binary "one" and for all of the cores making up the even-numbered rows to be magnetically set in the opposite direction to represent storage of a binary "one." Consequently, during a read-write cycle of operation, binary "one" signifying impulses of the same polarity are induced in the memory sense winding, and thus the sense amplifiers need only be responsive to single polarity impulses; and, also, much smaller amplitude noise impulses are induced in the sense winding during the reading operation.

With the foregoing in mind, the next portion of the read-write cycle will be described and directed to bit 'b' of the low-order digit of the word stored in address bϕ.

Figure 21:
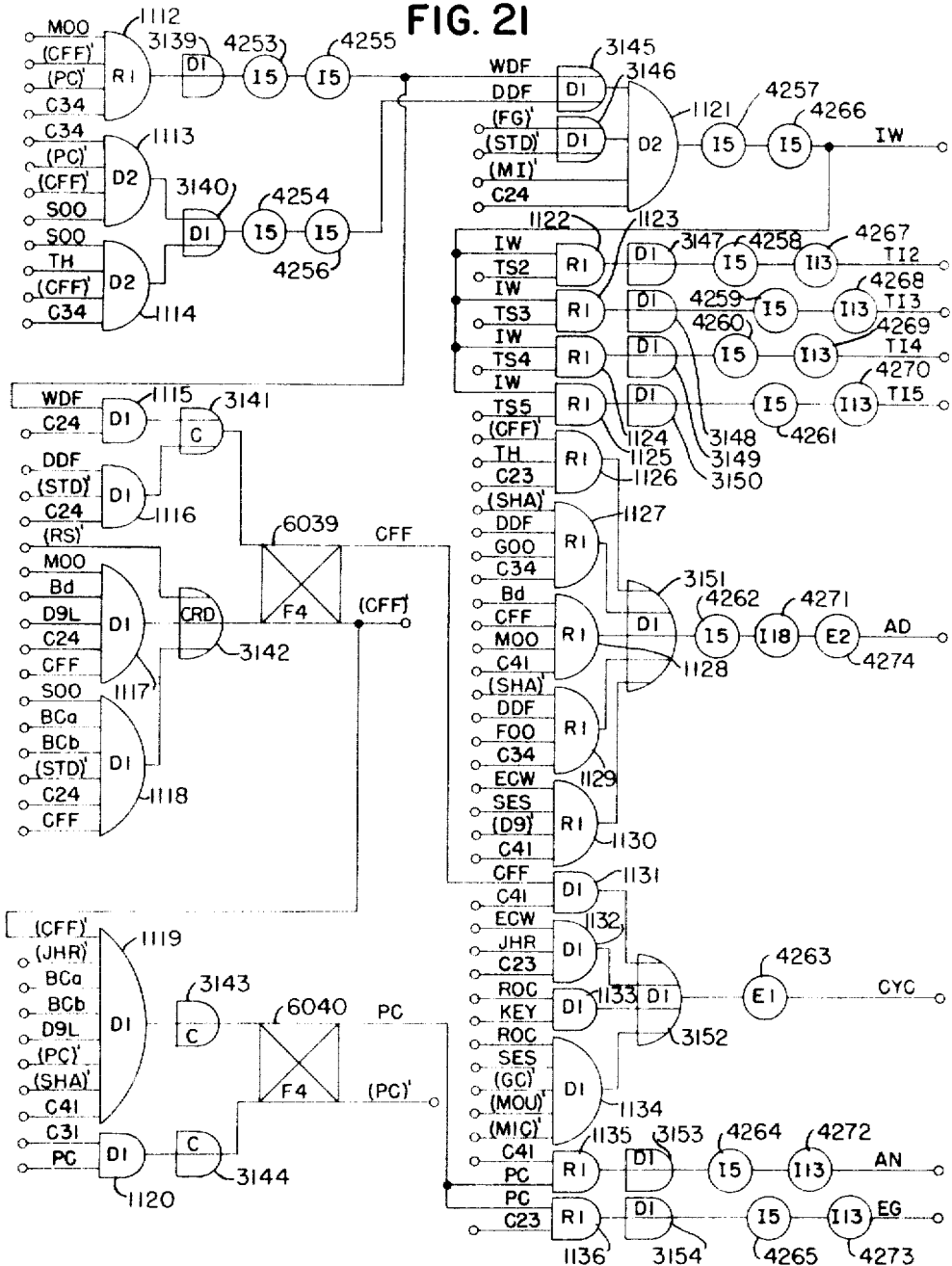
FIG. 21 is an additional portion of the logical diagram of the read-write, digit-cycle, word-cycle and subcommand initiating circuitry.

Now that core 885 (FIG. 11) has been read and then 'reset' to represent its initial binary "one" storage, line CYC (FIG. 21) goes from TRUE to FALSE at the following TIME–1, measured with respect to bit "b." As previously described in detail with respect to the bit counter shown in FIG. 22, when line CYC goes FALSE for the second time, line BaM goes FALSE, line BbM goes TRUE, and lines BcM and BdM remain FALSE. As line XDW (FIG. 20) also goes TRUE at TIME–1, X-driver output line XDa is de-energized and output line XDb is energized at TIME–1, as shown in FIG. 11. As line YDW (FIG. 20) goes FALSE at each TIME–1, Y-driver output line YDϕ (FIGS. 25 and 11) is de-energized, and, consequently, the half-select current in the Y direction through the cores of address ϕϕ is thereby not permitted to flow. However, as X-grounder line XGϕ (FIG. 12) remains energized during TIME–1, and as X-driver line XDb is energized for the first time at TIME–1, a half-select current flows from right to left through core 886 to "half-select" the magnetic state of core 886 indicative of a binary "zero." It is to be noted that the half-select current in the X direction through core 885 flowed from left to right, instead of right to left, to magnetically "half-set" core 885 toward a binary "zero" representation. Thus, it is seen, the half-select read current flows in one direction through the cores in the even-numbered rows and in the opposite direction through the cores in the odd-numbered rows.

At TIME–2, flipflop 6055 (FIG. 27) is reset by line C42 so that output line MSA is thereafter FALSE. At TIME–3, line YDW (FIG. 20) goes TRUE to again effect energization of line YDϕ (FIG. 25). Thus, as Y-driver output line YDϕ and Y-grounder line YGϕ (FIG. 11) are both simultaneously energized at TIME–3, a current impulse of half-select magnitude flows upwardly through core 886 to cause "full-selection" of the magnetic state of core 886 to a binary "zero" representation. If it is assumed that the magnetic state of core 886 is indicative of a binary "one," the state of magnetization of the core is reversed immediately following TIME–3, and, consequently, a negative-going impulse is again induced in memory sense winding 871 (FIG. 11) with respect to termnal 873, approximately three microseconds after TIME–3, as before.

As before, the negative-going impulse induced in memory sense winding 871 causes the reference input to flipflop 6055 to go FALSE shortly after TIME–3, and, consequently, flipflop 6055 is triggered so that line MSA is TRUE, indicating that a binary "one" had previously been stored in core 886. At TIME–4, (WR)' goes FALSE (FIG. 26) and line WR goes TRUE. Consequently, X and Y-grounder lines XGϕ and TGϕ are both de-energized, and, simultaneously therewith, lines (XGϕ)' and (YGϕ)' are energized. As core 886 was previously storing a binary "one," X and Y-driver output lines VDb and YDϕ remain energized for ten microseconds longer to effect "resetting" of core 886 back to its initial binary "one" state immediately following TIME–4.

The previously-described sequence of events is now repeated with respect to cores 887 and 888 and also with respect to the remaining ones of the forty cores making up address ϕϕ. In the illustrative example given, as evidenced by the presence and absence of memory sense amplifier pulses (FIG. 48), the binary number stored in cores 885 through 888, corresponding to low-order bit "a" through the high-order bit "d," is "0111," thus indicating that the low-order digit of the word stored in address ϕϕ is a "seven."

To summarize: Alternate cores of each memory address are magnetically set in one direction to represent a binary "one," whereas the remaining cores in the address are magnetically set in the opposite direction to represent a binary "one." When the core representing bit-α of the low-order digit is read (i.e., core 885), a half-select "read" current in the X direction flows to the right through core 885 at the first TIME–1. At TIME–3, a helf-select read current in the Y direction flows downwardly through core 885 at the first TIME–3 to magnetically set core 885 toward binary "zero." If the core was originally storing a binary "one," its magnetic state is therefore reversed, and a negative-going voltage pulse is induced in memory sense winding 871, which causes the half-select currents in the X and Y directions through core 885 to be reversed to magnetically reset core 885 to binary "one" at TIME–4. At the second TIME–1, a half-select current flows to the left in the X direction through core 886. At the second TIME–3, a half-select current flows upwardly through core 886 to magnetically set core 886 to binary "zero." If core 886 was originally storing a binary "one," a second negative-going potential impulse is induced in the memory sense winding to cause the half-select currents in the X and Y directions through core 886 to be reversed to reset core 886 to binary "one" at the second TIME–4. As before stated, this sequence of events is sequentially repeated from the lowermost to the uppermost of the cores making up address ϕϕ.

18. Sense-amplifier strobe

With reference to FIG. 27, inverter 4393 is effectively connected in series with memory sense winding 871, and inverter 4395 is effectively connected in parallel with respect to the memory sense winding. As shown, inverter 4395 is rendered non-conductive from TIME–3 to TIME–4 by line C34, and inverter 4393 is rendered conductive from TIME–3 to TIME–4 by line C43. Thus, as inverter 4395 is non-conductive during the time each of the memory cores is being read, the inverter exerts essentially no effect on sense winding 871; however, as inverter 4393 is conductive during the time each core is being read, the lower end of sense winding 871—i.e., terminal 872—is effectively grounded thereby during that time to complete the circuit therethrough. From TIME–4 to TIME–3, sense winding 871 is effectively open-circuited by inverter 4393 and effectively short-circuited by inverter 4395, thus rendering sense winding 871 non-effective at all times except for the time interval during which reading of a memory core is to take place.

As previously described with respect to FIG. 48, if a binary "one" was previously stored in the core being read, the output of a memory sense amplifier is TRUE after a time lapse of approximately three microseconds after TIME–3. Thus, to prevent undesirable noise impulses from entering the system, the output of sense amplifier 4399 is sampled, or "strobed," for a period of approximately three microseconds, starting approximately three microseconds after each TIME–3. Strobing is effected by a three-microsecond one-shot flip-flop 6147, which is triggered at TIME–3 by line C31, so that the prime output thereof goes FALSE at TIME–3 and remains FALSE for a period of three microseconds, after which time the prime output thereof returns to a TRUE condition. The prime output of flip-flop 6147 is connected to the reference input of a three-microsecond one-shot flip-flop 6149, so that, after a time lapse of three microseconds after TIME–3—i.e., when the prime output of flip-flop 6147 goes TRUE—the reference output of flip-flop 6149 goes TRUE and stays TRUE for a period of three microseconds, after which time the reference output thereof goes FALSE. Therefore, the lowermost input line to logical AND 1163 goes TRUE oly after a time lapse of three microseconds after TIME–3, and stays TRUE for a period of only three microseconds.

As previously described, memory addresses A and B (FIG. 12) have a common sense winding 891 separate from the main memory sense winding 871. Memory addresses A and B have a common pair of Y-grounder lines (ABC)' and ABG and separate Y-driver lines AAD and BBD (FIG. 20), which function in the same manner as the just-described Y-grounder and Y-driver lines for memory addresses $\phi\phi$ through 99. Thus, it is possible to read and write in only one of memory addresses A or B at any given time, the same as for memory addresses $\phi\phi$ through 99. However, as addresses A and B have a separate sense winding from addresses $\phi\phi$ through 99, a word from either of addresses $\phi\phi$ through 99 may be read out simultaneously with the word being read out of address A or B. Because of the common X-driver and X-grounder lines, it is not possible to write separate words in both a memory address and either of addresses A or B. However, the same word may be written in both addresses. As shown in FIG. 27, the output of A and B sense amplifier 4400 is strobed by single-shot flip-flops 6148 and 6150 in exactly the same manner as memory sense amplifier 4399, as was just described in detail. The strobed signals from sense amplifier 4400 operates a transistor logical AND 1164, which triggers flip-flop 6056 in response to a negative-going impulse from A and B sense winding 891. As the complete read-write cycle of operation of addresses A and B is, for all practical purposes, exactly the same as the just-described read-write cycle for memory addresses $\phi\phi$ through 99, a description thereof would only result in an undue repetition, which is not deemed necessary for a full understanding of the mode of operation thereof in view of the just-described read-write cycle for memory addresses $\phi\phi$ through 99.

*19. Format of instruction words generally*

In order to perform the functions of a "general purpose" type computer, the present computer is provided with eighteen different types of general purpose "instructions" which it, in a sense, "obeys" in order to allow the programmer to solve almost any type of mathematical problem. For reasons to become more apparent hereinafter, the just-described magnetic core memory stores both "instruction" words and data words, which appear as one and the same as far as the computer memory is concerned—i.e., a ten-digit decimal number—and, to alleviate the necessary of providing "plus" or "minus" indications to identify positive and negative numbers, a negative number is stored in the computer memory as its complement. For example, the minimum negative number that is effectively stored is 0000000001, whose complement is 9999999999; the maximum negative number that is effectively stored is 1000000000, whose complement is 9000000000. Thus, the maximum positive number stored is 8999999999. Both data and instruction words may essentially be stored in the computer memory either by indexing the words in the accounting machine keyboard portion of the computer, by totaling or subtotaling selected totalizers of the accounting machine, by reading the words from the magnetic strip portion of the ledger cards, or by reading the words from punched cards or paper tapes via conventional, commercially-available paper tape and card readers.

Programming the computer consists essentially of writing two related programs, the first program of which is written for the accounting machine portion of the computer, which programming consists of designing mechanical stops which are placed on the form-bar portion of the accounting machine, in a manner fully described in the before-referred-to Patent No. 2,626,749. In programming the accounting machine, the programmer decides at what carriage columnar position the program is to start and the columnar position to which the carriage is to be moved by subsequent machine cycles. The stops on the form bar may be thought of as "instructions" to the accounting machine which are physically located in unique places on the form bar, a group of stops (i.e., instructions) being termed a "program."

The program is effectively carried out by the accounting machine, by "sampling" each stop, starting with the first stop, and performing the sequence of actions called for by each stop as the carriage sequentially moves from stop to stop. Finally, the carriage is returned to the first stop to permit the program to be repeated if desired. It is to be noted, however, that only one instruction is carried out at any given time. The mere placing of the form bar on the accounting machine, or the placing of particular stops on the form bar, does not, in and of itself, cause the accounting machine to carry out the operation specified by either of the stops.

The second program essentially to be written is in the form of a sequential group of instruction words, that are to be stored in the computer memory, comprising a group of words ten decimal digits in length. The computer "samples" only one of these words at any one time, and, after carrying out that particular instruction, the computer then samples the next instruction word. The mere placement of the instruction words in the computer memory does not cause any instruction to be carried out, in the same manner that the mere placement of a form bar on the accounting machine does not necessarily cause any of the stops to be sampled.

To start the accounting machine program, a machine cycle is first initiated, which allows the accounting machine to "sample" the first stop in the program and carry out that particular instruction. After the computer carries out its instruction, it effectively "moves on" to the next instruction in the program, just as the accounting machine "moves on" to the next stop on the form bar. If desired, the computer program may be so written that the computer returns to the first instruction after it has finished the last instruction, to permit the program to be repeated.

As previously mentioned, there are eighteen basic instructions which the computer executes. Five of these basic instructions concern the ledger card and the accounting machine; one concerns reading paper tape; and twelve are concerned with arithmetic and control functions within the computer. Of these eighteen different types of instruction words, there are three types of instruction word formats. The first type of instruction word format is that of a "modified three" or "four address" instruction word. Nine of the basic instruction words have a second type of format, which takes advantage of the ability of the computer to increment addresses in an instruction word, as will be more fully described hereinafter. The remainder of the basic instruction words have a third type of format, which is peculiar to the function effected by that particular instruction word.

The structure of every instruction word is effectively "divided" into five groups of two decimal digits each, with each group hereinafter being called a "section." The first section is the two highest-order decimal digits of the instruction word and represents the code number identifying that particular instruction, the code numbers ranging from 00 through 17; the second section normally identifies either the memory address location of the first data word or the address of an instruction modifier; the third section normally identifies the address location of either the first or the second data words; the fourth section generally identifies the address of the result; and the fifth section usually identifies the address of the next instruction word in the program.

As an example of a format of a particular instruction word, an "ADD" instruction is illustratively utilized. Suppose that the two amounts are to be added, one amount being located in memory address 42, the other amount being located in memory address 5$\phi$, the sum of these two amounts is to be stored in memory address 52, and the next instruction word is stored in memory address 32. As the code number for an ADD instruction is 08, the instruction word appears as illustrated below:

INSTRUCTION WORD FORMAT

| Sect. 1 | Sect. 2 | Sect. 3 | Sect. 4 | Sect. 5 |
|---------|---------|---------|---------|---------|
| 08 | 42 | 50 | 52 | 32 |

After the addition operation is completed, the computer, in a sense, "looks" in memory address 32 for the next instruction. Also, following the addition, the words in memory addresses 42 and 5φ remain the same as before, even though each was involved in the addition operation. However, regardless of the word originally stored in memory address 52 before the addition, memory address 52 now contains the sum word derived from the addition. The reason for this is that a memory address is automatically cleared prior to storage of another word in that particular address. Consequently, only the sum word is stored in the sum address.

A characteristic of nine of the eighteen instructions is the ability to effectively increment section–3 or decrement section–4 of any instruction word. That is, if one operation is called for which is to be sequentially performed on several words that are stored in memory locations having sequential addresses, it is not necessary to utilize a separate instruction for each operation performed, or to build an address-incrementing loop.

An example of an instruction in which address incrementing is utilized is the "enter-keyboard-words" instruction, abbreviated as EKW, having a code number designation "00," and interpreted by the computer as: "The words subsequently indexed in the accounting machine keyboard are to be sequentially stored in memory address locations X through Y, where X and Y are specified in section–3 and section–4, respectively, of the instruction words." Thus, if several sequential entries are to be indexed in the accounting machine keyboard, it is, of course, obvious that these successive entries must be stored in adjacent memory address locations. If it were necessary to utilize a separate instruction word for storage of each of the keyboard entries in a designated memory address, ten instruction words would then be necessary to store ten entries in memory. However, with an address incrementing instruction, all ten entries are sequentially stored by the use of only one instruction word. This incrementing feature not only simplifies programming, but also reduces the required number of instruction words necessary for completion of a given program. When utilizing an instruction with an address-incrementing format, the programmer specifies, in section–3 of the instruction word, the memory address of the first word on which an operation is required, and specifies, in section–4 of the instruction word, the memory address of the last word on which an operation is required. The only restriction is that the address specified in section–4 of the instruction word must be equal to, or greater than, the address specified in section–3. Thereafter, the computer sequentially generates each of the address locations between those two specified, even if the original instruction word is no longer stored in memory. However, after the instruction has been executed, the original instruction word may remain in memory unchanged, if desired.

20. *Format of Add-Pairs-of-Numbers instruction word (APN–11)*

By using the "add-pairs-of-numbers" instruction, from one to nine pairs of numbers are added together, and the sum resulting from each addition is returned to the address of one of the operands in each pair.

In this instance, the mode number "11" for the APN instruction is in section–1 of the instruction word; the low-order digit of the number in section–2 thereof specifies the number of additions to be performed and the high-order digit thereof is a zero; the memory address of the first word of the pair is in section–3 thereof, and, after each addition, this particular address is incremented by "one" to obtain the memory address of the first word of the following pair to be used in the subsequent addition; the memory address of the second word of the pair, which also corresponds to the memory address of the sum, is in section–4 of the instruction word, and, following the addition, the address in section–4 is decremented by "one" to obtain the address of the second word of the following pair of words, which address also corresponds to the memory address into which the sum derived from the following addition is to be stored; and in section–5 of the instruction word is the address of the next instruction word.

Suppose that "five" pairs of words are to be added, the first word of the first pair being stored in address 15, the second word of the first pair being stored in address 72, and the next instruction word being stored in address 88. An instruction word capable of initiating this particular sequence of events is 1105157288.

In carrying out the APN instruction, the sequence of events is as follows: The word stored in memory address 15 is added to the word stored in memory address 72, and the sum resulting from the addition is stored in memory address 72; thereafter, the address specified in section–3 of the instruction word is incremented by "one" and thus becomes "address 16," instead of address 15, and, simultaneously therewith, the address specified in section–4 of the instruction word is decremented by "one" and thus becomes "address 71" instead of address 72; thereafter, the word in address 16 is added to the word in address 71, and the sum resulting from this second addition is stored in address 71; thereafter, the addresses specified in section–3 and section–4 of the instruction word are respectively incremented and decremented by "one," and, thereafter, the word stored in address 17 is added to the word stored in address 7φ, and so on, until the word stored in address 19 is added to the word stored in address 68 and the sum resulting from the last addition is stored in address 68.

It is to be noted that, upon completion of the carrying out of the above-described APN instruction, the five sums, resulting from the addition of the five pairs of numbers, are respectively stored in memory addresses 68 through 72, while the first word of each of the five pairs of words respectively remain in a corresponding one of memory addresses 15 through 19.

The APN instruction may be utilized, for example, in a payroll application where it is desired to add an employee's deductions, such as "Community Chest,'" "Union Dues,'" "FICA," etc., to each of the respective weekly accumulations thereof. All of such additions are automatically performed with only one instruction word, due to the fact that the addresses in section–3 and section–4 of the instruction word are automatically modified by the computer during the execution of the instruction. Also, as will be seen later, due to the fact that an instruction word is stored in a "register" while the computer is executing the instruction, the original instruction word normally remains in memory even though the instruction specified by the instruction word has been previously carried out to completion.

*21. Instruction register generally*

While the computer is in the process of carrying out the instruction specified by one of the just-described instruction words, that particular instruction word is effectively stored in an "instruction register." With reference to FIGS. 1 and 2, the instruction register (I) is effectively divided into five sections, 1 through 5, where section–1 is capable of storing the two highest-order digits and section–5 is capable of storing the two lowest-order digits of the ten-digit instruction word. Each of the five sections is effectively divided into a high-order and a low-order digit-register, each of which is utilized to store a particular-order decimal digit of the instruction word in binary-coded-decimal form. For example, digit-register (I9) effectively stores the highest or tenth-order decimal digit of the instruction word; digit-register (I8) effectively stores the ninth-order decimal digit of the instruction word; and so on, so that digit-register (I$\phi$) stores the lowest or first-order decimal digit of the instruction word.

22. Section–1 of instruction register

Figure 15:
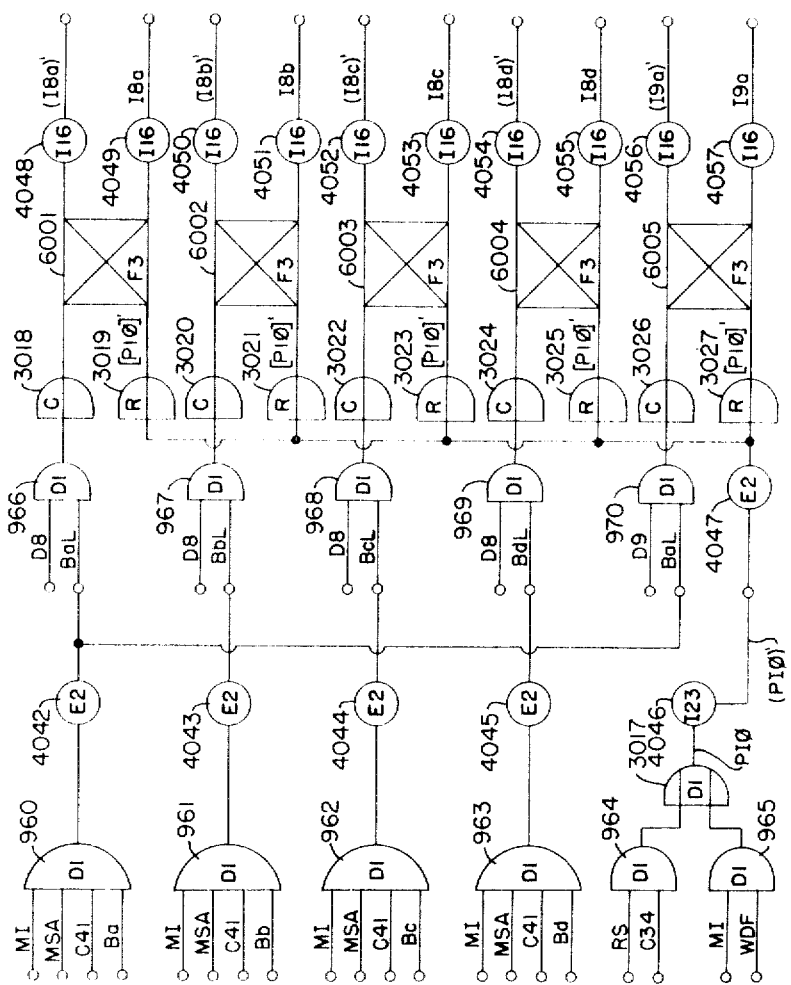
FIG. 15 is a logical diagram of section-1 of the instruction register.

With reference to FIG. 15, section–1 of the instruction register is logically illustrated as including five flipflops, 6001 through 6005, whose states of energization collectively represent, in binary-coded decimal form, each of the previously-described instruction code numbers "$\phi\phi$" (EKW) through "17" (EPT). As the high-order digit of each of the instruction code numbers is either a "one" or a "zero," only one flipflop (6005) is necessary to store the high-order digit of the code. However, as the low-order digit of the code may be any of the digits "zero" through "nine," four flipflops (6001 through 6004) are necessary to represent the value of the low-order digit thereof.

As previously described with respect to FIGS. 27 and 47, output line MSA from the memory sense amplifier flipflop 6055 is either TRUE or FALSE, depending upon whether a binary "1" or a binary "0" had just previously been read out of memory during a read-write cycle of operation. If a binary "1" had just been read out of memory, the state of line MSA goes from FALSE to TRUE approximately 3 microseconds after TIME–3, and stays TRUE until the next TIME–2, at which time the state of line MSA returns FALSE. If a binary "0" had just been read out of memory, the state of line MSA remains unchanged; i.e., FALSE.

Thus, after presetting section–1 of the instruction register to "00" by effecting a TRUE-to-FALSE change of state of line (PI$\phi$)', suppose that an ADD instruction word was originally stored in a particular address in memory and it is desired to take this word from memory and store it in the instruction register. As the code designation for an ADD instruction is "08," the digit to be stored in the high-order digit register (I9) of section–1 of the instruction register is a "zero," and the digit to be stored in the low-order digit register (I8) thereof is an "eight." Consequently, as binary-bit "a" of the low-order digit of the code designation is first to be read out of memory, line Ba is TRUE, and, as a word is to be transferred from memory to the instruction register, line MI is likewise TRUE, as will be seen later. However, in this example, as the binary value of bit "a" of the low-order digit of the code designation is "zero," line MSA remains FALSE and therefore output lines (I8a)' and I8a are TRUE and FALSE, respectively. When bit "b" is to be read out of memory, only the line Bb from the bit counter is TRUE, while lines Ba, Bc, and Bd are FALSE. As the binary value of bit "b" is likewise "zero," output lines (I8b)' and I8b remain TRUE and FALSE, respectively. When bit "c" is to be read out of memory, only line Bc from the bit counter is TRUE. As the binary value of bit "c" is also "zero," output lines (I8c)' and I8c remain unchanged. When the high-order bit "d" is to be read out of memory, only line Bd from the bit counter is TRUE. As the binary value of bit "d" is now a "one," when line C41 goes TRUE at TIME–4, all the inputs to logical AND 963 are TRUE, and, consequently, line BdL likewise goes TRUE at TIME–4. As the high-order digit of the code designation is next to be read in this particular example, only line D8 from the digit counter is TRUE at this particular instance. Therefore, the reference input to flipflop 6004 goes TRUE at TIME–4. At TIME–1, the reference input thereto goes FALSE, so that the states of output lines (I8d)' and I8d are reversed. That is, line (I8d)' goes FALSE, and line I8d goes TRUE.

It is seen, therefore, that the states of energization of flipflops 6001 through 6004 collectively represent the binary number "1000," which, in turn, represents the decimal digit "eight." As the value of bit "a" of the tenth-order digit is "0," the state of energization of flipflop 6005 represents the "zero" value of the tenth-order digit of the instruction word.

Figure 16:
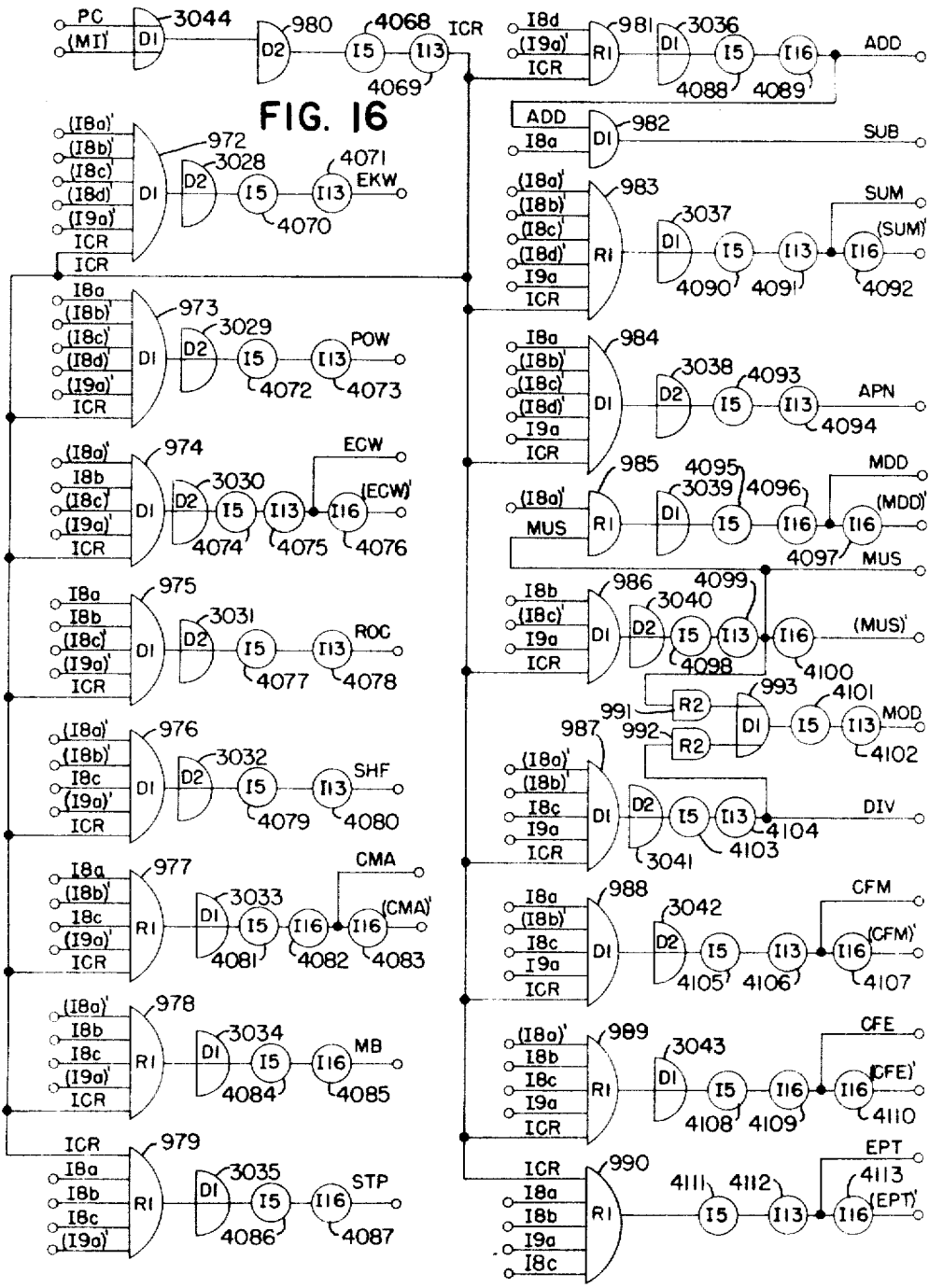
FIG. 16 is a logical diagram of the decoder portion of section-1 of the instruction register.

With reference to FIG. 16, all of the output lines from section–1 of the instruction register are connected as inputs to an "instruction-code readout" having a multiplicity of output lines which are selectively energized by logical combinations of the five flipflops of section–1 of the instruction register and individually correspond to a selected one of instruction words EKW (00) through EPT (17). Ignoring, for the moment, those output lines bearing a "prime" notation, only one of the remaining output lines is TRUE at any given instance; the particular line that is TRUE is dependent upon, and corresponds to, the particular code number stored in section–1 of the instruction register. There are, however, certain exceptions, which are to be noted hereinafter. Thus, in the preceding example, an "08" being stored in section–1 of the instruction register causes the state of output line ADD to be TRUE, all the remaining output lines being FALSE. It is, therefore, to be appreciated that, for an "enter-keyboard-words" command (code 00), only line EKW is TRUE; for a "print-out-words" command (code 01), line POW is TRUE; and so on, so that output line EPT is TRUE, indicative of the "enter-punched-tape" command (code 17). The simplified logical equations for the eighteen readout lines of the decoder are as follows:

| Abb. of Command | Code No. | Logical Equation |
|---|---|---|
| EKW | 00 | = (I9a)'(I8d)'(I8c)'(I8b)'(I8a) ICR |
| POW | 01 | = (I9a)'(I8d)'(I8c)'(I8b)' I8a ICR |
| ECW | 02 | = (I9a)' (I8c)' I8b (I8a)'ICR |
| ROC | 03 | = (I9a)' (I8c)' I8b I8a ICR |
| SHF | 04 | = (I9a)' I8c (I8b)'(I8a)'ICR |
| CMA | 05 | = (I9a)' I8c (I8b)' I8a ICR |
| MB | 06 | = (I9a)' I8c I8b (I8a)'ICR |
| STP | 07 | = (I9a)' I8c I8b I8a ICR |
| ADD | 08 | = (I9a)' I8d    ICR |
| SUB | 09 | =     I8a ADD |
| SUM | 10 | = I9a (I8d)'(I8c)'(I8b)' I8a ICR |
| APN | 11 | = I9a (I8d)'(I8c)'(I8b)' I8a ICR |
| MDD | 12 | =     (I8a)'MUS |
| MUS | 13 | = I9a (I8c)' I8b    ICR |
| DIV | 14 | = I9a I8c (I8b)'(I8a)'ICR |
| CFM | 15 | = I9a I8c (I8b)'I8a ICR |
| CFE | 16 | = I9a I8c I8b (I8a)'ICR |
| EPT | 17 | = I9a I8c I8b I8a ICR |

For reasons to be set forth hereinafter, it is to be noted that line ADD is TRUE whenever either an "08" or an "09" is stored in section–1 of the instruction register, i.e., for either an "add" or a "substract" command; however, line SUB is TRUE only for a "subtract" command, i.e., "09." In addition, line MUS is TRUE when either a "12" or a "13" is stored in section–1 of the instruction register, i.e., for either a "multiply-dollar-decimal" or a "multiply-and-shift" instruction; however, line MDD is TRUE only for a "multiply-dollar-decimal" command, i.e., code "12." An additional readout is provided by line MOD, which is essentially a logical OR of lines MUS and DIV and which signifies that either a multiplication or a division operation is being carried out.

23. Section–2 of instruction register

Figure 17:
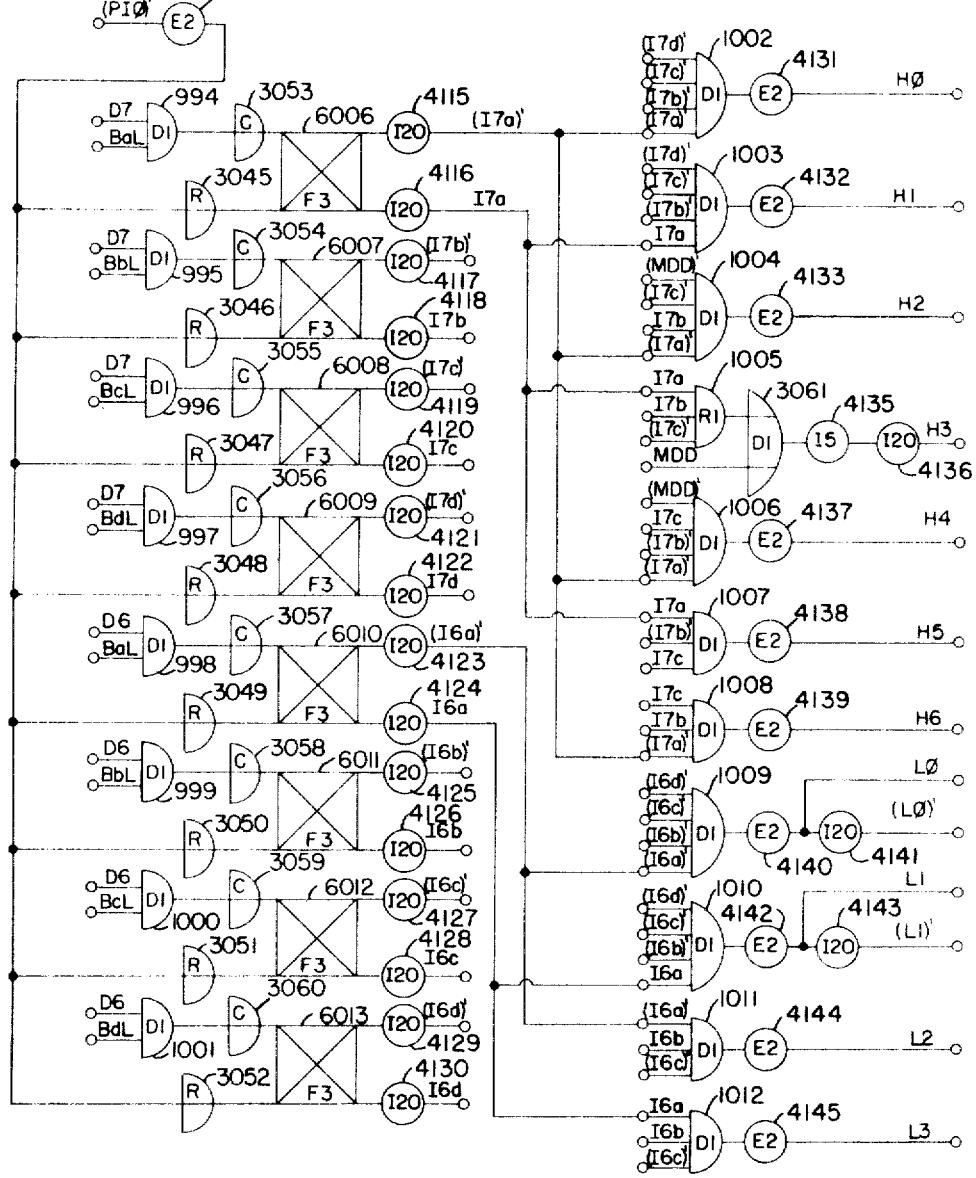
FIG. 17 is a logical diagram of the section-2 of the instruction register.

With reference to FIG. 17, section–2 of the instruction register includes eight flipflops, 6006 through 6013, which store the seventh and eighth-order digits of the instruction word. As previously mentioned with respect to that part of the foregoing description relating to the "Instruction Word Format," section–2 of the instruction register is utilized to store the address of either the first or the second operands, the destination address, or a special code, depending upon the particular instruction. A decoder for the high-order digit-register of section–2 is provided with seven readout lines H$\phi$ through H6 to respectively indicate a digit having a value "zero" through "six" being stored in the high-order digit-register; the decoder for the low-order digit-register is provided with readout lines L$\phi$ through L3, which respectively indicate a digit having a value of "zero" through "three" being stored in the low-order digit-register.

For example, in an instruction calling for a particular motor bar operation of the accounting machine portion of the computer, readout lines H$\phi$ through H6 indicate which motor bar should be depressed and what type of depression is desired—i.e., "touch" or "hold"—in carrying out a "shift" instruction (SHF–04), and readout lines H2 through H5 indicate the direction and type of shift desired. The simplified logical equations for each of readouts H$\phi$ through H6 are as listed below. It is to be noted, however, as shown in the logical circuit diagram 17, that readout lines H2 and H4 cannot go TRUE during a "multiply-dollar-decimal" instruction (MDD–12), while readout line H3 is permitted to go TRUE unconditionally.

```
H𝜙 = (17d)'(17c)'(17b)'(17a)'
H1 = (17d)'(17c)'(17b)' 17a
H2 =      (17c)' 17b (17a)'   (MDD)'
H3 =      (17c)' 17b  17a   + MDD
H4 =       17c (17b)'(17a)'  (MDD)
H5 =       17c (17b)' 17a
H6 =       17c  17b (17a)'
```

Readout lines L$\phi$ through L3 not only are utilized in an "enter-card-words" instruction (ECW–02) but also are utilized in any of the instructions which call for a particular motor bar operation, such as "enter-keyboard-words" (EKW–00) and "print-out-words" (POW–01). For an EKW and a POW command, readout lines L$\phi$ through L3 selectively indicate the particular decimal point lamp on the keyboard that is to be illuminated and/or the particular "order-hook" solenoid that is to be energized. The simplified logical equations for readout lines L$\phi$ through L3 are as given below:

```
L𝜙 = (16d)'(16c)'(16b)'(16a)'
L1 = (16d)'(16c)'(16b)' 16a
L2 =       (16c)' 16b (16a)'
L3 =       (16c)' 16b  16a
```

It is to be noted that output lines 17a through 17d of the high-order digit-register of section–2 of the instruction register are respectively connected as an input to one of flipflops 6047 through 6060 of the high-order section of the word-selecting register previously described with respect to FIG. 24. It is also to be noted that output lines 16a through 16d of the low-order digit-register of section–2 of the instruction register are respectively connected as an input to flipflops 6051 through 6054 of the low-order section of the word-selecting register previously described with respect to FIG. 25, all of which may more clearly be seen by reference to the block diagram shown in FIGS. 1 and 2. Thus, as lines 17a through 17d of FIG. 24 and lines 16a through 16d of FIG. 25 are each logically ANDED with line TT2, which originates in FIG. 21, after the word-selecting register is preset to "00" by effecting a TRUE-to-FALSE reversal of the state of line (PW$\phi$)', the high- and low-order digits stored in section–2 of the instruction register are permitted to respectively be simultaneously transferred directly into the high- and low-order digit positions of the word-selecting register by effecting selective energization of line TI2, selective energization of line TI2, therefore, effecting the transfer of the contents of section–2 of the instruction register into the word-selection register.

24. *Section–3 of instruction register*

As previously mentioned, section–3 of the instruction register normally stores either a destination address or the address of one of the operands. With reference to the left-hand portion of FIG. 18, section–3 of the instruction register comprises eight flipflops, 6014 through 6021, flipflops 6014 through 6017 being a part of the high-order digit-register (15) and flipflops 6018 through 6021 being a part of the low-order digit-register (14) thereof, as illustrated in the block diagram of FIGS. 1 and 2. The two digit-registers (14) and (15) are interconnected in such a manner that, when so combined, they function essentially as a binary-coded-decimal counter which is capable of effectively counting from 00 to 99 in units of "one."

To accomplish this, flipflops 6018 through 6021 of digit-register (14) are connected together to collectively function as a "powers-of-two" binary counter that increments one unit each time the state of line IN4 changes from TRUE to FALSE. After a count of "nine" (binary 1001) is reached, digit-register (14) recycles back to "zero" (binary 0000) on the next change of state of line IN4 from TRUE to FALSE. Flipflops 6014 through 6017 of digit-register (15) are connected together to also collectively function as a "powers-of-two" binary counter that effectively increments by one unit each time digit-register (14) recycles from "nine" back to "zero." Thus, it can be said, a four flipflop powers-of-two forward-counting binary counter is one in which a change of state of the reference output of any or all of the four flipflops from a TRUE state to a FALSE state causes a corresponding reversal of the state of the next succeeding high-order flipflops. Therefore, each flipflop effectively "divides" the reference output of the succeeding low-order flipflop by a division of "two."

With all four flipflops of each of digit-registers (14) and (15) connected in a conventional manner, each of the registers would normally count from "zero" (binary 0000) to "fifteen" (binary 1111) and then return to "zero" to again start the count cycle. However, in the instant case, digit-register (14) includes a logical AND gate 1067 (FIG. 19), which detects a count of "nine" being held by digit-register (14), a count of "nine" (binary 1001) being indicated by a TRUE state of each of the amplified reference outputs of flipflops 6018 and 6021. Thus, it is evident that, when reference output lines 14a and 14d are both simultaneously TRUE, output line 149 from gate 1067 (FIG. 19) is likewise TRUE each time the counter reaches a count of "nine," line (149)', of course, being FALSE at that particular moment. As line (149)' is FALSE only during a count of "nine," the state of the prime input to flipflop 6019 (FIG. 18) is prevented from being changed from TRUE to FALSE during the next succeeding TRUE-to-FALSE change of state of line 14a. Consequently, lines 14b and 14c remain FALSE. At the same time, a logical AND (1029) of lines 149 and IN4 effectively returns the state of line 14d back to FALSE, thus returning digit-register (14) to "zero," whereby output lines 14a through 14d are FALSE, indicative of binary 0000. Each time the state of line 14d goes from TRUE-to-FALSE—i.e., when digit-register (14) recycles—the state of flipflop 6014, thence the state of output line 15a, is reversed thereby. It is to be noted, however, that digit-register (15) is not recycled when a count of "nine" is reached therein, as in the case of digit-register (14).

With reference to FIGS. 24 and 25, lines 15a through 15d and 14a through 14d of section–3 of the instruction register are each logically ANDED with line TI3 in such a manner that, after the word-selecting register has previously been preset to "00," the contents of section–3 of the instruction register is transferred to the word-selecting register by effecting a TRUE-to-FALSE change of state of line TI3.

25. Section–4 of instruction register

Figure 18:
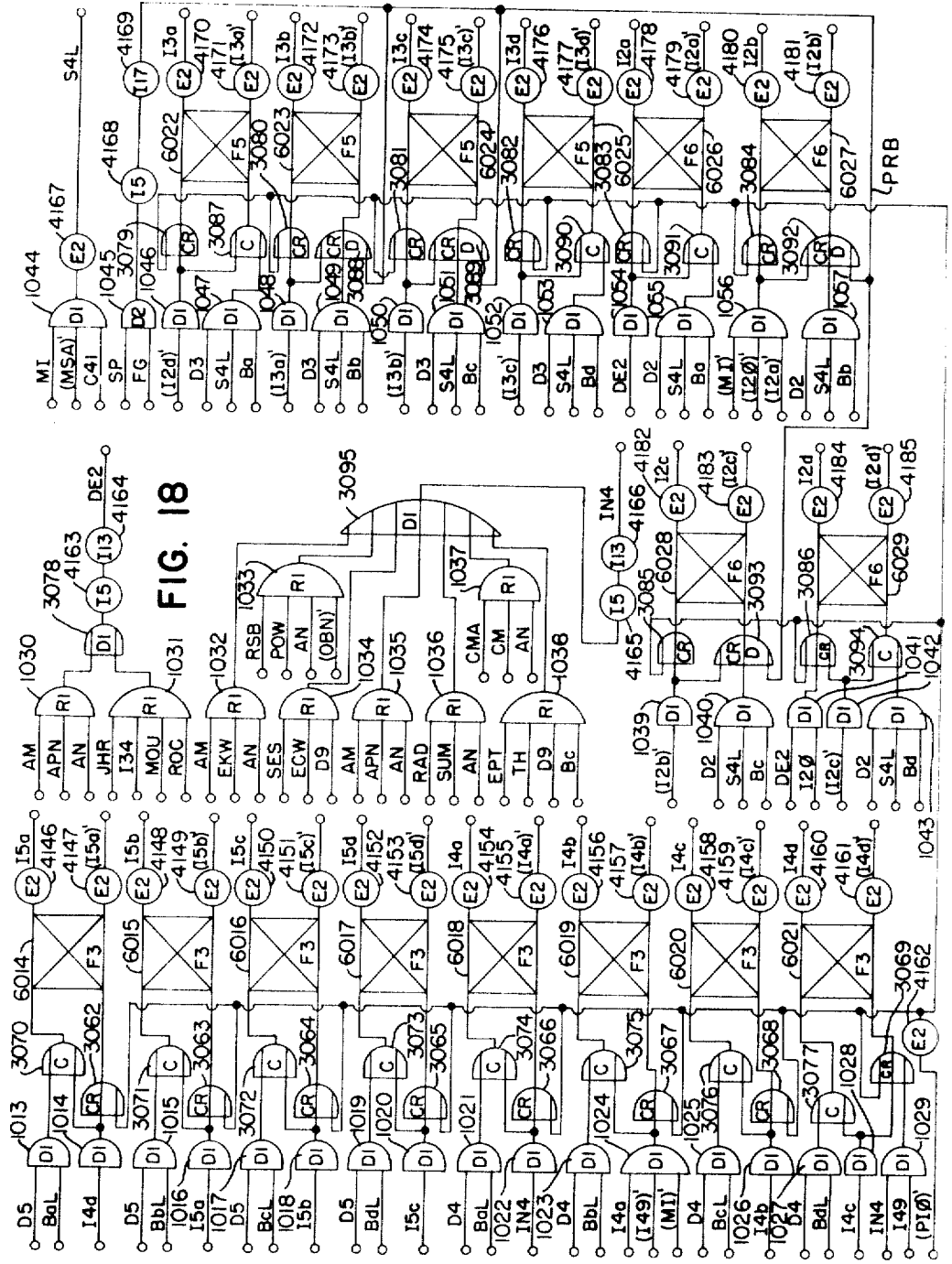
FIG. 18 is a logical diagram of sections 3 and 4 of the instruction register.

Section–4 of the instruction register, as previously mentioned, is utilized to store either the address of one of the operands, the address of the result, or the address of an alternate instruction. As shown in FIG. 18, and also in the block diagram of FIGS. 1 and 2, the fourth section of the instruction register includes a high-order digit-register (I3) comprising four electrically-interconnected flipflops 6022 through 6025, and a low-order digit-register (I2) likewise comprising four electrically-interconnected flipflops 6026 through 6029. Each of digit-registers (I2) and (I3) independently operates essentially as a power-of-two binary counter. However, instead of being capable of counting in a forward direction as digit-registers (I4) and (I5) of section–3, digit-registers (I2) and (I3) are connected in such a manner as to collectively count in a reverse direction, in units of "one," from 99 to 00 for each succeeding TRUE-to-FALSE change of state of line DE2. Consequently, it can be said that each flipflop in such a forward-counting register is essentially a scale-of-two binary counter which effectively "divides" by two the reference output binary notation of a successive low-order flipflop, whereas each flipflop in such a reverse counting register effectively "divides" by two the prime output binary notation of a successive low-order flipflop.

With flipflops 6026 through 6029 of digit-register (I2) interconnected in a conventional manner to function as a reverse counter, digit-register (I2) would then normally count backwards in units of "one" until a "zero" count (binary 0000) is reached, and then would return to a count of "fifteen" (binary 1111) to start the count cycle again. However, in the instant case, digit-register (I2) includes a logical AND gate 1066 (FIG. 19), which detects a count of "zero" condition of digit-register (I2), a count of "zero" (binary 0000) being indicated by a FALSE state of each of output lines I2a through I2d from flipflops 6026 through 6029, respectively, or by a TRUE state of each of prime outputs (I2a)' through (I2d)'. Thus, when all of lines (I2a)' through (I2d)' are simultaneously TRUE, output line I2φ from gate 1066 (FIG. 19) is likewise true each time the digit-register reaches a count of "zero," line (I2φ)', of course, being FALSE at that particular moment. As line (I2φ)' is FALSE only during a count of "zero," the state of the prime input to flipflop 6027 is prevented from being changed from TRUE to FALSE during the next succeeding TRUE-to-FALSE change of state of line (I2a)'. Consequently, the states of lines (I2b)' and (I2c)' remain TRUE. Simultaneously therewith, a logical AND of lines DE2 and I2φ (1041) effectively returns the state of line I2d back to TRUE, thus returning digit-register (I2) to a count of "nine," whereby output lines I2a and I2d are TRUE and lines I2b and I2c are FALSE, indicative of binary 1001. Each time the state of line (I2d)' changes from TRUE to FALSE—i.e., when digit-register (I2) recycles back to a count of "nine"—the state of flipflop 6022, thence the state of line I3a, is reversed thereby. It is to be noted that digit-register (I3) is not recycled when a count of "zero" is reached, as in the case of digit-register (I2).

With reference to FIGS. 24 and 25, the reference output lines from section–4 of the instruction register are each logically ANDED with line TI₄ in such a manner that the contents of section–4 of the instruction register is transferred to the word-selecting register by effecting selective energization of line TI₄, assuming, of course, that the word-selecting register is initially preset to "00."

26. Section–5 of instruction register

Figure 19:
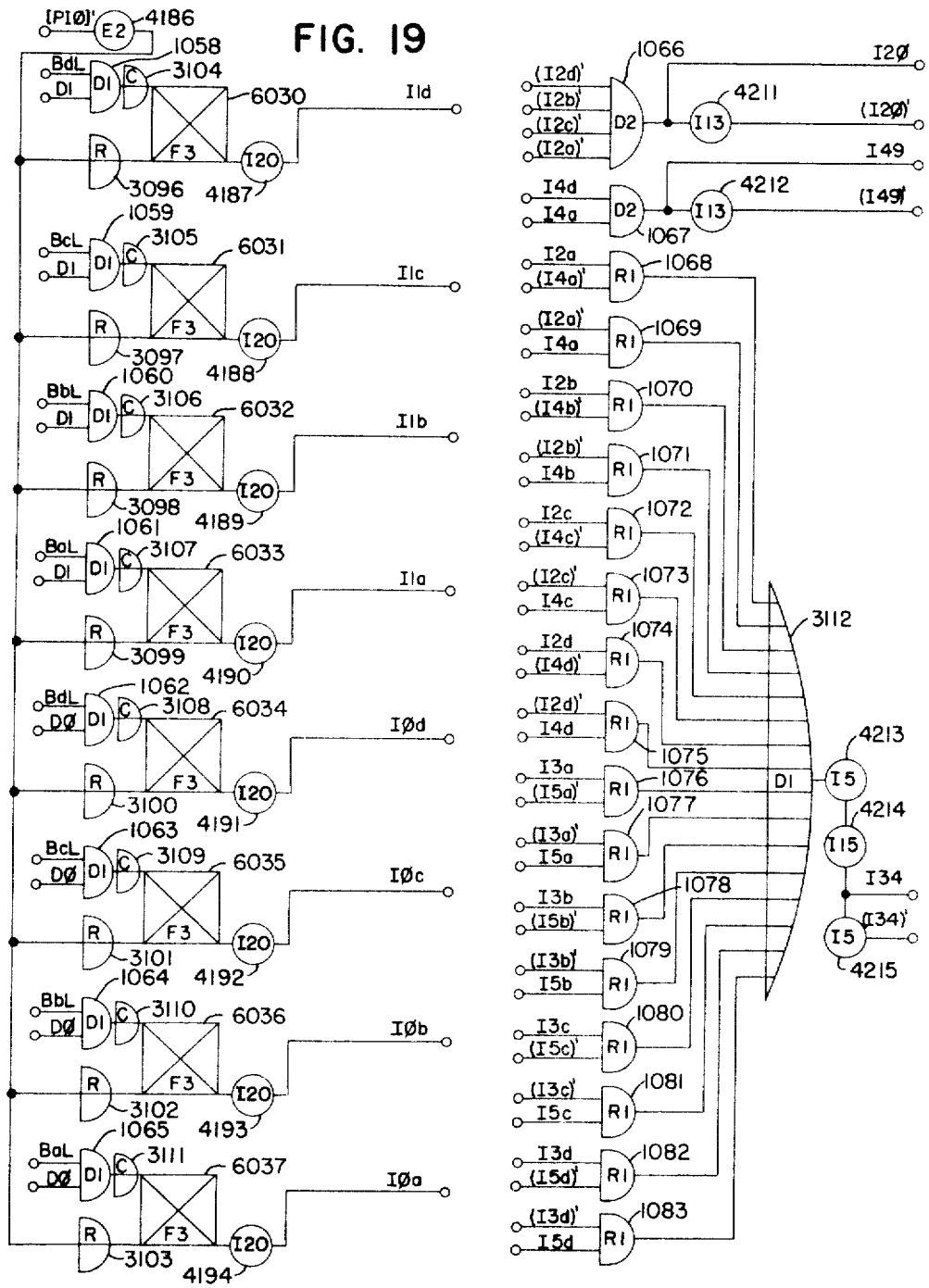
FIG. 19 is a logical diagram of section-5 of the instruction register and the compare circuitry relating to sections 3 and 4 of the instruction register.

As previously mentioned, section–5 of the instruction register stores the address of the next regular instruction and, as shown in FIG. 19, comprises eight flip-flops 6030 through 6037, flip-flops 6030 through 6033 being included in high-order digit-register (I1) and flip-flops 6034 through 6037 being included in low-order digit-register (Iφ). Digit-registers (I1) and (Iφ) are of conventional circuit configuration and indicate, in binary-coded decimal form, the value of the decimal digit stored therein, and, consequently, a more detailed description thereof is not deemed necessary.

With reference to FIGS. 24 and 25, output lines I1a through I1d and Iφa through Iφd from section–5 of the instruction register are each logically ANDED with line TI₅ in such a manner that the contents of section–5 of the instruction register is transferred to the word-selecting register simply by effecting a TRUE-to-FALSE change of state of line TI₅, assuming, of course, that the word-selecting register is initially preset to "00," as before stated with respect to sections 2 through 4 of the instruction register.

27. Instruction register presets

There are two "preset" lines for the instruction register, which are utilized to preset each section thereof to thereafter be representative of a specific two-digit numerical designation. For example, section–1 of the instruction register (FIG. 15) is preset to "00" by effecting a TRUE-to-FALSE change of state of line (PIφ)', which presets the state of output lines 19a and 18a through 18d FALSE, indicative of "00"; section–2 of the instruction register (FIG. 17) is simultaneously preset to "00" by line (PIφ)', which presets a FALSE state of output lines 17a through 17d, and 16a through 16d, also indicative of "00"; section–3 (FIG. 18) is also simultaneously preset to "00" by line (PIφ)', which presets the states of output lines 15a through 15d, and 14a through 14d, FALSE, indicative of "00"; each of the digit-registers of section–4 (FIG. 18) is, however, simultaneously preset to binary 1111 by a TRUE-to-FALSE change of state of line (PIφ)', which presets the states of output lines I3a through I3d TRUE, indicative of binary 1111, and presets the states of output lines I2a through I2d TRUE, also indicative of binary 1111; and section–5 (FIG. 19) is simultaneously preset to "00" by line (PIφ)', which presets the states of output lines I1a through I1d and Iφa through Iφd FALSE, indicative of "00."

From the foregoing, it is seen that selective energization of preset line (PIφ)' causes each section of the instruction register to be preset to "00," with the exception of section–4, each section of which is preset thereby to binary 1111. In other words, the reference outputs of all the flip-flops in sections 1, 2, 3, and 5 of the instruction register are preset FALSE, whereas the reference outputs of the flip-flops of section–4 thereof are preset TRUE by (PIφ)' prior to the "loading" of a word from memory into the instruction register. The reason for this type of preset is that, due to the previously-described decrementing ability of section–4, it has been found expedient, circuitwise, to first preset the reference output of each of the flip-flops of section–4 to a TRUE representation and then reverse the state of each particular reference output whenever its corresponding binary bit from memory is "zero," contra to presetting the reference outputs FALSE and then reversing the state of each when the corresponding bit from memory is a binary "one." However, to avoid confusion, and for the purpose of convenience in the following description, the above presetting technique of the instruction register by line (PIφ)' will, nevertheless, be hereinafter referred to as presetting the instruction register to "zero."

With reference to FIG. 18, the second preset line PRB is a logical AND (1045) of lines SP and FG and is utilized to preset section–4 of the instruction register to "99" after the instruction register has previously been preset by line (PIφ)'. The purpose for such a preset is to be covered hereinafter.

As previously described with respect to the memory

47 sense amplifiers shown in FIG. 27 and the wave-form chart of FIG. 47, each time a binary "one" is read out of memory, the state of line MSA is changed from FALSE to TRUE at a time approximately three microseconds after TIME–3, and then its state returns to FALSE at the next succeeding TIME–2. Thus, with reference to FIG. 15, it is seen that from TIME–4 to the next succeeding TIME–1 during a "memory-to-instruction-register" word-cycle in which line MI is TRUE for approximately 1600 microseconds, line B$a$L is TRUE if the binary bit "$a$" just read out of memory is a "one," otherwise line B$a$L remains FALSE; during the next succeeding time interval of ten microseconds from TIME–4 to TIME–1, line B$b$L is TRUE if the binary bit "$b$" just read out of memory is a "one," otherwise line B$b$L remains FALSE; during the next succeeding time interval, line B$c$L is TRUE if binary bit "$c$" just read out of memory is a "one," otherwise line B$c$L remains FALSE; and, during the next succeeding ten-microsecond time interval from TIME–4 to TIME–1, line B$d$L is TRUE if binary bit "$d$" just read out of memory is a "one," otherwise line B$d$L remains FALSE.

As shown in FIG. 19, lines B$a$L through B$d$L are each individually ANDED with the low-order read-out line D$\phi$ of the previously-described digit counter (FIG. 23) and then respectively connected to the reference inputs of flipflops 6037–6034 of the low-order digit-register (I$\phi$) of section–5 of the instruction register; lines B$a$L through B$d$L are also individually ANDED with the second-order read-out line D1 of the digit-counter and then respectively connected to the reference inputs of flipflops 6033–6030 of the high-order digit-register (I1) of the fifth section of the instruction register. Thus, if it is assumed that the instruction word stored in memory address $\phi\phi$ is to be transferred into the instruction register, the state of flipflop 6037 is first "set" in a manner to be indicative of the magnetic state of core 885 (FIG. 11), forty microseconds later the state of flipflop 6036 is "set" indicative of the magnetic state of core 886, forty microseconds later flipflop 6035 is "set" indicative of the state of core 887, and so on, until the first eight binary bits of the word in address $\phi\phi$ are effectively stored in section–5 of the instruction register, the first four bits, of course, representing the low-order digit and the second set of four bits representing the second-order digit of the word in address $\phi\phi$.

Input lines B$a$L through B$d$L are similarly ANDED with the remaining output lines D4 through D9 from the digit counter to effect transfer of the corresponding digits of the word in memory and subsequent storage thereof in sections 1 through 3 of the instruction register. For example, in section–3 (FIG. 18) are stored the fifth- and sixth-order digits, in section–2 (FIG. 17) are stored the seventh- and eighth-order digits, and in section–1 (FIG. 15) are stored the ninth- and tenth-order digits of the word located in address $\phi\phi$. As previously described, the reference output from each of flipflops 6022 through 6029 (FIG. 18) of section–4 of the instruction register is initially preset TRUE just prior to a memory-to-instruction-register word transfer. Thus, if the binary bit just read out of memory is a "zero," line (MSA)' remains TRUE, and, consequently, output line S4L is rendered TRUE from TIME–4 to TIME–1. Therefore, assuming that low-order bit "$a$" of the third-order digit is a "zero," the prime input to flipflop 6026 goes from TRUE to FALSE at TIME–1 approximately forty microseconds after the state of flipflop 6030 (FIG. 19) is "set" indicative of bit "$d$" of the second-order digit of the word in address $\phi\phi$; a TRUE-to-FALSE reversal of the prime input to flipflop 6026, of course, "sets" the state thereof so that output line 12$a$ is rendered FALSE, indicative of binary "zero." The remaining bits of the third and fourth order digits are sequentially stored in section–4 in the same manner as just described.

48

28. Summary of instruction register

In summary, the instruction register is provided with a binary "bit" serializer at the input of each digit-register thereof and also is provided with a serializer on a digit-by-digit basis for sequentially selecting each of the ten digit-registers thereof, starting with the lowest-order digit-register and ending with the highest-order digit-register thereof. Consequently, by means of a "memory-to-instruction-register" transfer instruction, the word stored in memory is transferred into the instruction register, digit by digit, starting with the low-order digit thereof, the low-order digit being stored in digit-register (I$\phi$) of section–5 and the high-order digit being stored in digit-register (I9) of section–1 of the instruction register.

As previously described, and as illustrated in the block diagram of FIGS. 1 and 2, the digit stored in a selected one of low-order digit-registers (I$\phi$), (I2), (I4), or (I6) is selectively stored in the low-order digit-register (W$\phi$) of the word-selecting register, and, simultaneously therewith, the digit stored in a selected one of high-order digit-registers (I1), (I3), (I5), or (I7) is selectively stored in the high-order digit-register (W1) of the word-selecting register. Additionally, the low-order digit of section–2 of the instruction register is selectively stored in an "R-counter," which is next to be described in detail.

29. R-counter

With reference to FIG. 28, there is logically illustrated a reverse-counting counter, hereinafter termed "R-counter," which includes four interconnected flipflops 6057 through 6060. The R-counter operates essentially in the same manner as low-order digit-register (I2) of section–4 of the instruction register, previously described in detail, in that it is a single digit counter capable of counting in a binary-coded-decimal code in a reverse digital order. For example, if the R-counter is initially at a count of "nine," on each occurrence of a TRUE-to-FALSE change of state of line DR, the R-counter is effectively decremented by one decimal digit until a count of "zero" is reached. However, as no recycling of the R-counter is provided, on the next subsequent change of state of line DR the R-counter is returned to a count of binary 1111, instead of binary 1001 as in digit-register (I2). The two presets provided for the R-counter are preset line PR$\phi$, which presets the counter to "zero" by causing the states of flipflops 6057 through 6060 to be such that each of the reference outputs thereof is FALSE (hereinafter known as setting a flipflop "FALSE"), and preset line PR8, which presets the counter to "eight" by setting flipflop 6060 TRUE and setting flipflops 6057 through 6059 FALSE.

Figure 30:
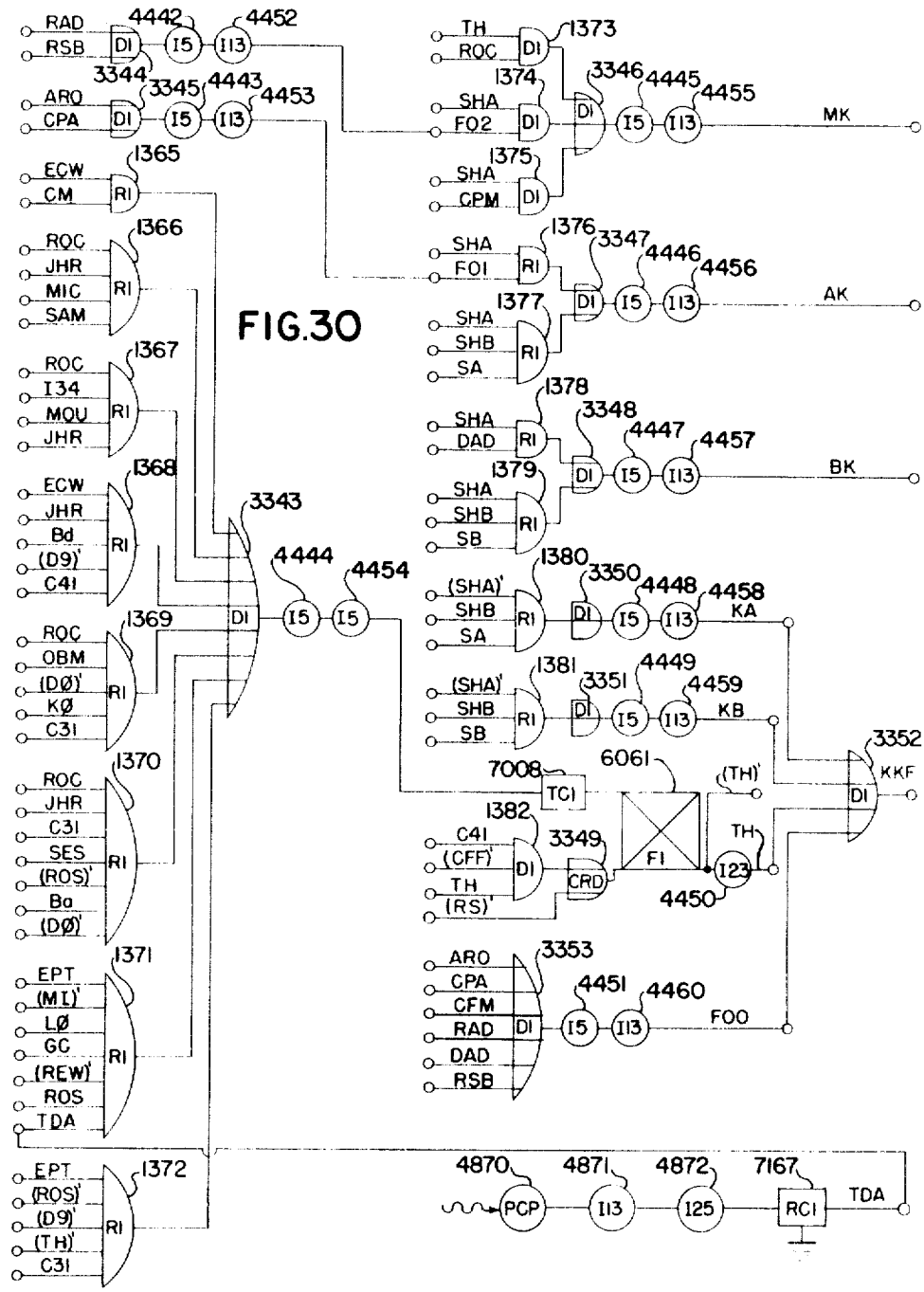
FIG. 30 is a logical diagram of a portion of the digit-cycle initiating circuitry.

Any single decimal digit, from "zero" to "nine," is selectively loaded into the R-counter from two different sources. For example, the digit stored in the low-order digit-register (I6) of section–2 of the instruction register is transferred into the R-counter by means of selective energization of line RLR. However, prior to loading, all four flipflops 6057 through 6050 of the R-counter are first preset FALSE by means of preset line PR$\phi$. Thereafter, the state of each flipflop is selectively set by line RLR to correspond to the state of the corresponding flipflop in digit-register (I6) of the instruction register. Thus, if digit-register (I6) were storing the numeral "six," so that flipflops 6011 and 6012 (FIG. 30) were TRUE (flipflops 6010 and 6013 being FALSE), when the state of line RLR is rendered FALSE after being TRUE for at least twenty microseconds, both of flipflops 6058 and 6059 (FIG. 28) are simultaneously set TRUE. Therefore, it is evident that any digit from "zero" to "nine" is selectively transferred from digit-register (I6) to the R-counter.

After the R-counter has previously been preset to "zero" by line PR$\phi$, any digit being read out of memory is selectively stored in the R-counter by effecting sequential energization of line RLM simultaneously with one of output lines B*a* through B*d* from the bit-counter (FIG. 22). Thus, the bit-counter operates as a so-called "serializer" at the input of the R-counter to effect selective setting of the states of the four flipflops therein to correspond to the four binary bits being sequentially read out of memory and corresponding to the particular memory digit to be stored in the R-counter.

The R-counter is used in various of the instructions for different purposes. For example, in a "shift" instruction, the R-counter is first loaded with the low-order digit stored in section–2 of the instruction register, which digit specifies the number of places the word in memory is to be shifted. After the entire word has been shifted one digital order, the R-counter is effectively decremented by one demical digit by line DR and then is essentially "checked" to determine if the R-counter is at a count of "zero." In that way, the R-counter is used to serve as an indication as to the remaining number of digital orders the word is to be shifted. In a division operation, suppose that it is necessary to perform a series of subtraction operations during which eight shift operations of both the quotient and the remainder is required. In this instance, the R-counter is initially preset to a count of "eight" and thereafter decremented by one decimal digit after each shifting operation is completed, until a count of "zero" is reached. In other words, the R-counter counts downwardly from "eight" and thus keeps a record of the number of shifts remaining. In a "multiply-and-shift" instruction, the R-counter is sequentially loaded with each one of the digits of the multiplier word in memory. The R-counter then controls the number of times that the multiplicand is added into an accumulating register, and signifies when the required numbers of additions have been performed. In a "multiply-and-shift" or a "multiply-dollar-decimal" instruction, the R-counter is utilized to record the number of times that the product has been shifted, and, as a result, determines the number of shifting operations remaining to be completed.

The R-counter is capable of providing three logically-derived readout signals from output lines R$\phi$, R1, and R8. Among other purposes, the states of readout lines R$\phi$ and R1 are respectively utilized during a "shift" operation to indicate when the R-counter is at a count of "zero" or "one"; the state of readout line R$\phi$ is utilized during both multiply instructions to indicate a "zero" count of the R-counter; and readout line R8 is utilized during all multiply and divide instructions, during which time the R-counter is effectively recording the progress of the instruction as it is being carried out.

30. F-counter

With reference to FIG. 33, there is logically illustrated a single-digit forward-counting counter, hereinafter termed "F-counter," which includes four electrically-interconnected flipflops 6073 through 6076. The specific mode of operation of the F-counter is essentially the same as that of the previously-described high-order digit-register (I5) of section–3 of the instruction register (FIG. 18), and, consequently, a detailed description is not deemed necessary for a full and complete understanding thereof. Like digit-register (I5), the F-counter is capable of counting from "zero" to "fifteen" and then recycling to a count of "zero."

Prior to a mathematical computation, the F-counter is generally preset to "zero" by means of a FALSE-to-TRUE change of state of preset line PF$\phi$. Thereafter, on each successive TRUE-to-FALSE change of state of line AF, the F-counter is incremented from a "zero" count and advanced by one decimal digit for each change of state of line AF. It is to be noted, however, that selective energization of line PF$\phi$ presets the F-counter back to "zero" regardless of the count held therein. The F-counter is provided with four readout lines, F$\phi$, F8, F9 and F1$\phi$, which respectively indicate a count of "zero," "eight," "nine," and "ten" thereof.

31. Compare F-counter and digit-counter

With reference to the upper right-hand portion of FIG. 33, the states of output lines F*a* through F*d* and (F*a*)' through (F*d*)' from the F-counter are logically compared with respect to the states of output lines D*a* through D*d* and (D*a*)' through (D*d*)' from the digit-counter, previously described with respect to FIG. 23. Thus, the state of output line (IFD)' is TRUE whenever the digital count of the F-counter is equal to the digital count of the digit-counter; however, the state of output line (IFD)' is FALSE as long as there is inequality between the contents of the F-counter and the digit-counter.

32. J digit-register

Figure 32:
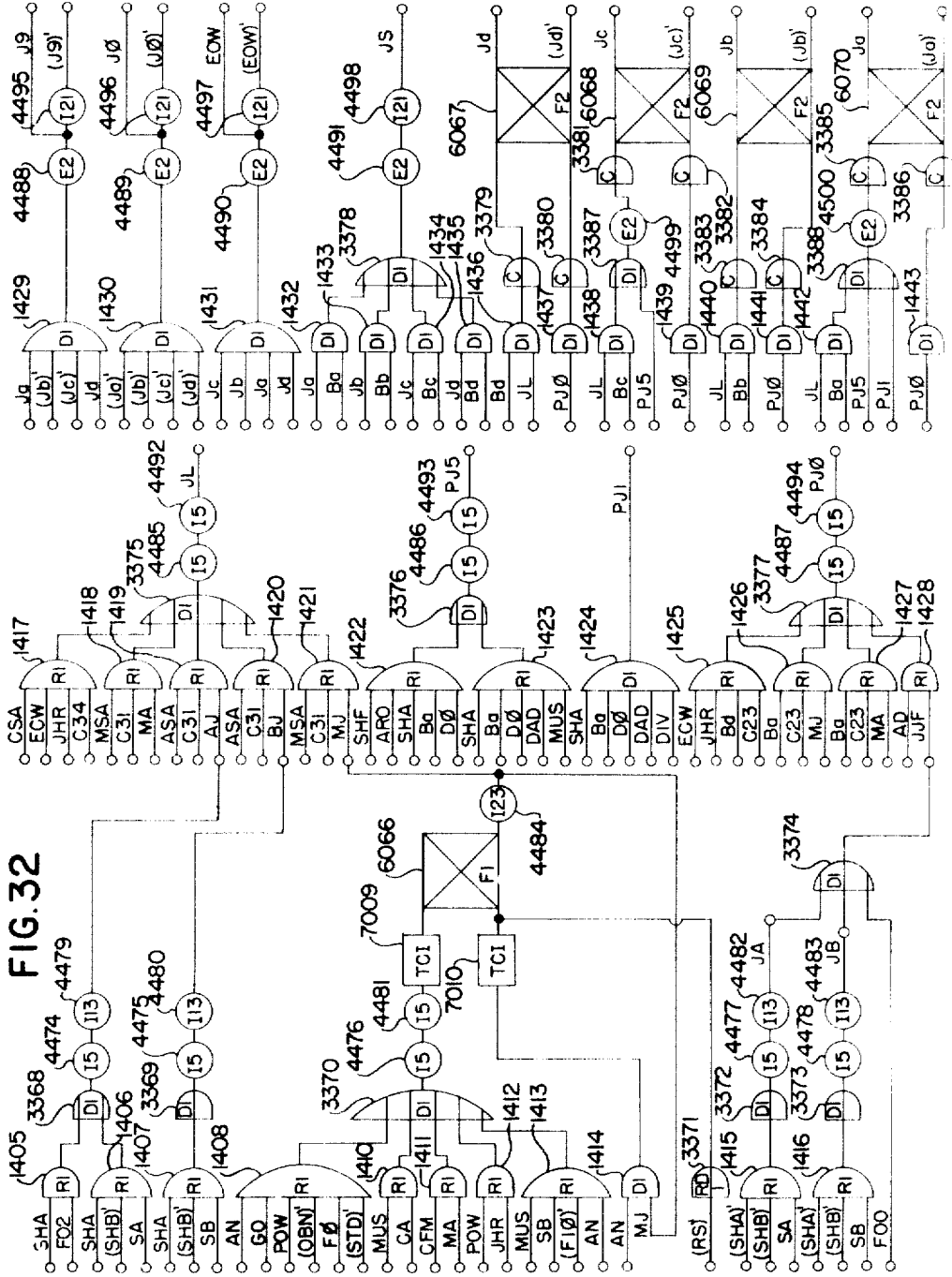
FIG. 32 is a logical diagram of the J digit-register and associated circuitry.
Figure 34:
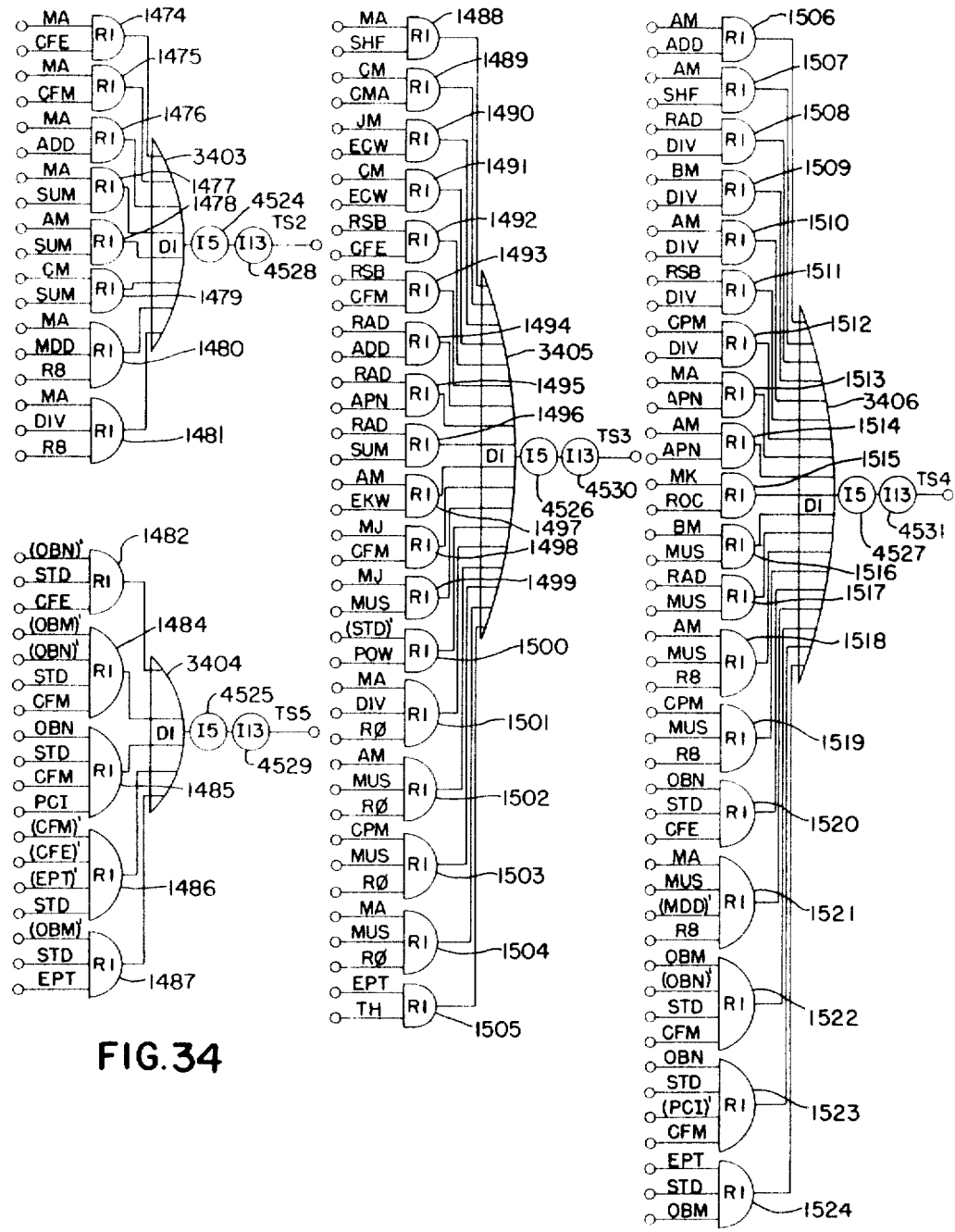
FIG. 34 is a logical diagram of the instruction register transfer circuitry.
Figure 35:
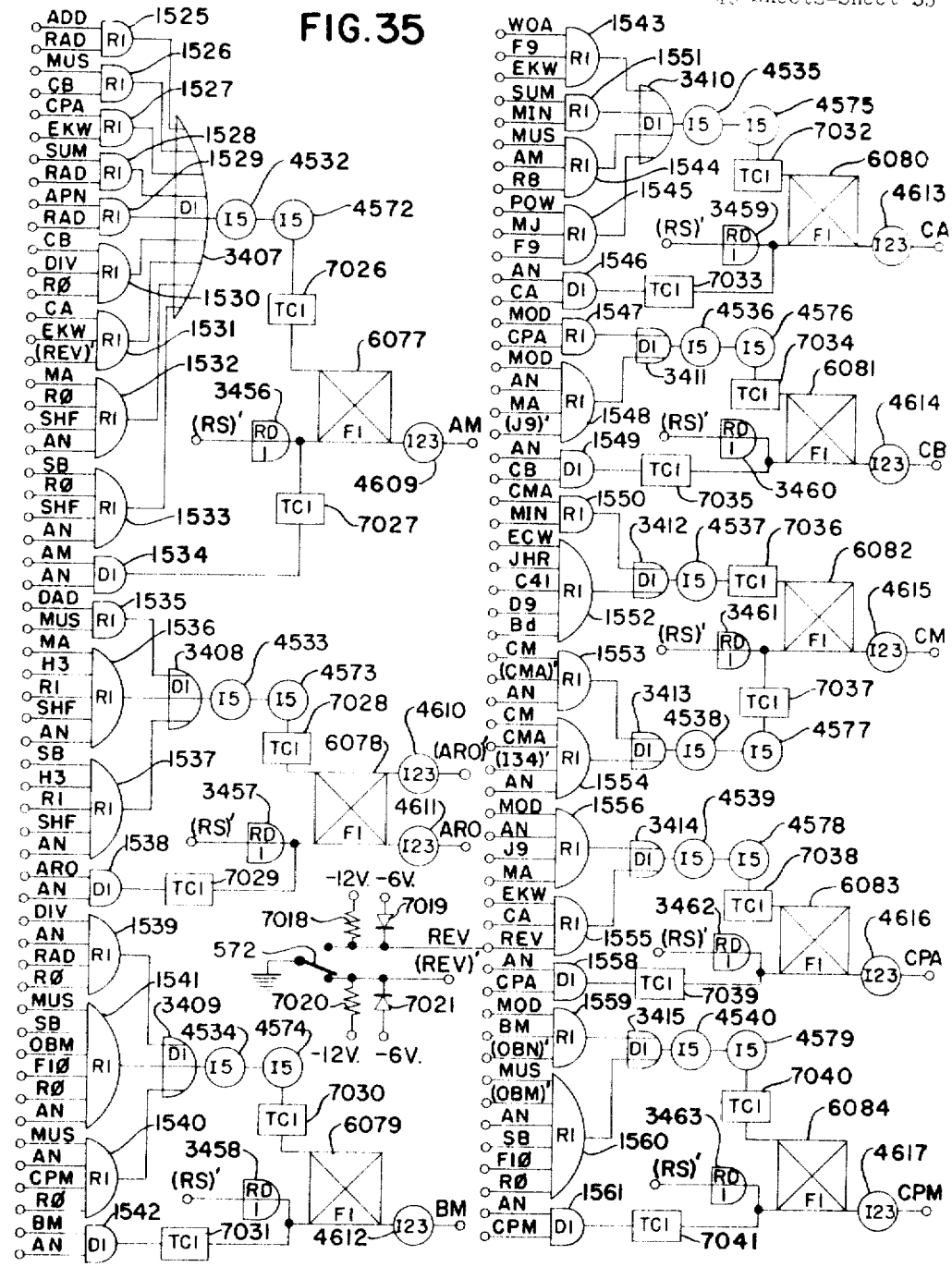
Figure 36:
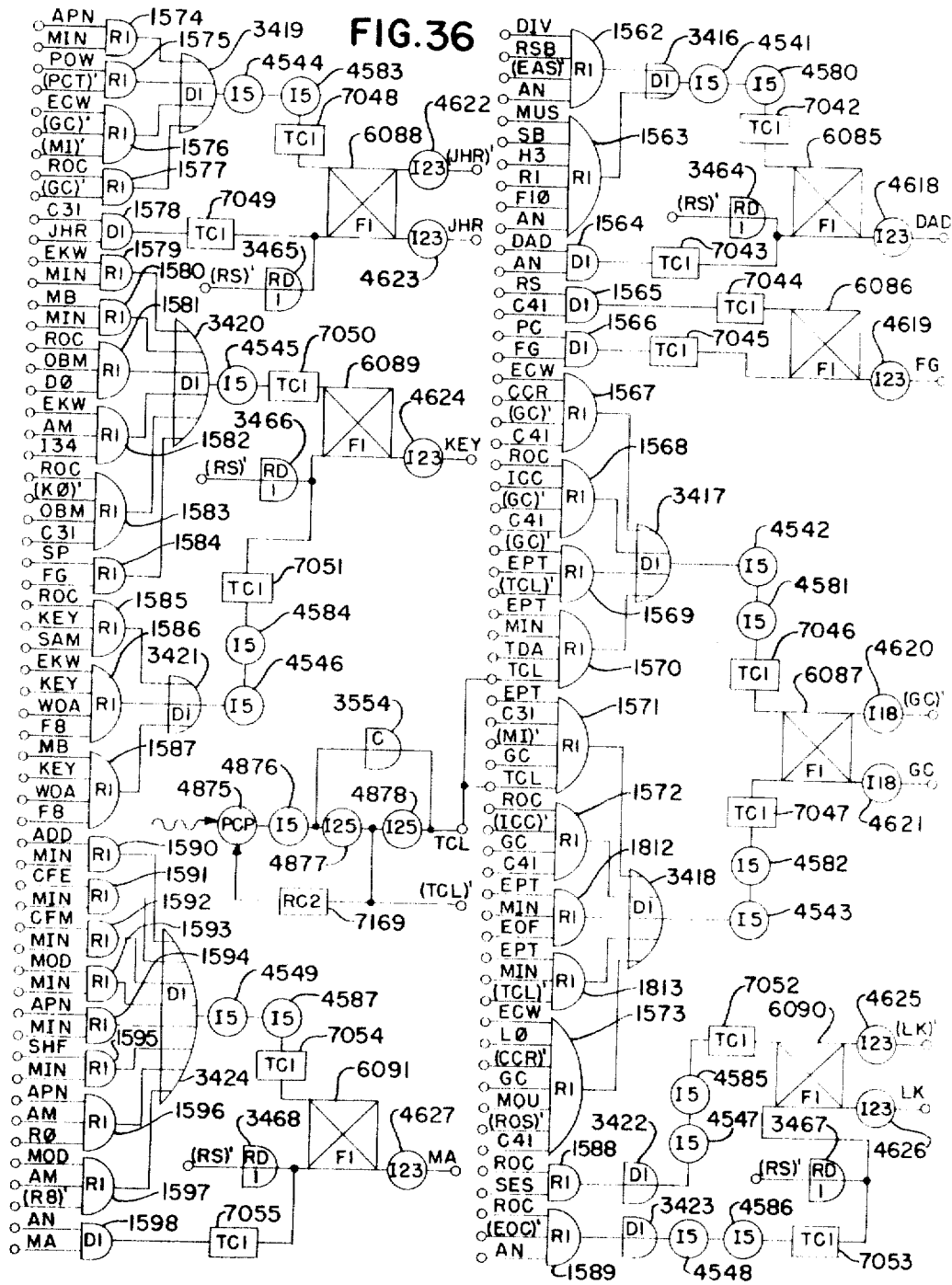
Figure 37:
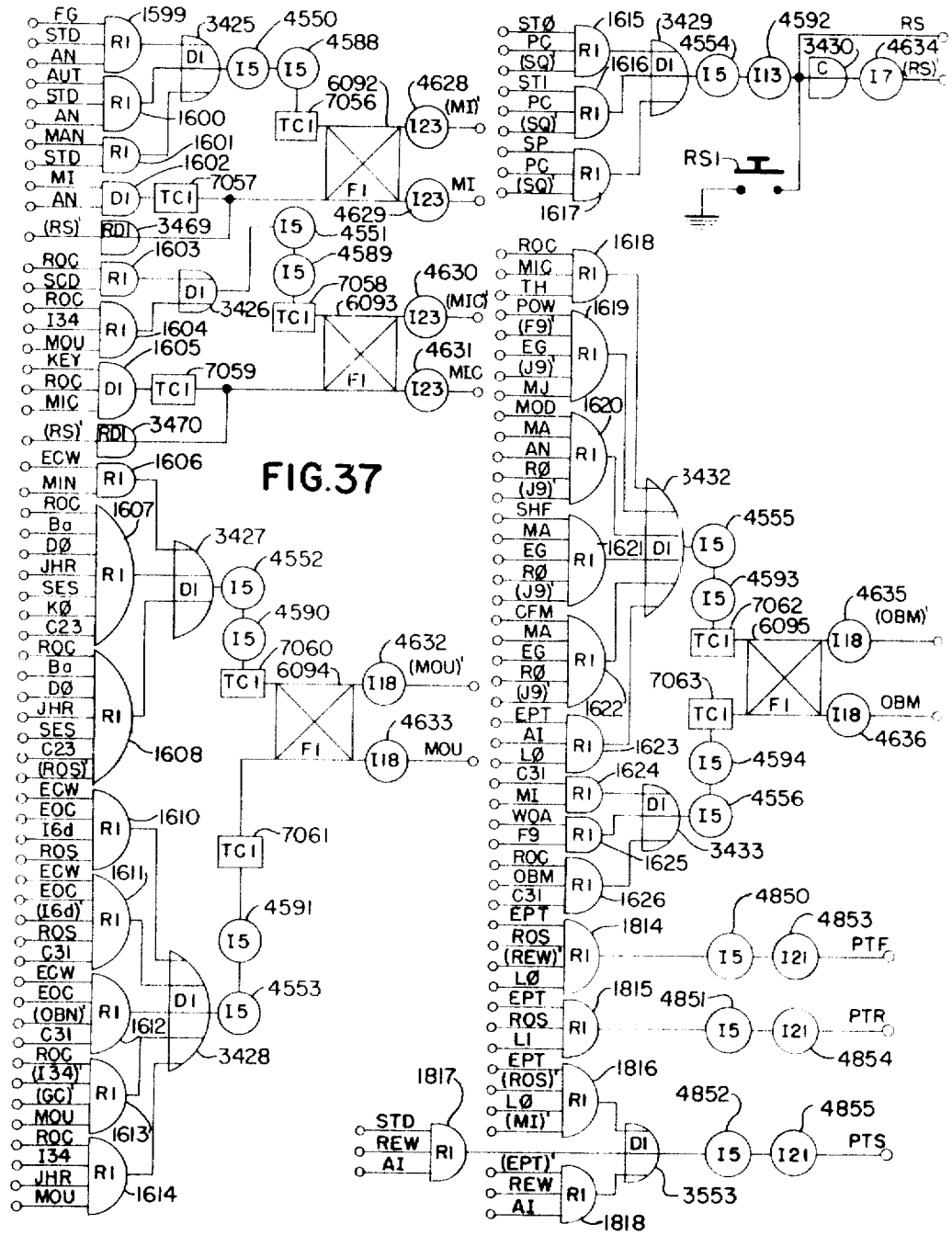
Figure 38:
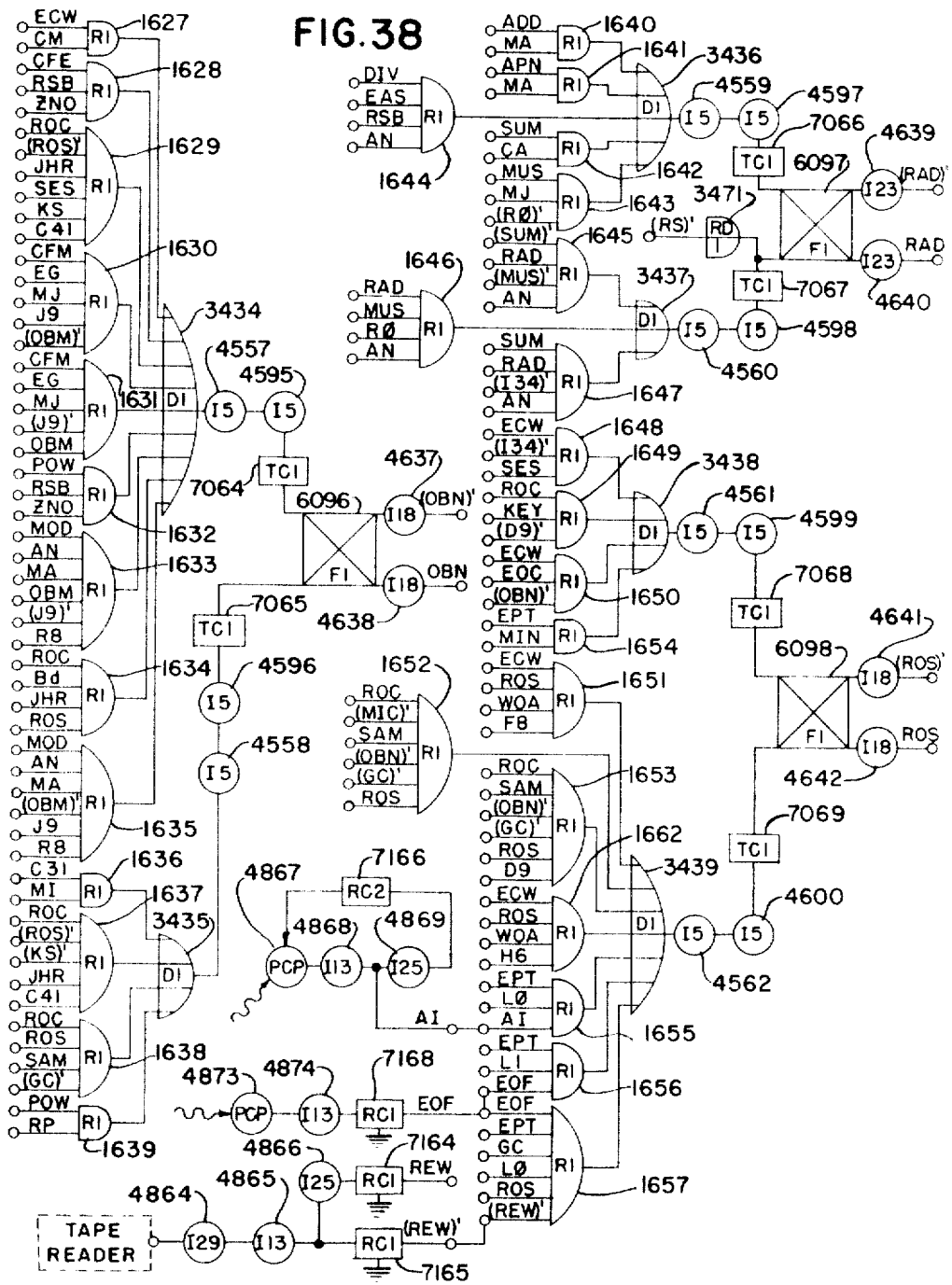
Figure 39:
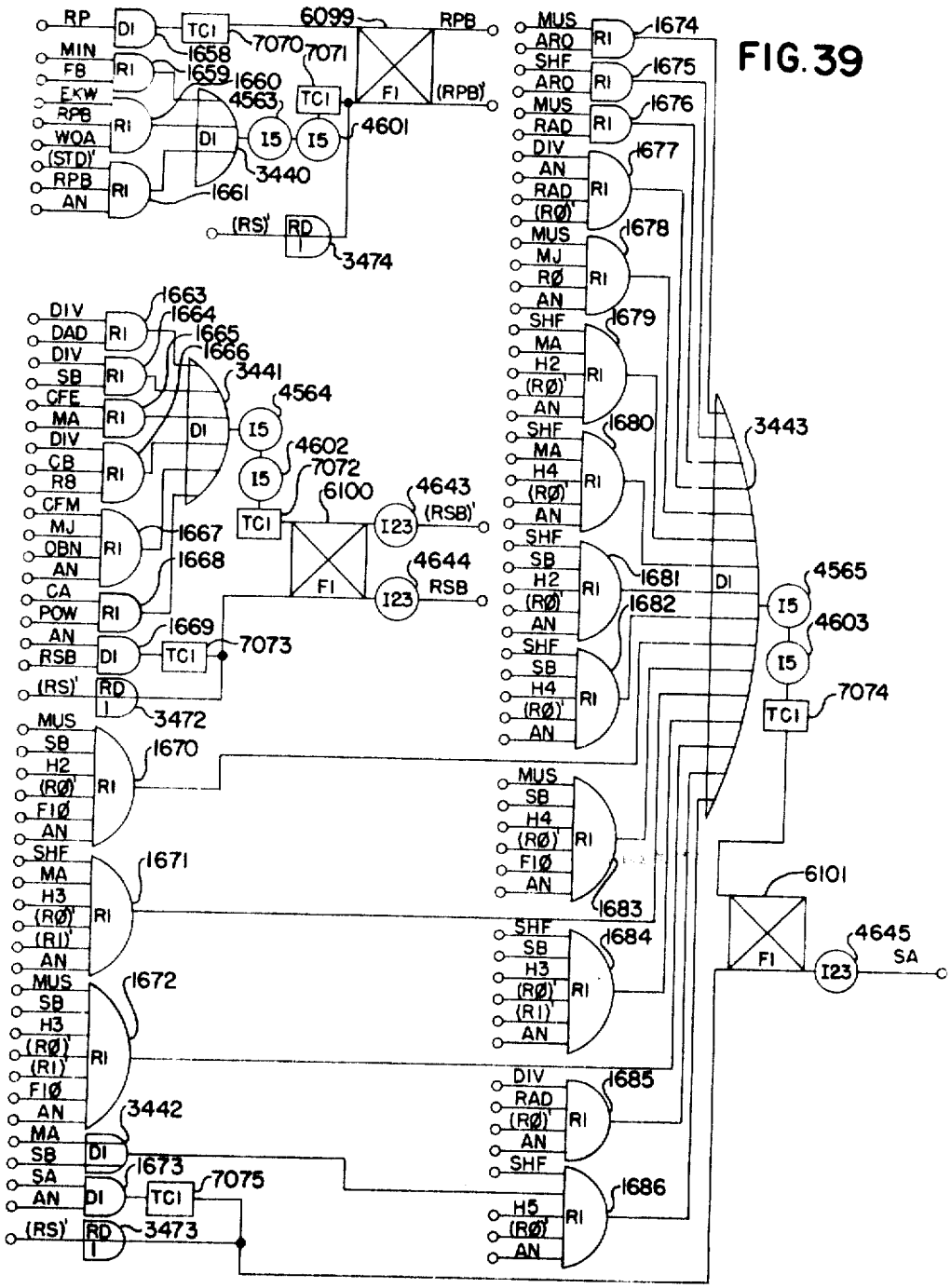
Figure 40:
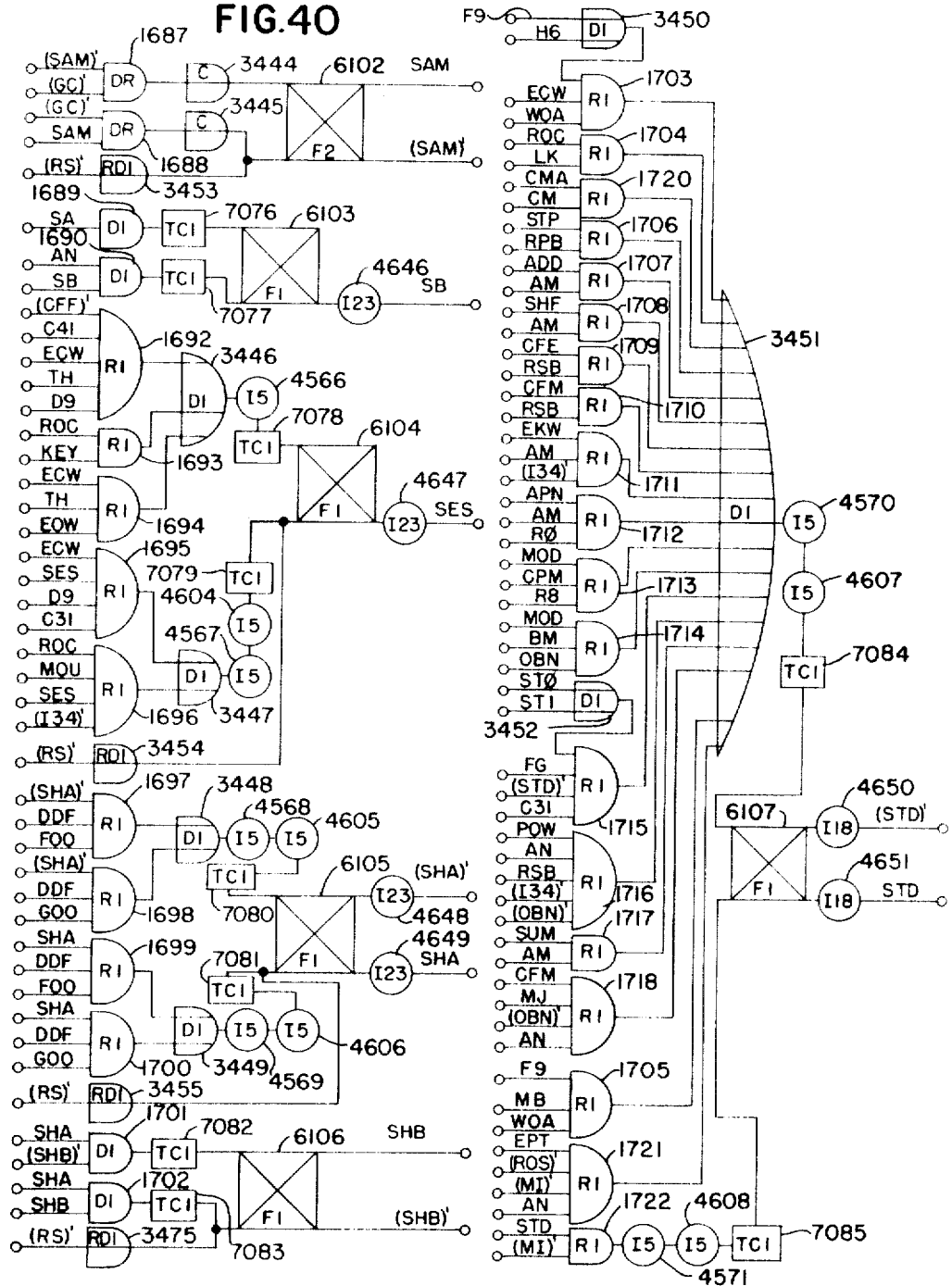

With reference to the lower right-hand portion of FIG. 32, there is logically illustrated a digit-register, hereinafter termed J digit-register, which includes four electrically-interconnected flipflops 6067 through 6070 collectively capable of storage of any number from binary 0000 through and including binary 1111. The J digit-register is selectively preset to "zero" by effecting a TRUE-to-FALSE change of state of input line PJ$\phi$. Thereafter, the states of flipflops 6067 through 6070 are selectively conditioned to collectively represent either of decimal digits "one" or "five" by effecting a TRUE-to-FALSE change of state of a corresponding one of input lines PJ1 and PJ5.

The J digit-register is capable of being loaded, via line JL, with any digit previously stored in any one of memory addresses $\phi\phi$ through 99, or addresses A or B, or, as will be seen later, with a digit magnetically read from a ledger card. However, prior to loading the J digit-register, each of the flipflops therein is effectively preset to "zero." Thereafter, the states of flipflops 6070, 6069, 6068, and 6067 are sequentially conditioned to respectively correspond to a different one of the four binary bits which are sequentially read from memory or the ledger card in the following manner: As illustrated in FIG. 32, output line MSA from the memory sense amplifier flipflop 6055 (FIG. 27) for addresses $\phi\phi$ through 99, output line ASA from the memory sense amplifier flipflop 6056 for addresses A and B (FIG. 27), and output line CSA from the ledger card sense amplifier flipflop 6144 (FIG. 46), essentially are each logically ANDED, via line JL, with each of output lines B*a* through B*d* from the bit-counter (FIG. 22). Consequently, if bit "*a*" of the digit is a binary "one," the state of the reference output of flipflop 6070 is rendered TRUE; if bit "*b*" is a binary "zero," the state of the reference output of flipflop 6069 remains FALSE, and so on.

Logically illustrated directly above flipflops 6067 through 6070 are three additional readout lines, J$\phi$, J9, and EOW, whose individual state of energization is indicative of a particular number stored in the J digit-register. For example, the state of output line J$\phi$ is rendered TRUE whenever a binary 0000 is stored in the register; the state of output line J9 is rendered TRUE whenever a binary 1001 is stored therein; and a TRUE state of output line EOW is indicative of a binary 1111 being stored therein. In addition to the availability of a parallel type of read-out, the output of the J digit-register is also effectively serialized, in that output lines J*a* through J*d* thereof are logically ANDED with the bit-counter output lines B*a* through B*d* via logical AND gates 1432 through 1435, line J*a* being ANDED with line B*a*, line J*b* being ANDED with line B*b*, and so on. The outputs of logical AND gates 1432 through 1435 are logically ORED together and terminate at output line JS. Output line JS, for example, is logically connected as an input line to the "write-control" circuitry (FIG. 20), so that the digit in the J digit-register is capable of being selectively stored in any one of memory addresses φφ through 99, or addresses A or B.

33. Compare F-counter and J digit-register

With reference to FIG. 33, a compare circuit is illustrated as comprising eight logical AND gates 1462 through 1469, which are logically ORED together and terminate at output lines IFJ and (IFJ)'. The output lines from the J digit-register (FIG. 32) and the output lines from the F-counter (FIG. 33) are logically connected to selected ones of AND gates 1462 through 1469 in such a manner that the value of the digit stored in the F-counter is effectively compared with the value of the digit stored in the J digit-register. When the two digits are of unequal magnitude, the state of output line IFJ is rendered TRUE. However, when the value of the two digits is of equal magnitude, the state of output line (IFJ)' is rendered TRUE, indicative of equality.

34. K digit-register

In FIG. 31 there is logically illustrated a second digit-register, hereinafter termed K digit-register, comprising four electrically-interconnected flipflops 6062 through 6065, which are collectively capable of storage of any number from binary 0000 through and including binary 1111. The K digit-register is preset to "zero" by effecting selective energization of line PKφ. Thereafter, the register is selectively preset to binary 1001 by effecting a TRUE-to-FALSE change of state of line PK9.

Like the previously-described J digit-register, the K digit-register is capable of being loaded with any digit previously stored in any one of memory addresses φφ through 99, or one of addresses A or B. However, prior to loading, the register is preset to "zero." Thereafter, the states of flipflops 6065, 6064, 6063, and 6062 are sequentially conditioned in the following manner to respectively correspond to a different one of the four binary bits which are sequentially read from memory: Output line MSA from the memory sense amplifier flipflop 6055 for addresses φφ through 99 (FIG. 27) and output line ASA from the memory sense amplifier flipflop 6056 for addresses A and B (FIG. 27) are each essentially logically ANDED, via line KL, with each of the output lines B*a* through B*d* from the bit-counter (FIG. 22). Consequently, bit "*a*" of the digit just read out is a binary "one," the state of the reference output of flipflop 6065 is rendered TRUE by a change of state of the flipflop; if bit "*b*" is a binary "zero," the state of the reference output of flipflop 6064 remains FALSE, and so on.

Logically illustrated directly above flipflops 6062 through 6065 is an additional readout line Kφ, whose TRUE state is indicative of binary 0000 being stored in the K digit-register. In addition to the availability of a parallel type of read-out, the output of the K digit-register is also effectively serialized, in that output lines K*a* through K*d* thereof are each logically ANDED with a corresponding one of bit-counter output lines B*a* through B*d*, via logical AND gates 1393 through 1396, line K*a* being ANDED with line B*a*, line K*b* with B*b*, etc. The outputs of AND gates 1393 through 1396 are logically ORED together and terminate in output line KS, which, in turn, is logically connected as an input line to the "write-control" circuitry (FIG. 20) in such a manner that the digit stored in the K digit-register is permitted to be selectively stored in any preselected one of the memory addresses.

35. Adder-subtracter

Before proceeding with a detailed description of the adder-subtracter portion of the computer logically illustrated in FIGS. 13 and 14, a brief description will first be given, setting forth the various salient operations which are sequentially executed in the performance of a simple addition and subtraction mathematical computation; such a description is deemed desirable in expediting and assuring a clear understanding of the various principles involved in the construction and mode of operation of the adder-subtracter unit.

Preceding an "add" instruction (ADD–08), for example, both the addend and augend data words are first stored in memory. To begin the "add" instruction, one of the data words is transferred to address–A, with the second data word remaining in one of memory addresses φφ through 99. Thereafter, the low-order decimal digit of the word in address–A is read out and stored in the J digit-register via line ASA, as illustrated in the block diagram of FIGS. 1 and 2. Simultaneously therewith, the low-order decimal digit of the word remaining in memory is read out and stored in the K digit-register via line MSA. The output lines from the J and K digit-registers are connected as input lines to the adder-subtracter unit in a manner such that the two decimal digits stored therein are effectively added together by the adder-subtracter unit, so that, if the sum is equal to "nine" or less, a "sum" digit and a zero "carry" digit are derived therein. However, if the sum is greater than "nine," a "sum" digit and a "carry" one digit are derived.

Following the addition of the two low-order digits, the sum digit is stored in the low-order digital position of address–A, and the carry digit is stored in a carry flipflop. Next, the second-order digit of the word in address–A is stored in the J digit-register, and, simultaneously therewith, the second-order digit of the word remaining in memory is stored in the K digit-register. Thereafter, both digits are, in a sense, simultaneously transferred to the adder-subtracter unit, wherein they are added together with the carry digit previously stored in the carry flipflop. If the sum of the two second-order digits plus the carry digit is greater than "nine," a sum digit is obtained and stored in the second-order digital position of address–A, and a carry "one" digit is obtained and stored in the carry flipflop. This sequence of operations is repeated for each digital order of the words until each digit of one of the data words is added to the corresponding digit of the other data word. Following the addition, the sum thereof is located in address–A. Consequently, the final step in the "add" instruction is to store the sum data word in the particular address in memory as previously specified.

A "subtract" instruction (SUB–09) is carried out in essentially the same manner, with the exception that the data word remaining in memory is subtracted from the data word in address–A, rather than being added thereto. More specifically, the first step to be carried out for a "subtract" instruction is to transfer to address–A the minuend which is previously stored in one of memory addresses φφ through 99. As before, the first-order digit of the word in address–A is stored in the J digit-register, and, simultaneously therewith, the first-order digit of the data word remaining in memory is stored in the K digit-register. Thereafter, the digit in the K digit-register is subtracted from the digit in the J digit-register, a difference digit is derived therefrom and stored in the low-order digital position of address–A, and the carry digit derived therefrom is stored in the carry flipflop, as before.

Due to the fact that there is no "borrowing" of digits in the present type of computation, the carry digit is added to the next higher-order digit stored in the K digit-register rather than being subtracted from the corresponding next higher-order digit in the J digit-register. In other words, any carry "one" digit effectively increments the next succeeding digit in the K digit-register rather than decrementing the next succeeding digit in the J digit-register.

The just-described subtraction operation is sequentially repeated for each of the next successively higher-order digits until the remainder derived from the subtraction operation is in address–A. As in the "add" instruction, the final step in the "subtract" instruction is to copy the remainder data word into the particular address in memory, as previously specified.

From the foregoing, it is evident that the adder-subtracter unit is capable of adding two decimal digits and a carry digit, either "zero" or "one," and to obtain therefrom a decimal sum digit and a new decimal carry digit. The adder-subtracter is also capable of subtracting one decimal digit, plus a carry digit of either "zero" or "one," from a second decimal digit and of obtaining therefrom a decimal remainder digit and a new decimal carry digit.

Essentially, the adder-subtracter unit is an "adder" and a "subtracter" combined into one circuit-sharing unit, the adder portion being selectively capable of individually performing the necessary arithmetic computation whenever an addition operation is required, and the subtracter portion being selectively capable of individually performing the necessary arithmetic computation whenever a subtraction operation is required.

As previously mentioned, the adder-subtracter unit is capable of sequentially performing an addition operation with respect to two binary-coded decimal digits and a decimal carry digit of "0" or "1" magnitude. The magnitude of the sum, derived from such an addition operation, may be as large as "19" (binary 10011). For example, if the digit "9" is added to the digit "9" plus a carry of "1," the sum thereof is "19." Consequently, upon completion of each addition operation, the binary form of the sum is essentially "checked" to determine if the magnitude thereof is equal to decimal "10" or more. If the sum has a magnitude of decimal "10" or more, the amount binary 1010 is effectively subtracted therefrom to obtain a binary-coded sum digit, plus a decimal "1" carry digit. However, if the sum is less than decimal "10," the single sum digit represents the actual sum, and, thus, a carry "0" digit is generated.

In order to add the four binary bits of a digit to the four binary bits of a second digit, corresponding bits of each digit are added together with the previous carry bit, and the carry bit derived from such addition is added to the next successively high-order bit of that particular digital group. The carry bit resulting from the highest-order bit addition of the digital group is added to the low-order bit of the next succeeding digital group. For example, suppose that the digit "5" (binary 0101) is to be added to the digit "4" (binary 0100), the rules for binary addition, of course, being: binary "0" plus binary "0" equals binary "0"; binary "1" plus binary "0" equals binary "1"; binary "0" plus binary "1" equals binary "1"; and binary "1" plus binary "1" equals binary "0" plus a binary "1" carry. Applying the just-mentioned rules for binary addition, binary 0101 plus binary 0100 equals binary 1001, or "9". By the same token, the decimal digit "5" plus the decimal digit "5" equals binary 1010. However, if decimal "10" (binary 1010) is subtracted therefrom, "5" plus "5" also equals binary 0000 plus a binary "1" carry.

Listed below, in "truth-table" form, are representations of input bits "a" through "d" for each of the digits previously stored in the J and K digit-registers, together with the carry bit, and the desired output bit for each additive combination thereof, TRUE being denoted by "1" and FALSE being denoted by "0," as before. In this instance, $Ja$ and $Ka$ are representative of the "a" bits of the digits in J and K digit-registers, respectively; $Jb$ and $Kb$ are representative of the "b" bits; "$Jc$" and "$Kc$" are representative of the "c" bits; and "$Jd$" and "$Kd$" are, respectively, representative of the "d" bits of the digits in the J and K digit-registers. "$ANa$" is representative of the binary sum of the "a" bits plus the previous digit carry; "PCI" is representative of the previous digit carry; "$pc$" is representative of the bit carry derived from the binary sum of the "a" bits plus the previous $t$ digit carry; "$q$" is representative of the binary sum of the "b" bits plus the previous bit carry; "$qc$" is representative of the bit carry derived from the binary sum of the "b" bits plus the previous carry bit; "$r$" is representative of the binary sum of the "c" bits plus the previous carry bit; "$rc$" is representative of the bit carry derived from the binary sum of the "c" bits plus the previous carry bit; "$s$" is representative of the binary sum of the "d" bits plus the previous carry bit; and "$t$" is representative of the bit carry derived from the binary sum of the "d" bits plus the previous carry bit.

| (a) Bit Addition | | | | | (b) Bit Addition | | | | | (c) Bit Addition | | | | | (d) Bit Addition | | | | |
|---|---|---|---|---|---|---|---|---|---|---|---|---|---|---|---|---|---|---|---|
| Inputs | | | Outputs | | Inputs | | | Outputs | | Inputs | | | Outputs | | Inputs | | | Outputs | |
| Ja | Ka | PCI | ANa | pc | Jb | Kb | pc | q | qc | Jc | Kc | qc | r | rc | Jd | Kd | rc | s | t |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 1 | 0 | 1 | 0 | 0 | 1 | 0 | 1 | 0 | 0 | 1 | 0 | 1 | 0 | 0 | 1 | 0 | 1 | 0 |
| 1 | 0 | 0 | 1 | 0 | 1 | 0 | 0 | 1 | 0 | 1 | 0 | 0 | 1 | 0 | 1 | 0 | 0 | 1 | 0 |
| 1 | 1 | 0 | 0 | 1 | 1 | 1 | 0 | 0 | 1 | 1 | 1 | 0 | 0 | 1 | 1 | 1 | 0 | 0 | 1 |
| 0 | 0 | 1 | 1 | 0 | 0 | 0 | 1 | 1 | 0 | 0 | 0 | 1 | 1 | 0 | 0 | 0 | 1 | 1 | 0 |
| 0 | 1 | 1 | 0 | 1 | 0 | 1 | 1 | 0 | 1 | 0 | 1 | 1 | 0 | 1 | 0 | 1 | 1 | 0 | 1 |
| 1 | 0 | 1 | 0 | 1 | 1 | 0 | 1 | 0 | 1 | 1 | 0 | 1 | 0 | 1 | 1 | 0 | 1 | 0 | 1 |
| 1 | 1 | 1 | 1 | 1 | 1 | 1 | 1 | 1 | 1 | 1 | 1 | 1 | 1 | 1 | 1 | 1 | 1 | 1 | 1 |

Reducing the above truth tables to the "canonical" form of the logical equations thereof in a well-known manner:

(1) $ANa = (Ja)'Ka(PCI)' + Ja(Ka)'(PCI)' + (Ja)'(Ka)'PCI + JaKaPCI$ (2) $pc = JaKa(PCI)' + (Ja)'KaPCI + Ja(Ka)'PCI + JaKaPCI$ (3) $q = (Jb)'Kb(pc)' + Jb(Kb)'(pc)' + (Jb)'(Kb)'pc + JbKbpc$ (4) $qc = JbKb(pc)' + (Jb)'Kbpc + Jb(Kb)'pc + JbKbpc$ (5) $r = (Jc)'Kc(qc)' + Jc(Kc)'(qc)' + (Jc)'(Kc)'qc + JcKcqc$ (6) $rc = JcKc(qc)' + (Jc)'Kcqc + Jc(Kc)'qc + JcKcqc$ (7) $s = (Jd)'Kd(rc)' + Jd(Kd)'(rc)' + (Jd)'(Kd)'rc + JdKdrc$ (8) $t = JdKd(rc)' + (Jd)'Kdrc + Jd(Kd)'rc + JdKdrc$ Listed below, in "truth table" form, are input bit representations of the sum of the two digits at present stored in the J and K digit-registers and the carry derived from the previous addition. Also listed are the desired binary coded decimal output plus any output carry, where $ANa$ through ANd represent the binary coded output of the sum, and EAS represents the decimal carry digit:

| Decimal Numbers | Binary Code of Decimal Numbers (0-19) Decoder Inputs | | | | Binary Code of Decimal Numbers (0-19) with Decimal Carry Decoder Outputs | | | | | |
|---|---|---|---|---|---|---|---|---|---|---|
| | t | s | r | q | ANa | ANd | ANc | ANb | ANa | EAS |
| 0  | 0 | 0 | 0 | 0 | 0 | 0 | 0 | 0 | 0 | 0 |
| 1  | 0 | 0 | 0 | 0 | 1 | 0 | 0 | 0 | 1 | 0 |
| 2  | 0 | 0 | 0 | 1 | 0 | 0 | 0 | 1 | 0 | 0 |
| 3  | 0 | 0 | 0 | 1 | 1 | 0 | 0 | 1 | 1 | 0 |
| 4  | 0 | 0 | 1 | 0 | 0 | 0 | 1 | 0 | 0 | 0 |
| 5  | 0 | 0 | 1 | 0 | 1 | 0 | 1 | 0 | 1 | 0 |
| 6  | 0 | 0 | 1 | 1 | 0 | 0 | 1 | 1 | 0 | 0 |
| 7  | 0 | 0 | 1 | 1 | 1 | 0 | 1 | 1 | 1 | 0 |
| 8  | 0 | 1 | 0 | 0 | 0 | 1 | 0 | 0 | 1 | 0 |
| 9  | 0 | 1 | 0 | 0 | 1 | 1 | 0 | 0 | 0 | 1 |
| 10 | 0 | 1 | 0 | 1 | 0 | 0 | 0 | 0 | 1 | 1 |
| 11 | 0 | 1 | 0 | 1 | 1 | 0 | 0 | 0 | 1 | 1 |
| 12 | 0 | 1 | 1 | 0 | 0 | 0 | 0 | 1 | 0 | 1 |
| 13 | 0 | 1 | 1 | 0 | 1 | 0 | 0 | 1 | 1 | 1 |
| 14 | 0 | 1 | 1 | 1 | 0 | 0 | 0 | 1 | 0 | 1 |
| 15 | 0 | 1 | 1 | 1 | 1 | 0 | 1 | 1 | 0 | 1 |
| 16 | 1 | 0 | 0 | 0 | 0 | 0 | 1 | 0 | 1 | 1 |
| 17 | 1 | 0 | 0 | 0 | 1 | 0 | 1 | 0 | 0 | 1 |
| 18 | 1 | 0 | 0 | 1 | 0 | 1 | 0 | 0 | 0 | 1 |
| 19 | 1 | 0 | 0 | 1 | 1 | 1 | 0 | 0 | 1 | 1 |

Reducing the above truth table to the "canonical" form of the logical equations thereof, and thereafter simplifying, it is seen that:

| (a) Bit Subtraction | | | | | (b) Bit Subtraction | | | | | (c) Bit Subtraction | | | | | (d) Bit Subtraction | | | | |
|---|---|---|---|---|---|---|---|---|---|---|---|---|---|---|---|---|---|---|---|
| Inputs | | | Outputs | | Inputs | | | Outputs | | Inputs | | | Outputs | | Inputs | | | Outputs | |
| Ja | Ka | PCI | ANa | pc | Jb | Kb | pc | q | qc | Jc | Kc | qc | r | rc | Jd | Kd | rc | s | t |
| 0 | 0 | 0 | 0 | 0 | 0 | 0 | 0 | 0 | 0 | 0 | 0 | 0 | 0 | 0 | 0 | 0 | 0 | 0 | 0 |
| 0 | 0 | 1 | 1 | 0 | 0 | 0 | 1 | 1 | 0 | 0 | 0 | 1 | 1 | 0 | 0 | 0 | 1 | 1 | 0 |
| 0 | 1 | 0 | 1 | 1 | 0 | 1 | 0 | 1 | 1 | 0 | 1 | 0 | 1 | 1 | 0 | 1 | 0 | 1 | 1 |
| 0 | 1 | 1 | 0 | 1 | 0 | 1 | 1 | 0 | 1 | 0 | 1 | 1 | 0 | 1 | 0 | 1 | 1 | 0 | 1 |
| 1 | 0 | 0 | 1 | 0 | 1 | 0 | 0 | 1 | 0 | 1 | 0 | 0 | 1 | 0 | 1 | 0 | 0 | 1 | 0 |
| 1 | 0 | 1 | 0 | 0 | 1 | 0 | 1 | 0 | 0 | 1 | 0 | 1 | 0 | 0 | 1 | 0 | 1 | 0 | 0 |
| 1 | 1 | 0 | 0 | 0 | 1 | 1 | 0 | 0 | 0 | 1 | 1 | 0 | 0 | 0 | 1 | 1 | 0 | 0 | 0 |
| 1 | 1 | 1 | 1 | 1 | 1 | 1 | 1 | 1 | 1 | 1 | 1 | 1 | 1 | 1 | 1 | 1 | 1 | 1 | 1 |

(9) $ANa = (Ja)'Ka(PCI)' + Ja(Ka)'(PCI)' + (Ja)'(Ka)'PCI + JaKaPCI$

(10) $ANb = q(EAS)' + q'EAS$

(11) $ANc = r(EAS)' + qrs + tq$

(12) $ANd = s(EAS)' + tq$

(13) $EAS = sq + sr + t$

As previously mentioned, the subtracter portion of the adder-subtracter is utilized to perform a subtraction arithmetic operation of two binary-coded decimal data digits and a carry digit, and obtain therefrom a binary remainder digit plus a carry digit. As long as the minuend data digit is larger than or equal to the subtrahend data digit plus the previous carry digit, the value of the remainder digit is between binary 0000 and binary 1001 with no carry digit output. However, should the minuend be less than the subtrahend plus the previous carry, the value of the remainder digit will be between binary 0111 and binary 1111 plus an output carry digit. Therefore, in order to obtain the decimal remainder digit, the binary remainder is subtracted from binary 10000, commonly termed "taking the sixteens complement and ignoring the carries beyond the four low-order bits."

Using the laws of binary subtraction, whereby binary "0" subtracted from binary "0" results in a remainder of binary "0," binary "0" subtracted from binary "1" results in a remainder of binary "1," binary "1" subtracted from binary "1" results in a remainder of binary "0," and binary "1" subtracted from binary "0" results in a remainder of binary "1" plus binary "1" carry, suppose that the decimal digit "5" (binary 0101) is no carry. However, decimal digit "8" (binary 1000) subtracted from decimal digit "3" (0011) results in a binary remainder of 1011. Thus, to obtain the decimal remainder digit, the binary remainder of 1011 is subtracted from binary 10000, resulting in a new binary remainder of 0101, representative of the decimal digit "3," and a carry of "1," denoting a negative remainder.

Listed below, in truth table form, are representations of input bits "a" through "d" for each of the digits stored in the J and K digit-registers, together with the carry bit and the desired output bit for each combination thereof. As before, Ja and Ka are representative of the "a" bits of the digit stored in the J and K digit-registers, respectively; Jb and Kb are representations of the "b" bits; Jc and Kc are representative of the "c" bits; and Jd and Kd are representative of the "d" bits of the digits respectively stored in the J and K digit-registers. However, in this instance, ANa is representative of the remainder obtained from a subtraction of the "a" bits; PCI is representative of the previous bit-carry; "pc" is representative of the bit-carry derived from subtraction of the "a" bits; "q" is representative of the remainder derived from subtraction of the "b" bits; "qc" is representative of the bit-carry derived from the "b" bit subtraction; "r" is representative of the remainder derived from "c" bit subtraction; "rc" is representative of the bit-carry derived from "c" bit subtraction; "s" is representative of the remainder derived from "d" bit subtracted from decimal digit "9" (binary 1001). In this instance, the remainder is binary 0100 or "4" with traction; and "t" is representative of the bit-carry derived from "d" bit subtraction.

Reducing the above truth tables to the canonical form of the logical equations thereof:

(14) $ANa = (Ja)'Ka(PCI)' + Ja(Ka)'(Pci)' + (Ja)'(Ka)'PCI + JaKaPCI$

(15) $pc = (Ja)'Ka(PCI) + (Ja)'(Ka)'PCI + (Ja)'KaPCI + JaKaPCI$

(16) $q = (Jb)'Kb(pc)' + Jb(Kb)'(pc)' + (Jb)'(Kb)'pc + JbKbpc$

(17) $qc = (Jb)'Kb(pc)' + (Jb)'(Kb)'pc + (Jb)'Kbpc + JbKbpc$

(18) $r = (Jc)'Kc(qc)' + Jc(Kc)'(qc)' + (Jc)'(Kc)'qc + JcKcqc$

(19) $rc = (Jc)'Kc(qc)' + (Jc)'(Kc)'qc + (Jc)'Kcqc + JcKcqc$

(20) $s = (Jd)'Kd(rc)' + Jd(Kd)'(rc)' + (Jd)'(Kd)'rc + JdKdrc$

(21) $t = (Jd)'Kd(rc)' + (Jd)'(Kd)'rc + (Jd)'Kdrc + JdKdrc$

Listed below, in truth table form, are input bit representations of the remainder plus carry which are obtained from subtracting the digit stored in the K digit-register from the digit stored in the J digit-register. Also listed are the desired binary coded decimal output plus any output carry, where ANa through ANd collectively represent, in this instance, the binary coded output of the remainder, and EAS represents the decimal carry digit obtained from the subtraction operation.

| Decimal Digits | Binary Code of Decimal Numbers "9" through "−10" Inputs | | | | Binary Code of Decimal Numbers "9" through "−10" with Decimal Carry Outputs | | | | |
|---|---|---|---|---|---|---|---|---|---|
| | t | s | r | q | ANa | ANd | ANc | ANb | ANa | EAS |
| 9  | 0 | 1 | 0 | 0 | 1 | 1 | 0 | 0 | 1 | 0 |
| 8  | 0 | 1 | 0 | 0 | 1 | 1 | 0 | 0 | 0 | 0 |
| 7  | 0 | 0 | 1 | 1 | 1 | 0 | 1 | 1 | 1 | 0 |
| 6  | 0 | 0 | 1 | 1 | 0 | 0 | 1 | 1 | 0 | 0 |
| 5  | 0 | 0 | 1 | 0 | 1 | 0 | 1 | 0 | 1 | 0 |
| 4  | 0 | 0 | 1 | 0 | 0 | 0 | 1 | 0 | 0 | 0 |
| 3  | 0 | 0 | 0 | 1 | 1 | 0 | 0 | 1 | 1 | 0 |
| 2  | 0 | 0 | 0 | 1 | 0 | 0 | 0 | 1 | 0 | 0 |
| 1  | 0 | 0 | 0 | 0 | 1 | 0 | 0 | 0 | 1 | 0 |
| 0  | 0 | 0 | 0 | 0 | 0 | 0 | 0 | 0 | 0 | 0 |
| −1 | 1 | 1 | 1 | 1 | 1 | 1 | 0 | 0 | 1 | 1 |
| −2 | 1 | 1 | 1 | 1 | 0 | 1 | 0 | 0 | 0 | 1 |
| −3 | 1 | 1 | 1 | 0 | 1 | 0 | 1 | 1 | 1 | 1 |
| −4 | 1 | 1 | 1 | 0 | 0 | 0 | 1 | 1 | 0 | 1 |
| −5 | 1 | 1 | 0 | 1 | 1 | 0 | 1 | 0 | 1 | 1 |
| −6 | 1 | 1 | 0 | 1 | 0 | 0 | 1 | 0 | 0 | 1 |
| −7 | 1 | 1 | 0 | 0 | 1 | 0 | 0 | 1 | 1 | 1 |
| −8 | 1 | 1 | 0 | 0 | 0 | 0 | 0 | 1 | 0 | 1 |
| −9 | 1 | 0 | 1 | 1 | 1 | 0 | 0 | 0 | 1 | 1 |
| −10| 1 | 0 | 1 | 1 | 0 | 0 | 0 | 0 | 0 | 1 |

Reducing the above truth table to the canonical form of the logical equations thereof and then simplifying to remove redundancies therein, the four bit line and decimal carry representations of the decimal difference are:

(22) $ANa=(Ja)'Ka(PCI)'+Ja(Ka)'(PCI)'+(Ja)'(Ka)'PCI+JaKaPCI$
(23) $ANb=qt'+q't$ or $q(EAS)'+q'EAS$
(24) $ANc=rt'+t(rq'+r'q)$
(25) $ANd=st'+qrs$
(26) $EAS=t$ Having essentially derived the logical equations for an adder and a subtracter separately, the next step is to logically combine the two sets of equations thereof and obtain therefrom a circuit sharing adder-subtracter unit that is capable of performing an addition mathematical operation when the state of line (SAS)' is TRUE, and, additionally, is capable of performing a subtraction mathematical operation when line SAS is TRUE.

By comparing the previously-derived non-simplified forms of the logical equations for lines "NAa," "q," "r," and "s" for an addition operation (Equations 1, 3, 5, and 7) with (Equations 14, 16, 18, and 20) for a subtraction operation, it is observed that the logical equation for each line is the same in each instance. Thus, whether the adder-subtracter unit is to carry out an addition or a subtraction operation, the sum and the difference digits in the binary answer are also the same in each instance. By comparing the logical equation for line "pc" for an addition and a subtraction operation (Equations 2 and 15), it is observed that two terms "(Ja)'KaPCI" and "JaKaPCI" in each equation are identical in each operation and the remaining terms thereof are different, the two like terms obviously being reducible to the simplified term "KaPCI." Hence, the logical equation for output line "pc" for either an addition or a subtraction mathematical operation is:

(27) $pc=KaPCI+(Ja)'Ka(PCI)'SAS+(Ja)'(Ka)'PCISAS+JaKa(PCI)'(SAS)'+Ja(KA)'PCI(SAS)'$

Figure 13:
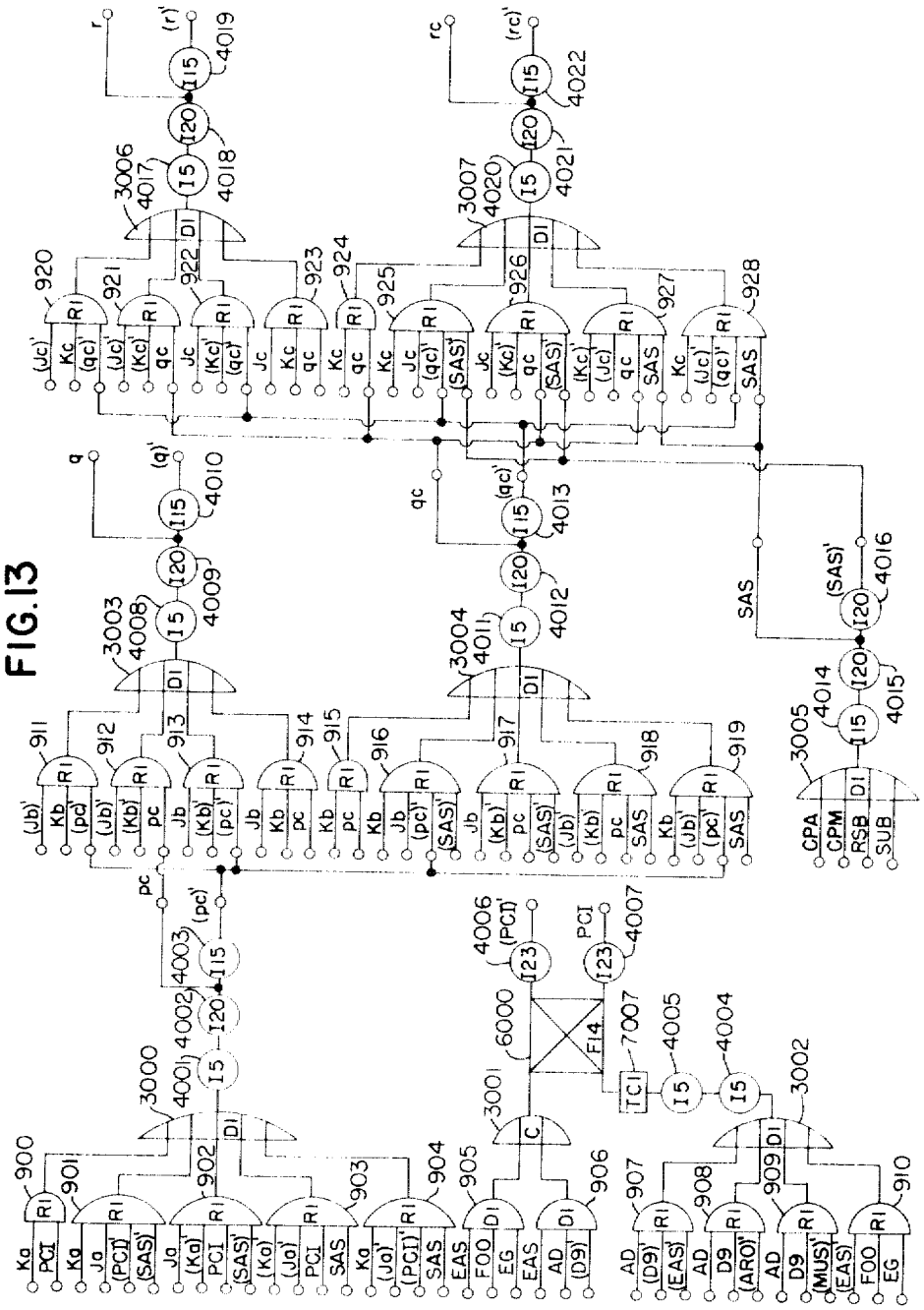
FIG. 13 is a portion of the logical diagram of the adder-subtracter circuitry.
Figure 14:
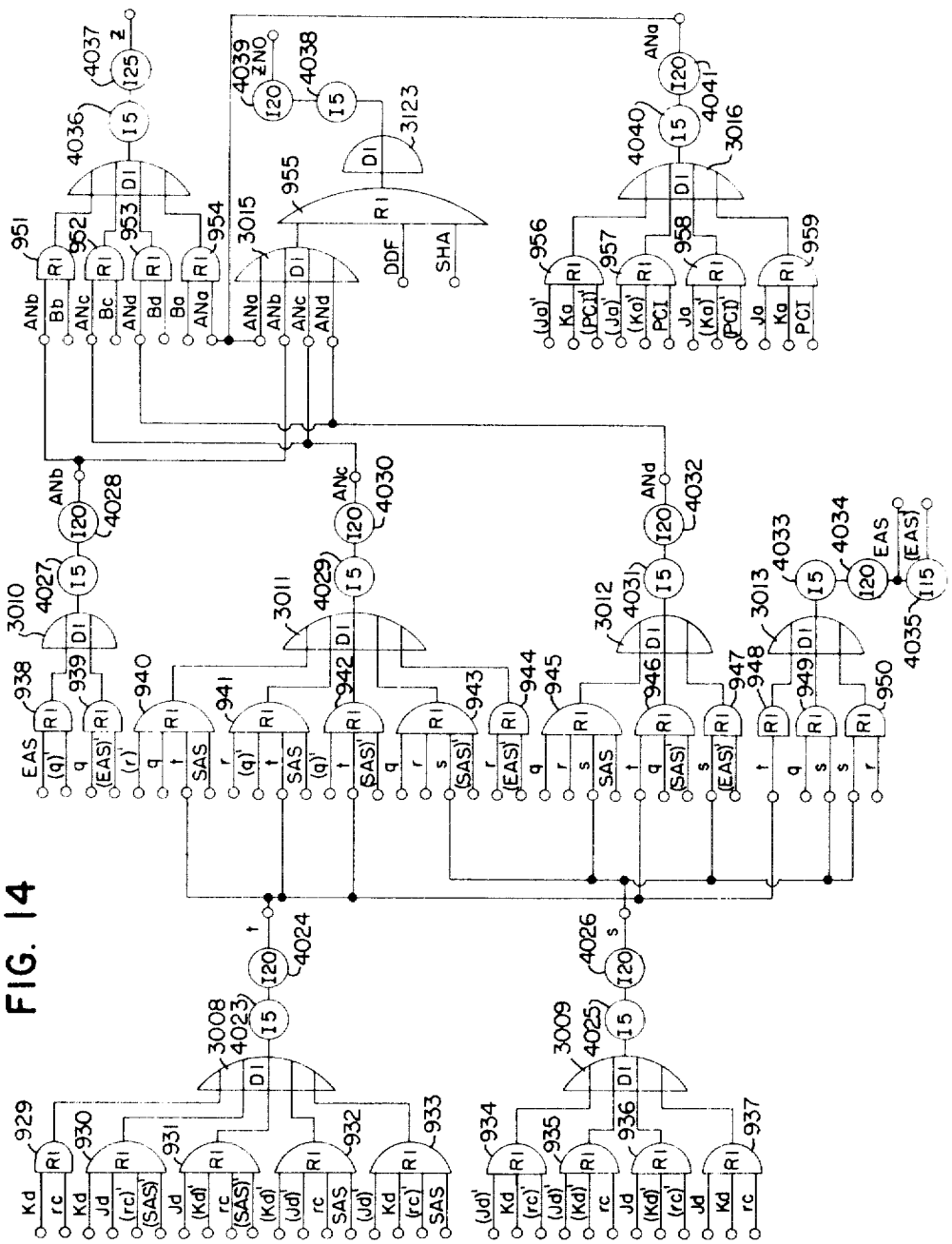
FIG. 14 is the remaining portion of the logical diagram of the adder-subtracter circuitry.

The logical equations for output lines "qc," "rc," "s," and "t," likewise modified in the same manner, are as given below, where:

(28) $qc=Kbpc+(Jb)'(Kb(pc)'SAS+(Jb)'(Kb)'pcSAS+JbKb(pc)'(SAS)'+Jb(Kb)'pc(SAS)'$
(29) $rc=Kcqc+(Jc)'Kc(qc)'SAS+(Jc)'(Kc)'qcSAS+JcKc(qc)'(SAS)'+Jc(Kc)'qc(SAS)'$
(30) $t=Kdrc+(Jd)'Kd(rc)'SAS+(Jd)'(Kd)'rcSAS+JdKd(rc)'(SAS)'$ By likewise combining the logical equations for "ANa" through "ANd" and "EAS" for both an addition operation (Equations 9 through 13) and a subtraction mathematical operation (Equations 22 through 26), it is seen that the combined logical equation for each output line is:

(31) $EAS=sq+sr+t$
(32) $ANa=(Ja)'Ka(PCI)'+Ja(Ka)'(PCI)'+(Ja)'(Ka)'PCI+JaKaPCI$
(33) $ANb=q(EAS)'+q'EAS$
(34) $ANc=r(EAS)'+trq'SAS+tr'qSAS+qrs(SAS)'+tq'(SAS)$
(35) $ANd=s(EAS)'+qrsSAS+tq(SAS)'$ Therefore, with reference to the logical diagrams of the adder-subtracter unit as illustrated in FIGS. 13 and 14, it is seen that the above-stated logical equations numbered 27 through 35 are satisfied thereby and thus correspond to the circuit configuration thereof.

As an illustrative example of an addition and a subtraction operation being carried out by the just-described adder-subtracter arithmetic unit, suppose that the first-order digit of the addend word located in memory address $\phi\phi$ is a "nine," and the first-order digit of the augend word in address $\phi 1$ is a "seven."

To begin an "add" instruction, as previously mentioned, the augend word is first read out of memory addressed $\phi 1$ and stored in address–A. Thereafter, the low-order digit of the augend is sequentially read out of address–A, bit by bit, starting with the low-order binary bit "a" thereof, and is sequentially stored, bit by bit, in the J digit-register (FIG. 32) via lines ASA and JL. Simultaneously therewith, the addend is sequentially read out of address $\phi\phi$, bit by bit, starting with the low-order binary bit "a" thereof, and is sequentially stored, bit by bit, in the K digit-register (FIG. 31) via lines MSA and KL. As the assumed value of the decimal digit stored in the J digit-register (FIG. 32) is a "seven" (binary 0111), the state of output line Jd is FALSE, whereas the states of output lines Ja through Jc are each TRUE, the prime output lines of flip-flops 6067 through 6070, of course, being of opposite states from the corresponding reference output lines thereof, as previously described. As the assumed value of the decimal digit stored in the K digit-register (FIG. 31) is a "nine" (binary 1001), the states of output lines Kd and Ka thereof are TRUE, whereas the states of output lines Kb and Kc are FALSE.

Figure 3:
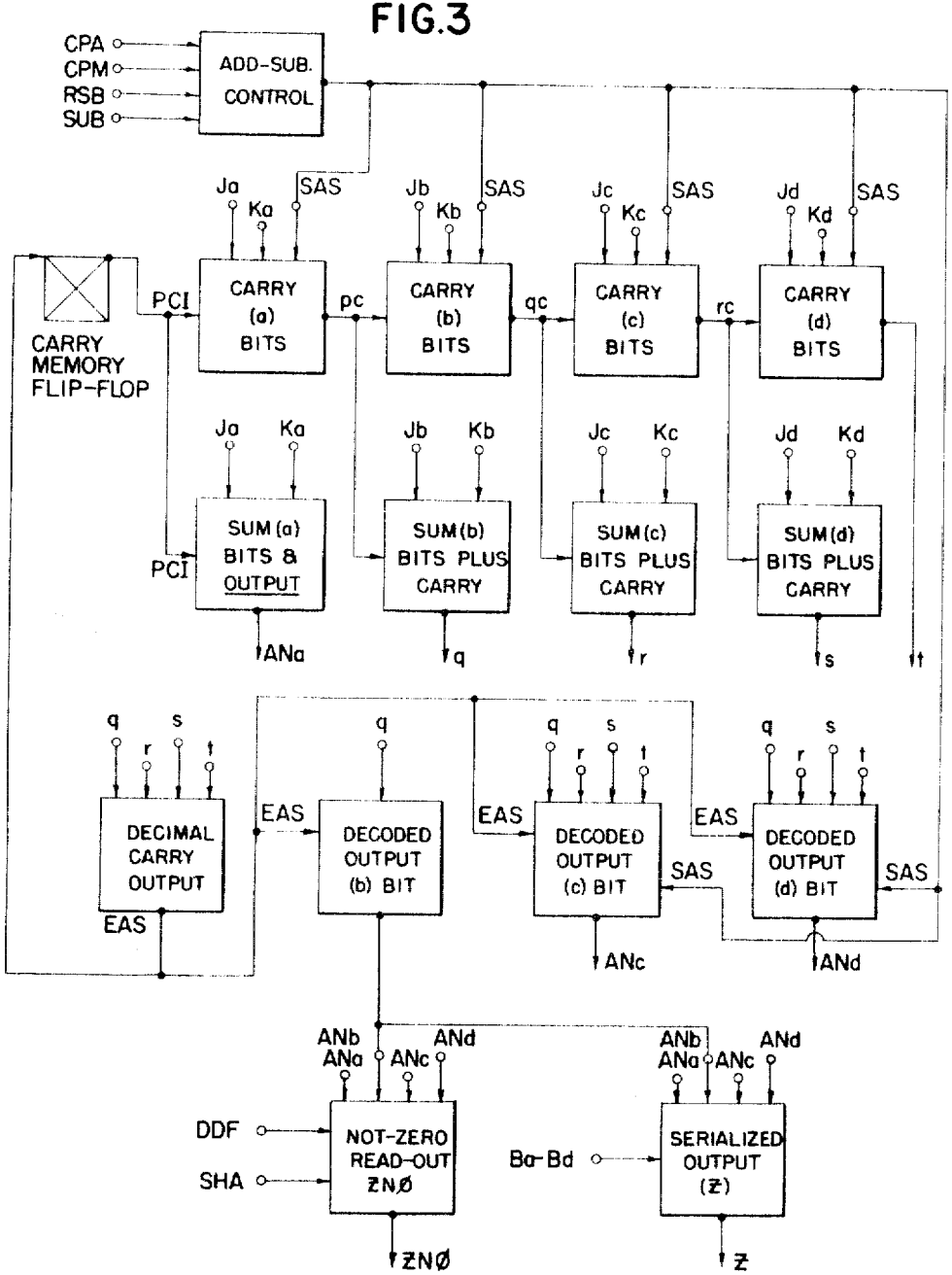

Reference is now made to that portion of the adder-subtracter unit logically shown in FIG. 14, in addition to periodic reference to the simplified block diagram of the adder-subtracter shown in FIG. 3. As the low-order bit of the digit stored in each of the J and K digit-registers is a binary "1," output lines Ja and Ka are both TRUE, as just mentioned. Also, as the previous decimal carry is a "0" in this instance, the state of line (PCI)' is TRUE, and, as an "add" operation is to be carried out, the state of line (SAS)' is previously rendered TRUE. Therefore, as none of AND gates 956 through 959 have all of the inputs thereto simultaneously TRUE, the state of output line ANa is FALSE, indicative of binary "0." Consequently, the sum of the "a" bits of the first-order digits in the J and K digit-registers is "0."

With reference to the "a" bit carry circuitry shown in FIG. 13, as the states of lines Ja, Ka, (PCI)', and (SAS)' and TRUE, as previously stated, the states of all of the inputs to AND gate 901 are simultaneously TRUE. Consequently, the state of output line pc is TRUE, indicative of a binary "1" carry resulting from addition of the "a" bits.

As the "b" bit in the J digit-register is a binary "1" and the "b" bit in the K digit-register is a binary "0," the state of line Jb is TRUE and the state of line Kb is FALSE, as previously noted. As none of AND gates 911 through 914 have all of the inputs thereto simultaneously TRUE, the state of output line q is FALSE, indicative of binary "0"; consequently, the sum of the "b" bits plus the "a" bit carry is "0." However, as the states of all of lines Jb, (Kb)', pc, and (SAS)' are TRUE, the states of the inputs to AND gate 917 are simultaneously TRUE. As a result, the state of output line $qc$ is TRUE, indicative of a binary "1" carry resulting from addition of the "$b$" bits plus the "$a$" bit carry.

The "$c$" bit in the J digit-register being a binary "1" and the "$c$" bit in the K digit-register being a binary "0," the state of line $Jc$ is TRUE and the state of line $Kc$ is FALSE. As none of AND gates 920 through 923 have all of the inputs thereto simultaneously TRUE, the state of output line $r$ is FALSE; consequently, the sum of the "$c$" bits plus the "$b$" bit carry is "0."

As the respective states of lines $Jc$, $(Kc)'$, $qc$, and $(SAS)'$ are each TRUE, all of the inputs to AND gate 926 are simultaneously TRUE. Consequently, the state of output line $rc$ is TRUE, indicative of a binary "1" carry resulting from addition of the "$c$" bits and the "$b$" bit carry.

The high-order or "$d$" bit in the J digit-register being a binary "0" and the "$d$" bit in the K digit-register being a binary "1," the state of line $Jd$ is FALSE and the state of line $Kd$ is TRUE. With reference back to FIG. 14, as none of AND gates 934 through 937 have all of the inputs thereto simultaneously TRUE, the state of output line $s$ is FALSE, thus indicating that the sum of the "$d$" bits plus the "$c$" bit carry is a binary "0."

Finally, as the states of both of lines $Kd$ and $rc$ are TRUE, all of the inputs to AND gate 929 are simultaneously TRUE. As a result, the state of output line $t$ is TRUE, thus indicating a binary "1" carry resulting from addition of the "$d$" bits plus the "$c$" bit carry.

Therefore, as the state of output line $t$ is TRUE and the state of each of output lines $s$, $r$, $q$, and $ANa$ is FALSE, the sum of the digit "7" (binary 0111) and the digit "9" (binary 1001) is therefore indicated as being "16," or binary 10000. The binary sum—i.e., 10000—is converted to a binary-coded-decimal form in the following manner: As the state of the single input to AND gate 948 (FIG. 14) is TRUE, the state of output line EAS is TRUE, thus indicative of a decimal "1" carry. Therefore, as the state of each of lines EAS and $(q)'$ is TRUE, the state of output line $ANb$ is likewise TRUE, thus indicating that the value of the "$b$" bit of the sum digit is a binary "1." As the state of each of lines $(q)'$, $t$, and $(SAS)'$ is TRUE, all the inputs to AND gate 942 are TRUE, thus rendering output line $ANc$ TRUE and thereby indicating that the value of the "$c$" bit of the sum digit is a binary "1." As none of AND gates 945 through 947 have all of the inputs thereto simultaneously TRUE, the state of line $ANd$ is FALSE and thereby indicates that the high-order bit "$d$" of the sum digit is a binary "0."

It is now evident that, upon completion of the just-described addition operation of the two decimal digits "7" and "9," the state of output line $ANa$ is FALSE, the state of output line $ANb$ is TRUE, the state of output line $ANc$ is TRUE, and the state of output line $ANd$ is FALSE. Thus, the states of output lines $ANa$ through $ANd$ and collectively represent the sum digit "6" (binary 0110). As the state of output line EAS is simultaneously TRUE, as before stated, its state is indicative of the decimal "1" carry digit.

Following the just-described addition operation of the two first-order digits taken from the data words stored in address $\phi\phi$ and address A, there is derived thereby a sum digit which is written in the low-order digit position of address–A and a decimal "1" carry digit which is stored in carry flipflop 6000 (FIG. 13) via line EAS. Thereafter, the second-order digit of the word in address $\phi\phi$ is transferred to the K digit-register, and the second-order digit of the word in address–A is transferred to the J digit-register. As the output lines from the J and K digit-registers are connected as input lines to the adder-subtracter unit, as previously described, the two second-order digits are simultaneously "presented" to the adder-subtracter unit, wherein they are added together, along with the decimal "1" carry in flipflop 6000, in exactly the same manner as just described with respect to the first-order digits of the two data words. The above sequence of operations is sequentially repeated for each higher-order digit until the tenth-order decimal digits have been added and the sum digit stored in the tenth-order digital position of address–A. As previously mentioned, the final step of an "add" instruction is to effect the copying of the sum data word from address–A into the particular memory address as previously specified.

A "subtract" instruction is carried out in essentially the same manner as the just-described "addition" operation, with the exception that prior thereto, the state of line $(SAS)'$, originating in FIG. 13, is selectively rendered TRUE, the state of line SAS, of course, being simultaneously rendered FALSE. Consequently, in the previous example, the adder-subtracter unit now effectively subtracts the word in address $\phi\phi$ from the word in address–A, after which the difference word is transferred from address–A to a particular address in memory as specified.

As the mode of operation of the adder-subtracter unit in carrying out an addition or a subtraction mathematical operation is essentially the same in both instances, in light of the just-described detailed mode of operation with respect to an addition operation, a further detailed mode of operation thereof with respect to a subtraction operation is not deemed necessary in order to insure a full and complete understanding and appreciation of the adder-subtracter portion of the instant computer.

36. Control counter generally

With reference to the upper left-hand portion of FIG. 1, there is diagrammatically illustrated a "control counter" comprising a multitude of flipflops and a maze of other electronic control circuitry. As will become more obvious hereinafter, the control counter portion of the computer functions in many ways as a central regulatory means which electronically controls the proper sequence of all data handling and transfer within the computer, and, additionally, controls all communication between the control portion of the computer and the various input-output equipment utilized by the computer. Consequently, due to the inherent complex functional nature of the control counter, it is not readily susceptible of being described as a separate entity as such.

As an example of the foregoing, the first step to be carried out in the execution of each instruction is to read out from memory the next instruction word in the program and store the instruction word in the instruction register. After the instruction word is stored in the instruction register, the two decimal digits stored in section–1 thereof are "examined" to determine the particular type of instruction, or sequence of operation, to be carried out next. For example, as previously described, if the two-digit decimal number in section–1 is an "eleven," an "add-pairs-of-numbers" instruction is carried out, and all data thereafter transferred between data-handling sections of the computer is in accordance with a particular pattern dictated by this instruction.

Each instruction concludes by effecting the storage in the word-selecting register, the address in memory of the next instruction word; the memory address usually is specified in section–5 of the present instruction word, also as previously described. After the address of the next instruction word is stored in the word-selecting register, the computer may immediately read out the next instruction word from memory, or may pause for a predetermined period of time before reading out the instruction. Whether or not the computer immediately proceeds to carry out the next instruction in the program depends upon the particular mode of operation preselected by the operator. If the computer is operating in an "automatic" mode, the next instruction in the program is immediately carried out upon completion of each preceding instruction. However, if the computer is operating in a "manual" mode, all computation stops upon completion of each instruction and is not resumed until either the manual or the automatic-resume-program push-button is depressed. Thereafter, the next instruction word, as specified by the word-selection register, is stored in the instruction register, the two decimal digits in section–1 of the instruction register are examined to determine the particular instruction to be carried out, and the computer then proceeds to carry out that particular instruction.

Listed below in somewhat tabular form, and also graphically illustrated by the flow diagram of FIG. 107B, is a step-by-step description of the various previously described subinstructions to which the computer is sequentially responsive in executing a POW instruction:

| Step | Subinstructions | Description |
|------|-----------------|-------------|
| 1 | MI–0–2 | Copy into the instruction register the next instruction word stored in memory at the address specified by the contents of the word-selecting register; thereafter, if the number thus stored in section–1 of the instruction register is "01," carry out the subinstruction listed in Step 2 of the following POW subprogram. |
| 2 | PFφ–0–3 | Preset the F-counter to "0"; thereafter, go to Step 3. |
| 3 | GO–0–4 | Go to Step 4 in the subprogram whenever depression of a motor bar will initiate a machine cycle. |
| 4 | AD–0–5 | Increment the digit-counter; thereafter, go to Step 5. |
| 5 | MJ–3–6 | Copy, digit by digit, into the J digit-register the word stored in memory at the address indicated by section–3 of the instruction register; thereafter, go to Step 6. |

37. Detailed description of APN instructions

In executing a single APN instruction, a plurality of pairs of words are algebraically added together, and their sums are thereafter stored in consecutively-numbered addresses in memory. For example, if the APN instruction is directed toward the four words stored in memory addresses 11 through 14, so that "11" is stored in section–3 and "14" is stored in section–4 of the instruction register, the word stored in address–11 is algebraically added to the word stored in address–14, and their sum is thereafter stored in address–14. Thereafter, sections 3 and 4 of the instruction register are respectively incremented and decremented, after which the word stored in address–12 is algebraically added to the word stored in address–13, and their sum is thereafter stored in address–13.

Listed below in somewhat tabular form is a step-by-step description of the various previously-described subinstructions to which the computer is sequentially responsive in executing an APN instruction:

| Step | Subinstructions | Description |
|------|-----------------|-------------|
| 1 | MI–0–2 | Copy into the instruction register the next instruction word stored in memory at the address specified by the contents of the word-selecting register; thereafter, if the contents of section–1 of the instruction register is "11," go to Step 2 of the following subprogram. |
| 2 | RLR–0–3 | Preset the count of the R-counter to correspond to the low-order digit of section–2 of the instruction register; thereafter, go to Step 3. |
| 3 | MA–4–4 | Copy into address–A the word from the address in memory as specified by the contents of section–4 of the instruction register, and, simultaneously therewith, copy the word, digit by digit, into the J digit-register; thereafter, go to Step 4. |
| 4 | RAD–3–5 | Add to the word stored in address–A the word stored in memory at the address specified by section–3 of the instruction register; thereafter, go to Step 5. |
| 5 | AM–4–6 | Copy the word stored in address–A into memory at the address specified by the contents of section–4 of the instruction register; thereafter, go to Step 6. |
| 6 | DR–0–7 | Decrement the R-counter; thereafter, go to Step 7. |
| 7 | Rφ–8–10 | If the R-counter is at a count of "0," go to Step 10; otherwise, go to Step 8. |
| 8 | IN4–0–9 | Increment section–3 of the instruction register; thereafter, go to Step 9. |
| 9 | DE2–0–3 | Decrement section–4 of the instruction register; thereafter, go to Step 3. |
| 10 | STD–5–* | Copy the contents of section–5 of the instruction register into the word-selecting register. |

Upon completion of the execution of the previously initiated "MI" word-cycle, during which time the next instruction word is read out from the particular address in memory specified by the contents of the word-selecting register and stored in the instruction register, if the contents of section–1 of the instruction register thereafter corresponds to the code designation for an APN instruction (i.e., "11"), the state of line APN is rendered TRUE in the manner previously described with respect to FIG. 16, and, as a result, an APN instruction is thereafter executed in the following manner:

With reference to FIG. 51, wherein there is illustrated a logical diagram of the particular portions of the computer circuitry utilized in executing an APN instruction, when line MIN is rendered FALSE upon completion of the previously-initiated "MI" word-cycle, the states of flipflops 6091 and 6088 are simultaneously reversed, whereby lines MA and JHR are respectively rendered TRUE thereby. When line JHR is thus rendered TRUE, line RLR is likewise rendered TRUE. However, at TIME–1 after line JHR is rendered TRUE, the state of flipflop 6088 is again reversed, so that lines JHR and RLR are both rendered FALSE thereby. As a result of line RLR thus experiencing a TRUE-to-FALSE reversal of state, the R-counter is preset to a count corresponding to the value of the low-order digit of section–2 of the instruction register in the same manner as previously described with respect to FIG. 28. As is evident, the count of the R-counter is thereafter indicative of the number of word-pairs to be added. As line TS4 is likewise rendered TRUE when line MA is initially rendered TRUE, a MA word-cycle is thereafter executed, whereby the word stored in memory at the address specified by section–4 of the instruction register is read out and thereafter stored in address–A.

Upon completion of the MA word-cycle, the state of flipflop 6091 is again reversed, and line MA is thereby rendered FALSE. When line MA is thus rendered FALSE, the state of flipflop 6097 is reversed, and line RAD is thereby rendered TRUE, which, in turn, renders line TS3 likewise TRUE. In response to lines RAD and TS3 thus being rendered TRUE, a RAD subcommand is thereafter executed, whereby the word stored in memory at the address specified by section–3 of the instruction register is added to the word stored in address–A. Upon completion of the RAD subcommand, the state of flipflop 6097 is again reversed, and line RAD is thereby rendered FALSE. However, just prior to completion of the previously-initiated RAD subcommand, line DR experiences a TRUE-to-FALSE reversal of state and thereby causes the R-counter to be decremented by a count of "1."

When line RAD is rendered FALSE, the state of flipflop 6077 is reversed, so that line AM is thereby rendered TRUE. Line AM, being rendered TRUE, likewise renders line TS4 TRUE. Thus in response to lines AM and TS4 being rendered TRUE, and AM word-cycle is thereafter executed whereby the word in address–A is stored in memory at the address specified by section–4 of the instruction register. Upon completion of the AM word-cycle, the state of flipflop 6077 is again reversed, so that line AM is thereby rendered FALSE. When line AM is thus rendered FALSE, lines IN4 and DE2 are likewise rendered FALSE. Consequently, sections 3 and 4 of the instruction register are respectively incremented and decremented by a count of "1."

If, after being decremented, the R-counter is at a count other than "0," indicating that there are additional word-pairs to be added, the state of flipflop 6091 is again reversed when line AM is subsequently rendered FALSE, and, as a result, line MA is again rendered TRUE for the second time. Thereafter, the above-described sequence of events is sequentially repeated until the R-counter is decremented to a count of "0," indicating that there are no other word-pairs to be added. When the R-counter reaches a count of "0," so that line R$\phi$ is rendered TRUE, the state of flipflop 6107 is reversed when line AM is subsequently rendered FALSE and line STD is thereby rendered TRUE. Line STD, being rendered TRUE, likewise renders line TS5 TRUE. Thus, in response to lines STD and TS5 being rendered TRUE, a "STD" subinstruction is thereafter executed, whereby the contents of section–5 of the instruction register is copied into the word-selecting register, thus terminating the sequence of operations executed in response to initiation of an APN instruction.

While particular embodiments of the invention have been shown and described in detail, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. In an electronic digital computing machine, the combination comprising: a storage device of a type providing a plurality of separate storage locations each being capable of having either a data word or an instruction word manifestation stored therein; address selecting means associated with said storage device for obtaining access to any chosen storage location thereof; read-write means associated with said storage device and operable during a cycle of operation thereof for selectively storing a word manifestation or reproducing a word manifestation previously stored at the particular storage locations individually selected by said address selecting means; an instruction register having a plurality of sections each of which is capable of having stored therein a particular portion of an instruction word manifestation, the contents of one of said sections being indicative of a first storage location in said storage device and the contents of another one of said sections being indicative of a second storage location in said storage device; means operable at predetermined programmed times for alternately conditioning said address selecting means to be first indicative of the contents of said one section of said instruction register and next to be indicative of the contents of said another section of said instruction register; control means responsive to the contents of still another section of said instruction register for initiating a succession of cycles of operation of said read-write means; and means for selectively incrementing the contents of said one section and for decrementing the contents of said another section of said instruction register upon completion of each two cycles of operation of said read-write means such that a plurality of pairs of word manifestations are selectively stored or reproduced with respect to successive order storage locations of said storage device in response to the same instruction word manifestation initially stored in said instruction register.

2. In an electronic digital computing machine, the combination comprising: a storage device of a type providing a plurality of separate storage locations each being capable of having either a data word or an instruction word manifestation stored therein; address selecting means associated with said storage device for obtaining access to any chosen storage location thereof; read-write means associated with said storage device and operable during a cycle of operation thereof for selectively storing a word manifestation or reproducing a word manifestation previously stored at the particular storage locations individually selected by said address selecting means; an instruction register having a plurality of sections each of which is capable of having stored therein a particular portion of an instruction word manifestation, the contents of one of said sections being indicative of a first storage location in said storage device and the contents of another one of said sections being indicative of a second storage location in said storage device; means for causing an instruction word manifestation stored in said storage device at the storage location dictated by said address selecting means to be reproduced and thereafter stored in said instruction register; means operable at predetermined programmed times for alternately conditioning said address selecting means to be first indicative of the contents of said one section of said instruction register and next to be indicative of the contents of said another section of said instruction register; control means responsive to the contents of still another section of said instruction register for initiating a succession of cycles of operation of said read-write means; and means for selectively incrementing the contents of said one section and for decrementing the contents of said another section of said instruction register upon completion of each two cycles of operation of said read-write means such that a plurality of pairs of word manifestations are selectively stored or reproduced with respect to successive order storage locations of said storage device in response to the same instruction word manifestation initially stored in said instruction register.

3. In an electronic digital computing machine, the combination comprising a storage device of a type providing a plurality of separate storage locations each being capable of having either a data word or an instruction word manifestation stored therein; address selecting means associated with said storage device for obtaining access to any chosen storage location thereof; read-write means associated with said storage device and operable during a cycle of operation thereof for selectively storing a word manifestation or reproducing a word manifestation previously stored at the particular storage locations individually selected by said address selecting means; an instruction register having a plurality of sections each of which is capable of having stored therein a particular portion of an instruction word manifestation, the contents of one of said sections being indicative of a first storage location in said storage device and the contents of another one of said sections being indicative of a second storage location in said storage device; means operable at predetermined programmed times for alternatively conditioning said address selecting means to be first indicative of the contents of first said one section and then to be indicative of the contents of the said another section of said instruction register; control means responsive to the particular instruction word manifestation stored in said instruction register for initiating a programmed succession of cycles of operation of said read-write means; arithmetic means responsive to the contents of still another section of said instruction register for performing a specific arithmetic operation on the pair of reproduced data word manifestation previous stored in said storage device at the two storage locations indicated by the contents of said one and said another sections of said instruction register; and means for incrementing the contents of said one section of said instruction register and decrementing the contents of said another section of said instruction register upon completion of each arithmetic operation such that the same arithmetic operation is sequentially performed with respect to a plurality of pairs of reproduced data word manifestations in response to the same instruction word manifestation initially stored in said instruction register.

References Cited by the Examiner

UNITED STATES PATENTS

| Re. 25,120 | 2/1962 | Holmes | 340—172.5 X |
| 2,968,027 | 1/1961 | McDonnell et al. | 340—172.5 |
| 3,012,227 | 12/1961 | Astrahan et al. | 340—172.5 |
| 3,077,580 | 2/1963 | Underwood | 340—172.5 |

ROBERT C. BAILEY, *Primary Examiner.*

P. J. HENON, *Assistant Examiner.*